(12) United States Patent
Teranishi et al.

(10) Patent No.: US 7,995,762 B2
(45) Date of Patent: Aug. 9, 2011

(54) KEY ISSUING METHOD, GROUP SIGNATURE SYSTEM, INFORMATION PROCESSING APPARATUS, AND PROGRAM

(75) Inventors: Isamu Teranishi, Tokyo (JP); Jun Furukawa, Tokyo (JP)

(73) Assignee: NEC Corporation, Tokyo (JP)

( * ) Notice: Subject to any disclaimer, the term of this patent is extended or adjusted under 35 U.S.C. 154(b) by 813 days.

(21) Appl. No.: 11/995,999

(22) PCT Filed: Jul. 18, 2006

(86) PCT No.: PCT/JP2006/314186
§ 371 (c)(1),
(2), (4) Date: Jan. 17, 2008

(87) PCT Pub. No.: WO2007/010903
PCT Pub. Date: Jan. 25, 2007

(65) Prior Publication Data
US 2009/0034739 A1   Feb. 5, 2009

(30) Foreign Application Priority Data

Jul. 19, 2005  (JP) ................................. 2005-208979
Dec. 7, 2005  (JP) ................................. 2005-353809

(51) Int. Cl.
*H04L 9/08* (2006.01)

(52) U.S. Cl. ....................................................... 380/278
(58) Field of Classification Search .................... None
See application file for complete search history.

(56) References Cited

U.S. PATENT DOCUMENTS 6,292,897 B1 * 9/2001 Gennaro et al. .............. 713/175
7,051,199 B1 * 5/2006 Berson et al. ................. 713/150

FOREIGN PATENT DOCUMENTS

JP   2004-228958   8/2004

OTHER PUBLICATIONS

Aggelos Kiayias, et al., "Group Signatures with Efficient Concurrent Join," Eurocrypt 2005, LNCS 3494, (May 22, 2005), pp. 198-214.
Jan Camenisch, et al., "Group Signatures: Better Efficiency and New Theoretical Aspects," SCN 2004, LNCS 3352, (2004), pp. 120-133.
Jun Furukawa, et al., "An Efficient Group Signature Scheme from Bilinear Maps," ACISP 2005, LNCS 3574, (Jul. 4, 2005), pp. 455-467.

* cited by examiner

*Primary Examiner* — Brandon S Hoffman
(74) *Attorney, Agent, or Firm* — Dickstein Shapiro LLP

(57) ABSTRACT

There is provided in accordance with the present invention a key issuing method for being performed by a user apparatus in a group signature system including the user apparatus and an issuer apparatus connected to the user apparatus through a network.

27 Claims, 32 Drawing Sheets

KEY ISSUING METHOD, GROUP SIGNATURE SYSTEM, INFORMATION PROCESSING APPARATUS, AND PROGRAM

BACKGROUND OF THE INVENTION

1) Field of the Invention

The present invention relates to a group signature system and an information processing apparatus for permitting a signature to be made by a member belonging to a group and making it possible to confirm the signature, a key issuing method for issuing a key at the time a new member is added to the group signature system, and a program for enabling a computer to carry out the key issuing method.

2) Description of the Related Art

Group signature systems of the background art are disclosed in "Jan Camenisch. Jens Groth. Group Signatures: Better Efficiency and New Theoretical Aspects. SCN 2004, vol. 3352 of LNCS. pp. 120-133, 2004" (hereinafter referred to as Non-patent document 1), and "Furukawa, Imai. An Efficient Group Signature Scheme from Bilinear Maps. ACISP 2005, vol. 3574 of LNCS, pp. 455-467" (hereinafter referred to as Non-patent document 2). In the group signature systems of the background art, a join protocol for adding a group member has the following structural features:

According to the join protocol of the group signature systems of the background art, a user apparatus first calculates data using a secret key. Then, the user apparatus sends the data to an issuer apparatus (referred to as group manager in Non-patent document 1 and membership manager in Non-patent document 2). Thereafter, the user apparatus proves the legitimacy of the data to the issuer apparatus. The issuer apparatus then processes the data using a secret key of the issuer apparatus.

BRIEF SUMMARY OF THE INVENTION

In the group signature systems of the background art, as described above, the user apparatus first proves the legitimacy of the data and thereafter the issuer apparatus processes the data using the secret key of the issuer apparatus. Information has been exchanged on one-on-one level between the user apparatus and the issuer apparatus until the process of issuing a key to one member is finished. If the issuing apparatus operates concurrently on the join protocol with respect to a plurality of user apparatus, then safety such as information confidentiality cannot be guaranteed.

The present invention has been made in order to solve the problems of the background art. It is an object of the present invention to provide a key issuing method, a group signature system, an information processing apparatus for allowing a join protocol to be operated on concurrently for adding group members, and a program for enabling a computer to carry out the key issuing method.

To achieve the above object, there is provided in accordance with the present invention a key issuing method for being performed by a user apparatus in a group signature system including the user apparatus and an issuer apparatus connected to the user apparatus through a network, comprising reading an issuer public key from the issuer apparatus into a user storage through the network, receiving, from the issuer apparatus through the network, first confidential data including one or plural confidential texts which are produced by confidentializing the issuer public key using element data containing information of an element of a group in the issuer apparatus, performing a second confidential data generating process for generating second confidential data of a confidential text represented by the product of modulo-exponentiated element data corresponding to the confidential texts included in the first confidential data or a confidential text represented by the sum of the element data multiplied by a constant, using the issuer public key and the first confidential data, sending the second confidential data to the issuer apparatus through the network, receiving, from the issuer apparatus through the network, information generated in the issuer apparatus and based on the element data corresponding to the second confidential data, and generating a member public key which is a public key corresponding to the user apparatus and a member secret key which is a secret key corresponding to the user apparatus, using the information based on the element data corresponding to the second confidential data, and writing the member public key and the member secret key into the user storage.

According to the present invention, a key issuing method for issuing a key to an additional member from an issuer apparatus in a group signature system including a user apparatus and the issuer apparatus connected to the user apparatus through a network, comprises reading an issuer public key and an issuer secret key from an issuer storage, performing a confidential text generating process for generating one or plural confidential texts by confidentializing data calculated from a part of the issuer public key using element data including information of an element of a group, sending first confidential data including the one or plural confidential texts to the user apparatus through the network, receiving, from the user apparatus through the network, second confidential data of a confidential text represented by the product of modulo-exponentiated element data corresponding to the confidential texts included in the first confidential data or a confidential text represented by the sum of the element data multiplied by a constant in the user apparatus, performing a to-be-sent data generating process for calculating g" representing data restored from the second confidential data and generating to-be-sent data from the g", and sending the to-be-sent data to the user apparatus through the network.

To achieve the above object, a group signature system according to the present invention comprises an issuer apparatus including an issuer storage for storing an issuer public key and an issuer apparatus controller for sending the issuer public key through a network, generating one or plural confidential texts which are produced by confidentializing the issuer public key using element data containing information of an element of a group, sending out first confidential data including the one or plural confidential texts through the network, and when second confidential data generated by confidentializing the first confidential data are received, generating element data of the second confidential data, and sending out information based on the element data through the network, and a user apparatus including a user storage for storing the issuer public key through the network, and a user apparatus controller for storing the issuer public key received from the issuer apparatus into the user storage, and when the first confidential data are received, generating the second confidential data of a confidential text represented by the product of modulo-exponentiated element data corresponding to the confidential texts included in the first confidential data or a confidential text represented by the sum of the element data multiplied by a constant, using the issuer public key and the first confidential data, sending the second confidential data to the issuer apparatus through the network, and when information based on the element data is received, generating a member public key which is a public key corresponding to the user apparatus and a member secret key which is a secret key corresponding to the user apparatus, and writing the member public key and the member secret key into the user storage.

According to the present invention, the issuer apparatus first generates data using the secret key of the issuer apparatus, and then the user apparatus processes the data into other data and proves the legitimacy of the processed data to the issuer apparatus. Since the issuer apparatus processes the data using the secret key thereof before the user apparatus proves the legitimacy of the data, the issuer apparatus is able to process data received from other user apparatus before it finishes its process of issuing a key to a single member.

To achieve the above object, there is provided in accordance with the present invention an information processing apparatus connected to an issuer apparatus storing an issuer public key therein through a network, comprising a storage for storing the issuer public key, and a controller for storing the issuer public key received from the issuer apparatus into the storage, and when first confidential data including one or plural confidential texts which are produced by confidentializing the issuer public key using element data containing information of an element of a group in the issuer apparatus are received from the issuer apparatus, generating the second confidential data of a confidential text represented by the product of modulo-exponentiated element data corresponding to the confidential texts included in the first confidential data or a confidential text represented by the sum of the element data multiplied by a constant, using the issuer public key and the first confidential data, sending the second confidential data to the issuer apparatus through the network, and when information based on the element data is received from the issuer apparatus, generating a member public key which is a public key corresponding to the user apparatus and a member secret key which is a secret key corresponding to the user apparatus using information based on the element data of the second confidential data, and writing the member public key and the member secret key into the storage.

According to the present invention, an information processing apparatus connected to a user apparatus of an additional user newly added to a group through a network, comprises a storage storing an issuer public key, and a controller for generating one or plural confidential texts by confidentializing data calculated from a part of the issuer key using element data including information of an element of a group, sending first confidential data including the one or plural confidential texts to the user apparatus, receiving, from the user apparatus, second confidential data of a confidential text represented by the product of modulo-exponentiated element data corresponding to the confidential texts included in the first confidential data or a confidential text represented by the sum of the element data multiplied by a constant in the user apparatus, calculating g" representing data restored from the second confidential data, generating to-be-sent data from the g", and sending the to-be-sent data to the user apparatus.

To achieve the above object, a program according to the present invention for being executed by a computer connected to an issuer apparatus storing an issuer public key therein through a network, enables the computer to perform a process comprising reading the issuer public key from the issuer apparatus through the network into a storage of the computer, receiving, from the issuer apparatus through the network, first confidential data including one or plural confidential texts which are produced by confidentializing the issuer public key using element data containing information of an element of a group in the issuer apparatus, generating second confidential data of a confidential text represented by the product of modulo-exponentiated element data corresponding to the confidential texts included in the first confidential data or a confidential text represented by the sum of the element data multiplied by a constant, using the issuer public key and the first confidential data, sending the second confidential data to the issuer apparatus through the network, receiving, from the issuer apparatus through the network, information generated in the issuer apparatus and based on the element data corresponding to the second confidential data, and generating a member public key which is a public key corresponding to the computer and a member secret key which is a secret key corresponding to the computer, using the information based on the element data corresponding to the second confidential data, and writing the member public key and the member secret key into the storage of the computer.

According to the present invention, a program for being executed by a computer connected to a user apparatus of an additional user newly added to a group through a network, enables the computer to perform a process comprising reading an issuer public key and an issuer secret key from a storage of the computer, performing a confidential text generating process for generating one or plural confidential texts by confidentializing data calculated from a part of the issuer public key using element data including information of an element of a group, sending first confidential data including the one or plural confidential texts to the user apparatus through the network, receiving, from the user apparatus through the network, second confidential data of a confidential text represented by the product of modulo-exponentiated element data corresponding to the confidential texts included in the first confidential data or a confidential text represented by the sum of the element data multiplied by a constant in the user apparatus, performing a to-be-sent data generating process for calculating g" representing data restored from the second confidential data and generating to-be-sent data from the g", and sending the to-be-sent data to the user apparatus through the network.

According to the present invention, as described above, since the issuer apparatus processes data using the secret key thereof before the user apparatus proves the legitimacy of the data, the safety of information is enhanced even when data are sent and received concurrently between a plurality of user apparatus and the issuer apparatus according to the join protocol.

DESCRIPTION OF REFERENCE CHARACTERS

Figure 1:
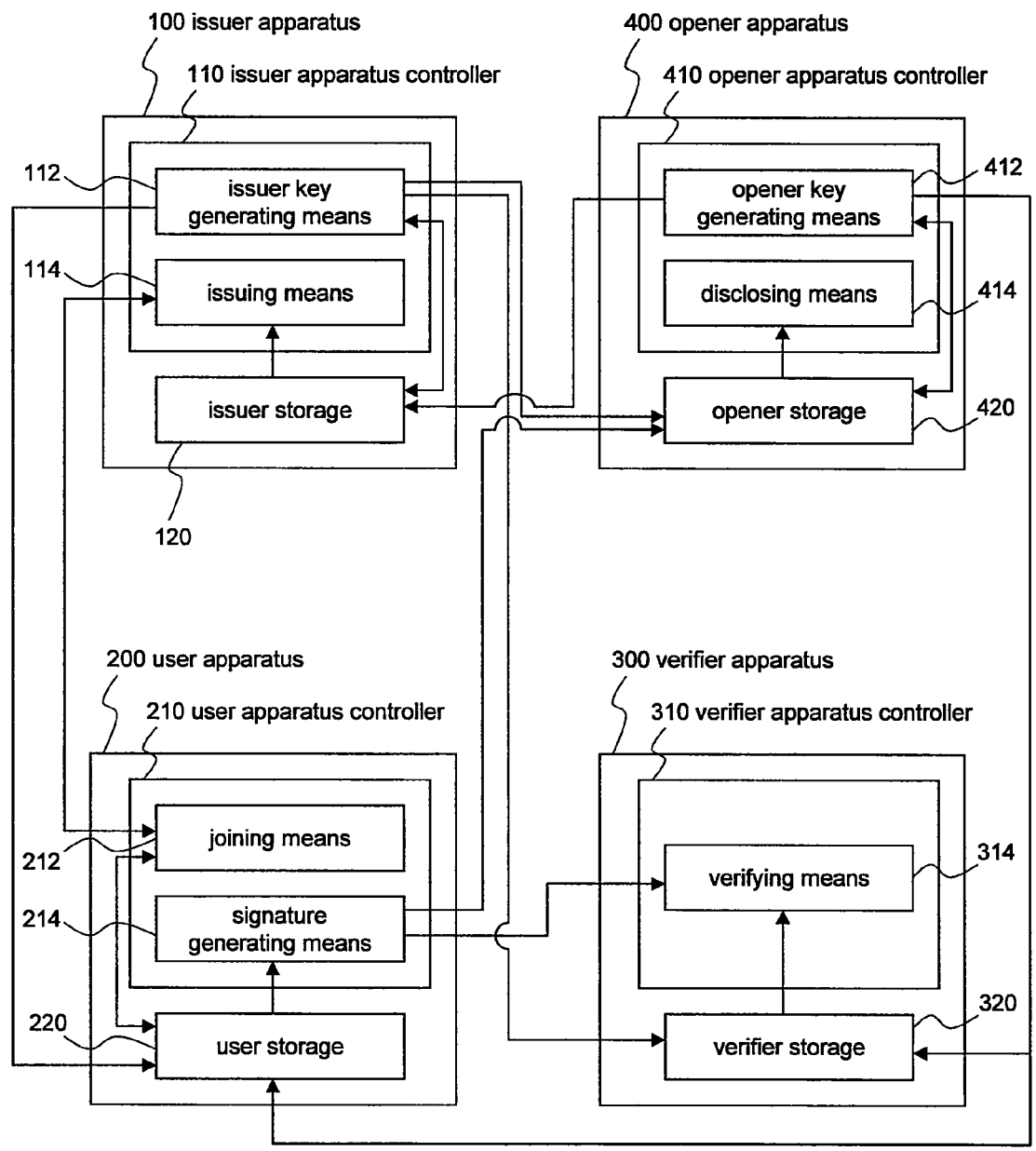
FIG. 1 is a block diagram showing a configuration of a group signature system.

100 issuer apparatus
110 issuer apparatus controller
120 issuer storage
200 user apparatus
210 user apparatus controller
220 user storage

DETAILED DESCRIPTION OF THE INVENTION

Exemplary Embodiment 1

Apparatus Configuration

A configuration of a group signature system according to the present exemplary embodiment will be described below. FIG. 1 is a block diagram showing a configuration of the group signature system. As shown in FIG. 1, the group signature system includes issuer apparatus 100 for issuing a key to a member of a group and user apparatus 200 to be operated by a member. Verifier apparatus 300 and opener apparatus 400 are connected to the group signature system. Issuer apparatus 100, user apparatus 200, verifier apparatus 300, and opener apparatus 400 are information processing apparatus having memories, controllers, etc.

Issuer apparatus 100 comprises issuer apparatus controller 110, issuer storage 120, and a communicator (not shown). Issuer apparatus controller 110 comprises issuer key generating means 112 and issuing means 114. User apparatus 200 comprises user apparatus controller 210, user storage 220, and a communicator (not shown). User apparatus controller 210 comprises joining means 212 and signature generating means 214.

Verifier apparatus 300 comprises verifier apparatus controller 310, verifier storage 320, and a communicator (not shown). Verifier apparatus controller 310 comprises verifying means 314. Opener apparatus 400 comprises opener apparatus controller 410, opener storage 420, and a communicator (not shown). Opener apparatus controller 410 comprises opener key generating means 412 and disclosing means 414.

The controller of each of the apparatus controls the communicator and the storage and performs data processing operation. The controller comprises a CPU (Central Processing Unit) for carrying predetermined processing sequences according to programs and a memory for storing the programs.

Issuer apparatus 100, user apparatus 200, verifier apparatus 300, and opener apparatus 400 are interconnected for mutual communications by communication networks such as the Internet and a LAN (Local Area Network). The communication networks may be wired or wireless, or the combination of these. In FIG. 1, the communicators of the apparatus are omitted from illustration for an easier understanding of the flow of information between the apparatus.

Issuer storage 120, user storage 220, verifier storage 320, and opener storage 420 may be hard disks, semiconductor memories, etc.

It is assumed that the storages of the apparatus have been supplied with security parameters l_n, l_E, l_Q, l_c, l_e, l_s in advance. The storages may be supplied with l_n, l_E, l_Q, l_c, l_e, l_s in any ways. It is assumed that Γ represents a cyclic group of order Q and the number of bits of Q is l_Q bits. A multiplicative group of (Z/PZ), an elliptic curve group, or the like may be used as Γ. Here, Γ as a multiplicative group of (Z/PZ) will be described below. It is also assumed that Z or (Z/QZ) is referred to as a cyclic group.

Furthermore, it is assumed that the storages of the apparatus have been supplied with a parameter descriptive of Γ, and Q in advance. The storages of the apparatus may be supplied with the parameter descriptive of Γ, and Q in any ways.

Issuer apparatus 100 is implemented by a general computer comprising an input device, an output device, a storage, and a controller. Issuer key generating means 112 and issuing means 114 are virtually constructed in the computer when the CPU executes programs. The same holds true for user apparatus 200, verifier apparatus 300, and opener apparatus 400.

In issuer apparatus 100, user apparatus 200, and opener apparatus 400, the CPU of each of the controllers thereof executes programs to randomly select elements of multiplicative group r, elements of cyclic group (Z/QZ), and elements of (Z/nZ) as information which should be confidential. n in (Z/nZ) will be described in next [Issuer key generating sequence ISS-GEN]. One process of randomly selecting an element from a plurality of elements may use random numbers, for example.

A key issuing method carried out by the group signature system according to the present exemplary embodiment will be described below. In the present exemplary embodiment, the issuer apparatus encrypts information to be confidentialized to provide confidentiality. Information which has been confidentialized by a confidentializing process such as encrypting will be referred to as confidential text. Data containing information of an element are referred to as element data. According to the encrypting process, data containing information of an element correspond to plaintext.

Figure 2:
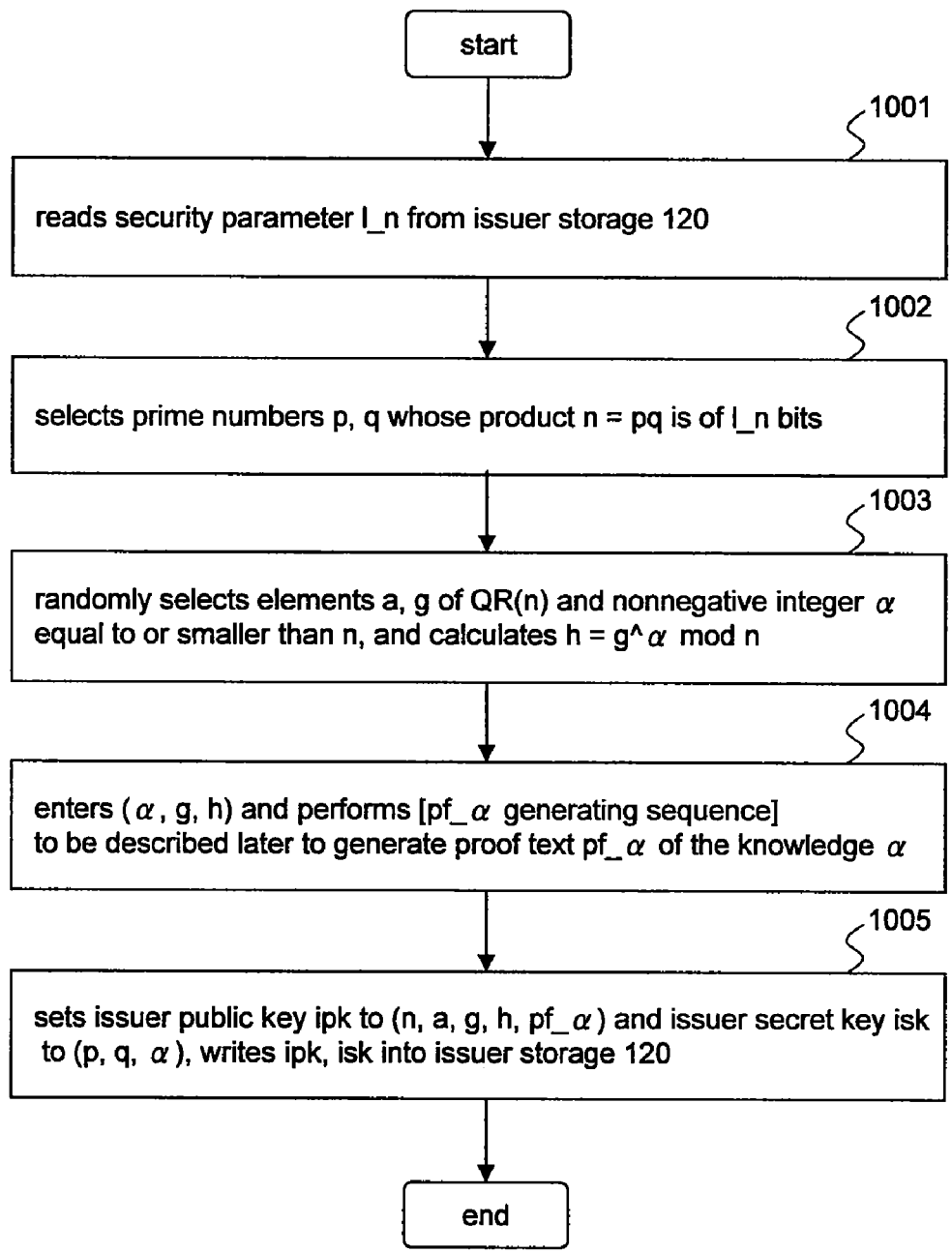
FIG. 2 is a flowchart of an issuer key generating sequence according to Exemplary Embodiment 1.

[Issuer Key Generating Sequence ISS-GEN]:

Issuer key generating sequence ISS-GEN performed by issuer key generating means 112 will be described below. FIG. 2 is a flowchart of the issuer key generating sequence. As shown in FIG. 2, issuer apparatus 100 performs the following ISS-GEN1, . . . , ISS-GEN5 sequentially:

ISS-GEN1: Issuer key generating means 112 reads security parameter I_n from issuer storage 120 (step 1001).

ISS-GEN2: Issuer key generating means 112 selects prime numbers p, q whose product n=pq is of I_n bits (step 1002).

ISS-GEN3: Issuer key generating means 112 randomly selects elements a, g of QR(n) and nonnegative integer α equal to or smaller than n, and calculates h=g^α mod n (step 1003).

ISS-GEN4: Issuer key generating means 112 enters (α, g, h) and performs [pf_α generating sequence] to be described later to generate proof text pf_α of the knowledge a (step 1004).

ISS-GEN5: Issuer key generating means 112 sets issuer public key ipk to (n, a, g, h, pf_α) and issuer secret key isk to (p, q, α), writes ipk, isk into issuer storage 120 (step 1005), whereupon issuer key generating means 112 puts issuer key generating sequence ISS-GEN to an end.

Issuer public key ipk is disclosed to all the apparatus in some way. For example, one way to disclose ipk may be putting it on a public bulletin board on the Internet. Any methods may be used to disclose ipk. User apparatus controller 210 of user apparatus 200 stores disclosed issuer public key ipk in user storage 220.

[Opener Key Generating Sequence OPN-GEN]

Figure 3:
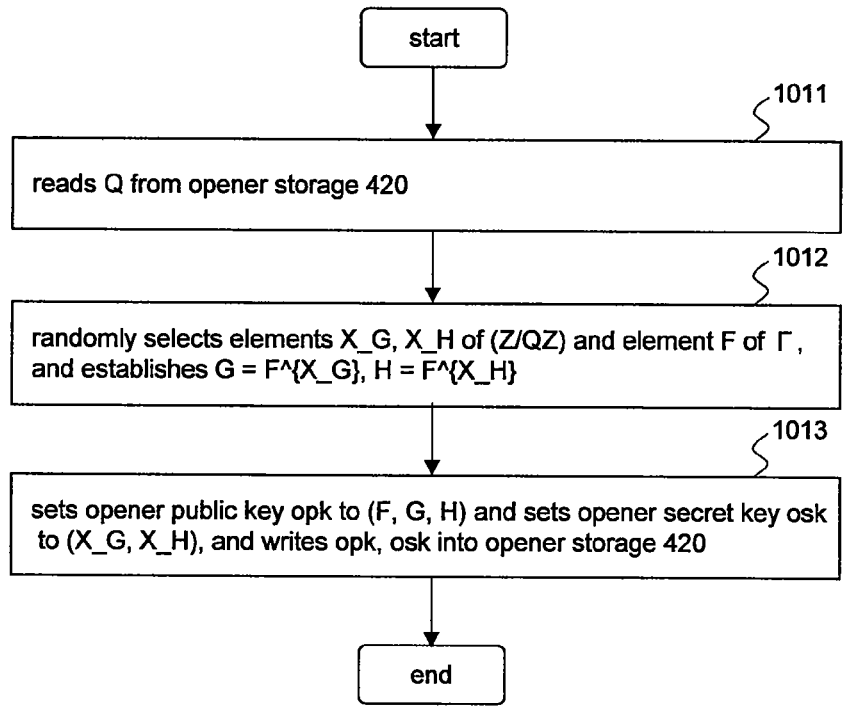
FIG. 3 is a flowchart of an opener key generating sequence according to Exemplary Embodiment 1.

Opener key generating sequence OPN-GEN performed by opener key generating means 412 will be described below. FIG. 3 is a flowchart of the opener key generating sequence. As shown in FIG. 3, opener apparatus 400 performs the following OPN-GEN1, OPN-GEN2, OPN-GEN3 sequentially:

OPN-GEN1: Opener key generating means 412 reads Q from opener storage 420 (step 1011).

OPN-GEN2: Opener key generating means 412 randomly selects elements X_G, X_H of (Z/QZ) and element F of ⌈, and establishes G=F^{X_G}, H=F^{X_H} (step 1012).

OPN-GEN3: Opener key generating means 412 sets opener public key opk to (F, G, H) and sets opener secret key osk to (X_G, X_H), and writes opk, osk into opener storage 420 (step 1013), whereupon opener key generating means 412 puts opener key generating sequence OPN-GEN to an end.

Opener public key opk is disclosed to all the apparatus in some way. For example, one way to disclose opk may be putting it on a public bulletin board on the Internet. Any methods may be used to disclose opk. User apparatus controller 210 of user apparatus 200 stores disclosed opener public key opk in user storage 220. Issuer apparatus controller 110 of issuer apparatus 100 stores disclosed opener public key opk in issuer storage 120.

[Issuing Sequence ISS-ISSUE and Joining Sequence USR-JOIN]

Issuer apparatus 100 and user apparatus 200 perform issuing sequence ISS-ISSUE and joining sequence USR-JOIN, respectively, while communicating with each other.

First, issuer apparatus 100 performs [Issuing sequence 1 ISS-ISSUE-1] to be described later, and then user apparatus 200 performs [Joining sequence 1 USR-JOIN-1] to be described later. Issuer apparatus 100 performs [Issuing sequence 2 ISS-ISSUE-2] to be described later, and finally user apparatus 200 performs [Joining sequence 2 USR-JOIN-2] to be described later.

During the above sequences, member public key upk and member secret key usk are generated.

Member public key upk is disclosed to all the apparatus in some way. For example, one way to disclose upk may be putting it on a public bulletin, board on the Internet. Any methods may be used to disclose upk.

[Signature Sequence USR-SIGN]

When signature generating means 214 has received message m as an input, signature generating means 214 performs Sign(m, vk, sk) according to Non-patent document 1 as vk=ipk, sk=(vk, usk) to obtain signature text σ for m.

[Verifying Sequence VER-VERIFY]

When verifying means 314 has received message m and signature text a for m, verifying means 314 performs Verify (vk, m, σ) according to Non-patent document 1 as vk=ipk.

[Opening Sequence OPN-OPEN]

When opening means 414 has received message m and signature text σ for m, opening means 414 performs Open (gusk, m, σ) according to Non-patent document 1 as gusk= (ipk, opk).

[Issuing Sequence 1 ISS-ISSUE-1]

Figure 4:
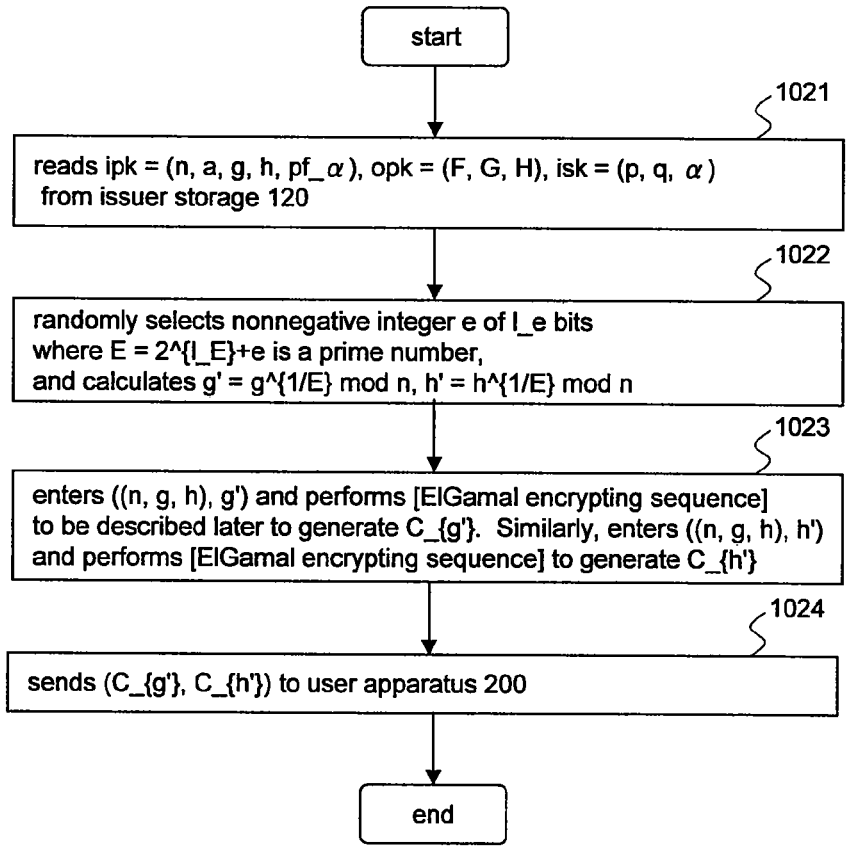
FIG. 4 is a flowchart of an issuing sequence 1 according to Exemplary Embodiment 1.

Issuing sequence 1 ISS-ISSUE-1 performed by issuing means 114 will be described below. FIG. 4 is a flowchart of issuing sequence 1. As shown in FIG. 4, issuer apparatus 100 performs the following ISS-ISSUE-1-1, . . . , ISS-ISSUE-1-4 sequentially:

ISS-ISSUE-1-1: Issuing means 114 reads ipk=(n, a, g, h, pf_α), opk=(F, G, H), isk=(p, q, α) from issuer storage 120 (step 1021).

ISS-ISSUE-1-2: Issuing means 114 randomly selects nonnegative integer e of I_e bits where E=2^{I_E}+e is a prime number, and calculates g'=g^{1/E} mod n, h'=h^{1/E} mod n (step 1022).

ISS-ISSUE-1-3: Issuing means 114 enters ((n, g, h), g') and performs [ElGamal encrypting sequence] to be described later to generate C_{g'}. Similarly, issuing means 114 enters ((n, g, h), h') and performs [ElGamal encrypting sequence] to generate C_{h'} (step 1023).

ISS-ISSUE-1-4: Issuing means 114 sends (C_{g'}, C_{h'}) to user apparatus 200 (step 1024).

[Joining Sequence 1 USR-JOIN-1]

Figure 5:
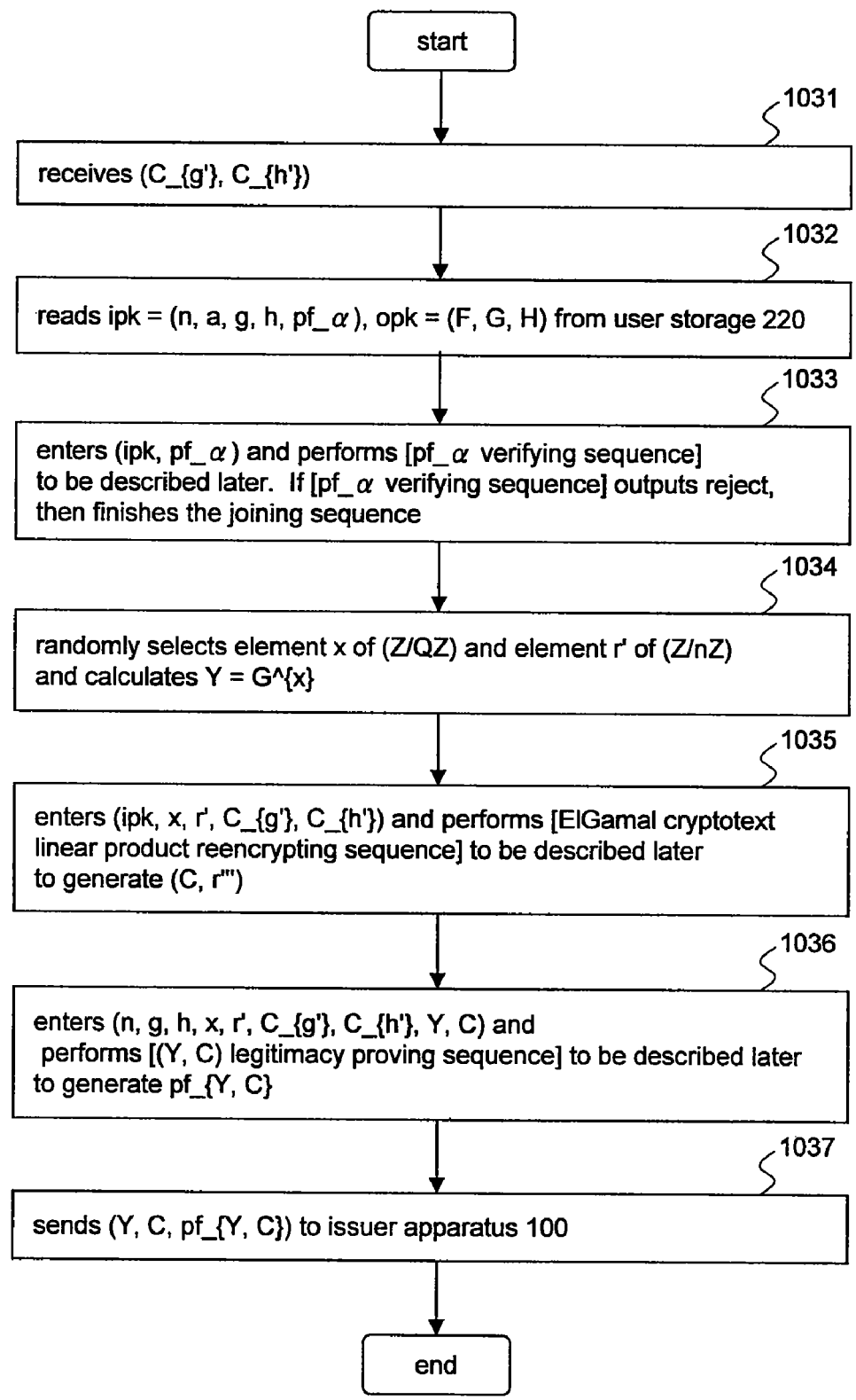
FIG. 5 is a flowchart of a joining sequence 1 according to Exemplary Embodiment 1.

Joining sequence 1 USR-JOIN-1 performed by joining means 212 will be described below. FIG. 5 is a flowchart of joining sequence 1. As shown in FIG. 5, user apparatus 200 performs the following USR-JOIN-1-1, . . . , USR-JOIN-1-7 sequentially:

USR-JOIN-1-1: Joining means 212 receives ($C\_\{g'\}$, $C\_\{h'\}$) (step 1031).

USR-JOIN-1-2: Joining means 212 reads ipk=(n, a, g, h, pf_α), opk=(F, G, H) from user storage 220 (step 1032).

USR-JOIN-1-3: Joining means 212 enters (ipk, pf_α) and performs is [pf_α verifying sequence] to be described later. If [pf_α verifying sequence] outputs reject, then joining means 212 finishes the joining sequence (step 1033).

USR-JOIN-1-4: Joining means 212 randomly selects element x of (Z/QZ) and element r' of (Z/nZ) and calculates $Y=G^\{x\}$ (step 1034). USR-JOIN-1-5: Joining means 212 enters (ipk, x, r', $C\_\{g'\}$, $C\_\{h'\}$) and performs [ElGamal cryptotext linear product reencrypting sequence] to be described later to generate (C, (step 1035).

USR-JOIN-1-6: Joining means 212 enters (n, g, h, x, r', $C\_\{g'\}$, $C\_\{h'\}$, Y, C) and performs [(Y, C) legitimacy proving sequence] to be described later to generate $pf\_\{Y, C\}$ (step 1036).

USR-JOIN-1-7: Joining means 212 sends (Y, C, $pf\_\{Y, C\}$) to issuer apparatus 100 (step 1037).

[Issuing Sequence 2 ISS-ISSUE-2]

Figure 6:
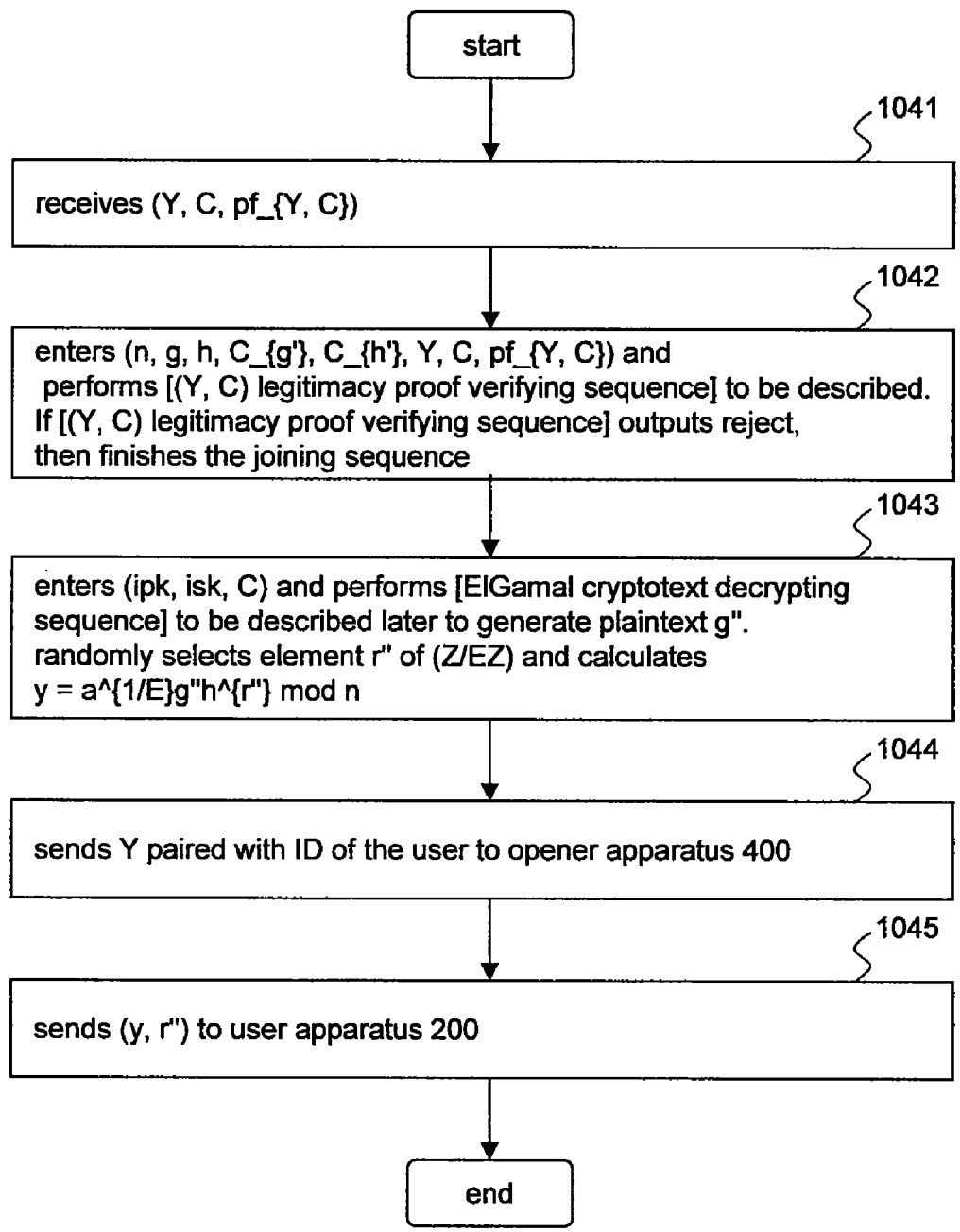
FIG. 6 is a flowchart of an issuing sequence 2 according to Exemplary Embodiment 1.

Issuing sequence 2 ISS-ISSUE-2 performed by issuing means 114 will be described below. FIG. 6 is a flowchart of issuing sequence 2. As shown in FIG. 6, issuer apparatus 100 performs the following ISS-ISSUE-2-1, . . . , ISS-ISSUE-2-5 sequentially:

ISS-ISSUE-2-1: Issuing means 114 receives (Y, C, $pf\_\{Y, C\}$) (step 1041).

ISS-ISSUE-2-2: Issuing means 114 enters (n, g, h, $C\_\{g'\}$, $C\_\{h'\}$, Y, C, $pf\_\{Y, C\}$) and performs [(Y, C) legitimacy proof verifying sequence] to be described. If [(Y, C) legitimacy proof verifying sequence] outputs reject, then issuing means 114 finishes the joining sequence (step 1042).

ISS-ISSUE-2-3: Issuing means 114 enters (ipk, ask, C) and performs [ElGamal cryptotext decrypting sequence] to be described later to generate plaintext g". Issuing means 114 randomly selects element r" of (Z/EZ) and calculates $y=a^\{1/E\}g"h^\{r"\}$ mod n (step 1043).

ISS-ISSUE-2-4: Issuing means 114 sends Y paired with ID of the user to opener apparatus 400 (step 1044).

ISS-ISSUE-2-5: Issuing means 114 sends (y, r") to user apparatus 200 (step 1045), and then puts the issuing sequence to an end.

[Joining Sequence 2 USR-JOIN-2]

Figure 7:
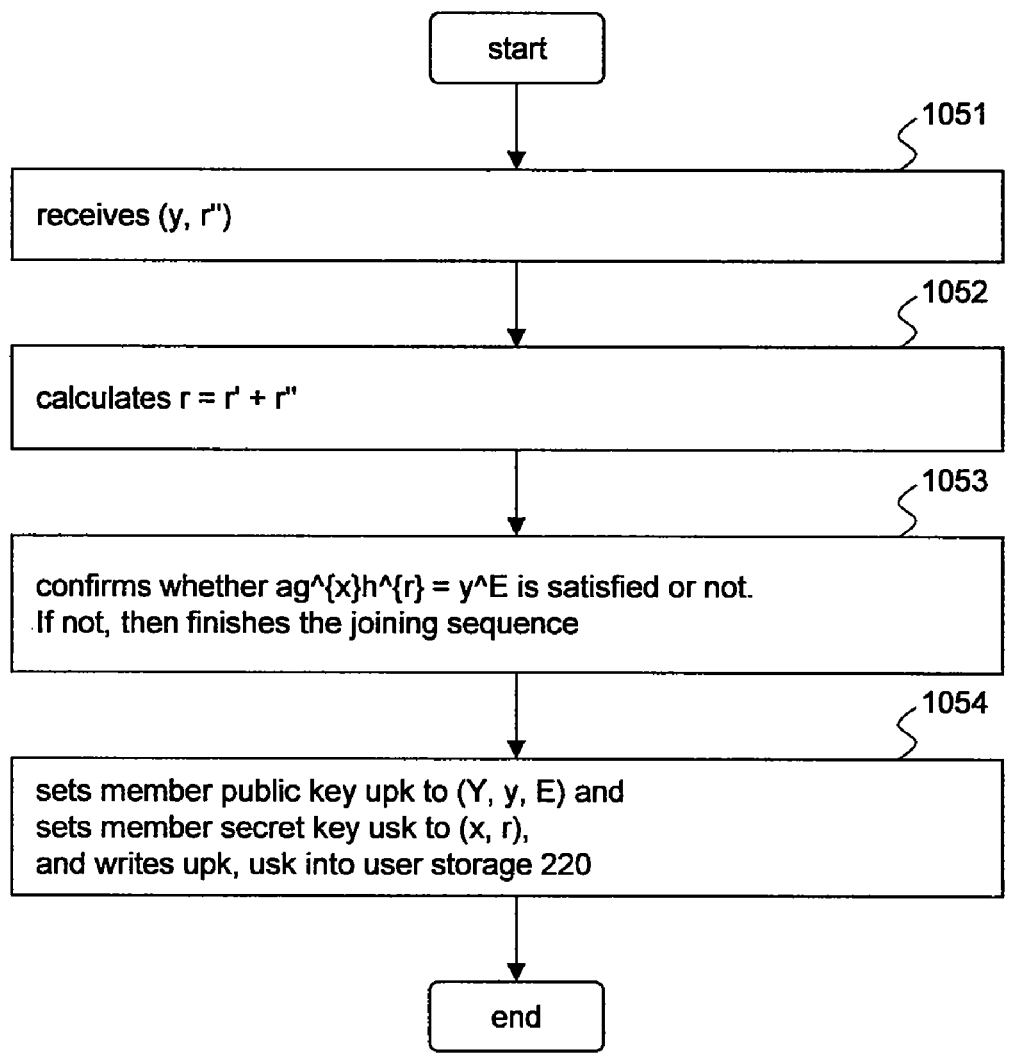
FIG. 7 is a flowchart of a joining sequence 2 according to Exemplary Embodiment 1.

Joining sequence 2 USR-JOIN-2 performed by joining means 212 will be described below. FIG. 7 is a flowchart of joining sequence 2. As shown in FIG. 7, user apparatus 200 performs the following USR-JOIN-2-1, . . . , USR-JOIN-2-4 sequentially:

USR-JOIN-2-1: Joining means 212 receives (y, r") (step 1051).

USR-JOIN-2-2: Joining means 212 calculates r=r'+r" (step 1052).

USR-JOIN-2-3: Joining means 212 confirms whether $ag^\{x\}h^\{r\}=y^E$ is satisfied or not. If not, then joining means 212 finishes the joining sequence (step 1053).

USR-JOIN-2-4: If satisfied, then joining means 212 sets member public key upk to (Y, y, E) and sets member secret key usk to (x, r), and writes upk, usk into user storage 220 (step 1054). Then, joining means 212 puts the joining sequence to an end.

[pf_α Generating Sequence]

Figure 8:
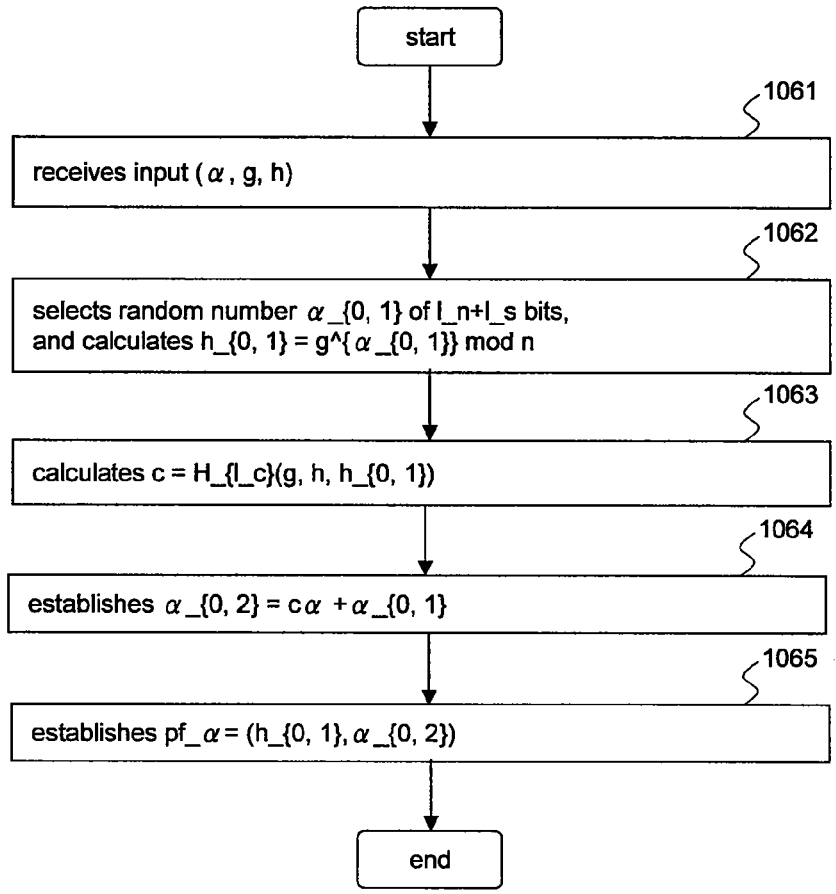
FIG. 8 is a flowchart of a pf_α generating sequence.

A pf_α generating sequence performed by issuer apparatus controller 110 will be described below. FIG. 8 is a flowchart of the pf_α generating sequence. As shown in FIG. 8, issuer apparatus 100 performs the following pf_α-GEN-1, . . . , pf_α-GEN-5 sequentially:

pf_α-GEN-1: Issuer apparatus controller 110 receives input (α, g, h) (step 1061).

pf_α-GEN-2: Issuer apparatus controller 110 selects random number $α\_\{0, 1\}$ of $I\_n+I\_s$ bits, and calculates $h\_\{0, 1\}=g^\{α\_\{0, 1\}\}$ mod n (step 1062).

A hash function which outputs the rows of bits that are I_c bits, is described as $H\_\{I\_c\}$.

pf_α-GEN-3: Issuer apparatus controller 110 calculates $c=H\_\{I\_c\}(g, h, h\_\{0, 1\})$ (step 1063).

pf_α-GEN-4: Issuer apparatus controller 110 establishes $α\_\{0, 2\}=cα+α\_\{0, 1\}$ (step 1064).

pf_α-GEN-5: Issuer apparatus controller 110 establishes $pf\_α=(h\_\{0, 1\}, α\_\{0, 2\})$ (step 1065).

[pf_α Verifying Sequence]

Figure 9:
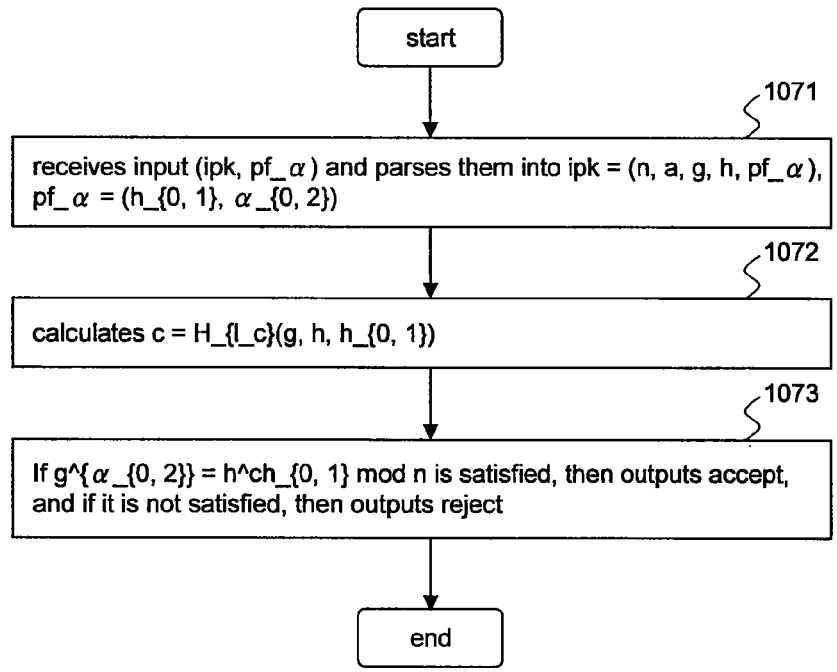
FIG. 9 is a flowchart of a pf_α verifying sequence.

A pf_α verifying sequence performed by user apparatus controller 210 will be described below. FIG. 9 is a flowchart of the pf_α verifying sequence. As shown in FIG. 9, user apparatus 200 performs the following pf_α-VER-1, . . . , pf_α-GEN-3 sequentially:

pf_α-VER-1: User apparatus controller 210 receives input (ipk, pf_α) and parses them into ipk=(n, a, g, h, pf_α), $pf\_α=(h\_\{0, 1\}, α\_\{0, 2\})$ (step 1071).

pf_α-VER-2: User apparatus controller 210 calculates $c=H\_\{I\_c\}(g, h, h\_\{0, 1\})$ (step 1072).

pf_α-GEN-3: If $g^\{α\_\{0, 2\}\}=h^c h\_\{0, 1\}$ mod n is satisfied, then user apparatus controller 210 outputs accept, and if it is not satisfied, then user apparatus controller 210 outputs reject (step 1073).

[ElGamal Encrypting Sequence]

Figure 10:
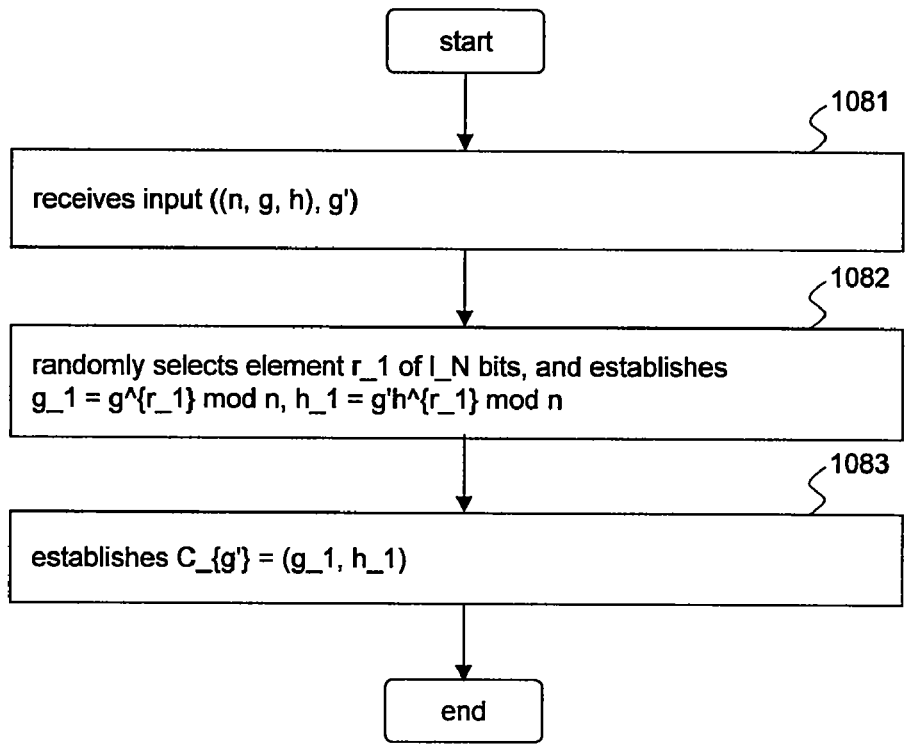
FIG. 10 is a flowchart of an ElGamal encrypting sequence.

An ElGamal encrypting sequence performed by issuer apparatus controller 110 will be described below. FIG. 10 is a flowchart of the ElGamal encrypting sequence. As shown in FIG. 10, issuer apparatus 100 performs the following ELGAMAL-ENC-1, . . . , ELGAMAL-ENC-3 sequentially:

ELGAMAL-ENC-1: Issuer apparatus controller 110 receives input ((n, g, h), g') (step 1081).

ELGAMAL-ENC-2: Issuer apparatus controller 110 randomly selects element $r\_1$ of $I\_N$ bits, and establishes $g\_1=g^\{r\_1\}$ mod n, $h\_1=g'h^\{r\_1\}$ mod n (step 1082).

ELGAMAL-ENC-3: Issuer apparatus controller 110 establishes $C\_\{g'\}=(g\_1, h\_1)$ (step 1083).

[ElGamal Cryptotext Linear Product Reencrypting Sequence]

Figure 11:
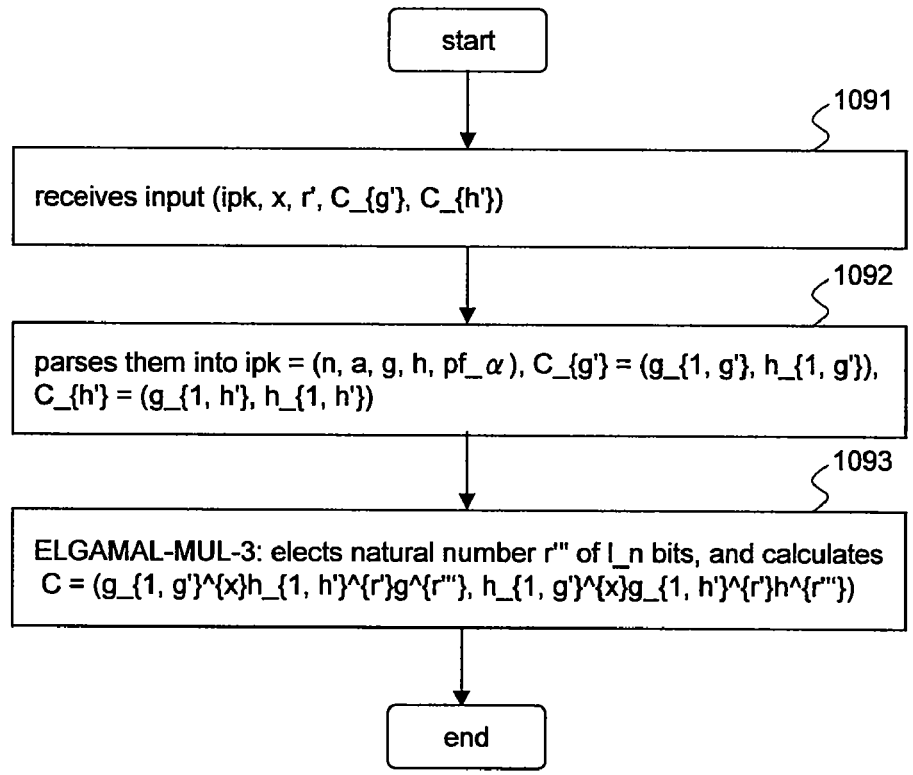
FIG. 11 is a flowchart of an ElGamal cryptotext linear product reencrypting sequence.

An ElGamal cryptotext linear product reencrypting sequence performed by issuer apparatus controller 110 will be described below. FIG. 11 is a flowchart of the ElGamal cryptotext linear product reencrypting sequence. As shown in FIG. 11, issuer apparatus 100 performs the following ELGAMAL-MUL-1, . . . , 3 sequentially:

ELGAMAL-MUL-1: Issuer apparatus controller 110 receives input (ipk, x, r', $C\_\{g'\}$, $C\_\{h'\}$) (step 1091).

ELGAMAL-MUL-2: Issuer apparatus controller 110 parses them into ipk=(n, a, g, h, pf_α), $C\_\{g'\}=(g\_\{1, g'\}, h\_\{1, g'\})$, $C\_\{h'\}=(g\_\{1, h'\}, h\_\{1, h'\})$ (step 1092).

ELGAMAL-MUL-3: Issuer apparatus controller 110 elects natural number r'" of $I\_n$ bits, and calculates $C=(g\_\{1, g'\}^\{x\}h\_\{1, h'\}^\{e\}g^\{r\}, h\_\{1, g'\}^\{x\}g\_\{1, h'\}^\{e\}h^\{r'"\})$ (step 1093).

[ElGamal Cryptotext Decrypting Sequence]

Figure 12:
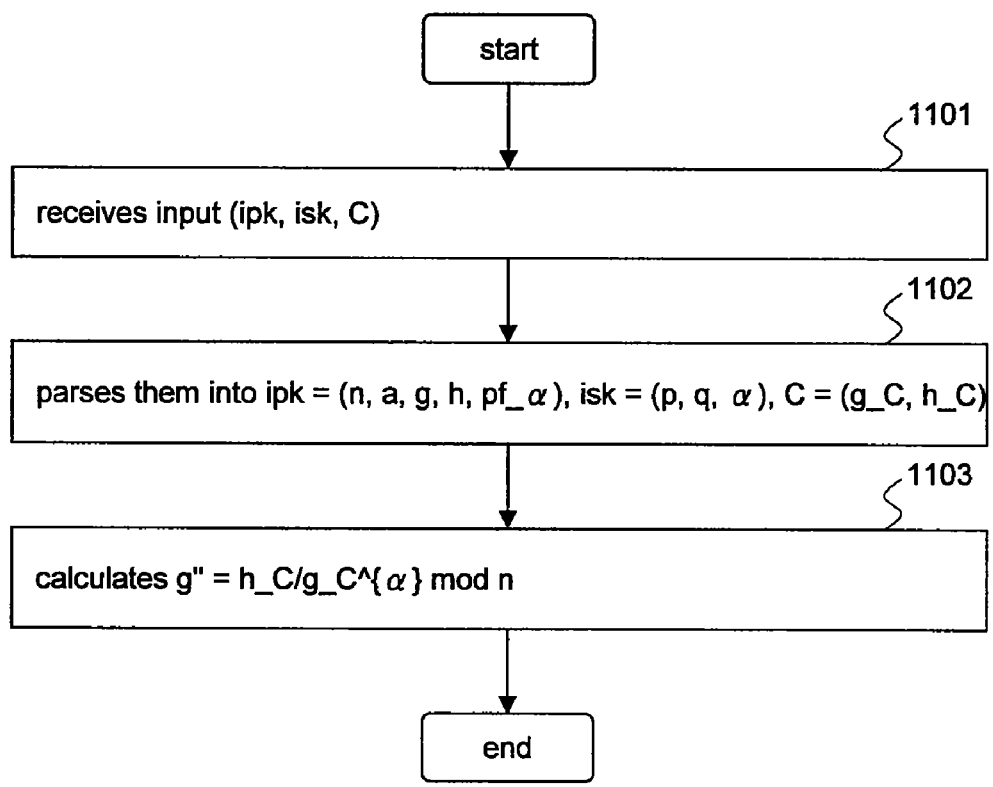
FIG. 12 is a flowchart of an ElGamal cryptotext decrypting sequence.

An ElGamal cryptotext decrypting sequence performed by issuer apparatus controller 110 will be described below. FIG. 12 is a flowchart of the ElGamal cryptotext decrypting sequence. As shown in FIG. 12, issuer apparatus controller 110 performs the following ELGAMAL-DEC-1, . . . , ELGAMAL-DEC-3 sequentially:

ELGAMAL-DEC-1: Issuer apparatus controller 110 receives input (ipk, isk, C) (step 1101).

ELGAMAL-DEC-2: Issuer apparatus controller 110 parses them into ipk=(n, a, g, h, pf_α), isk=(p, q, α), C=(g_C, h_C) (step 1102).

ELGAMAL-DEC-3: Issuer apparatus controller 110 calculates $g''=h\_C/g\_C^{\{\alpha\}}$ mod n (step 1103).

[(Y, C) Legitimacy Proving Sequence]

Figure 13:
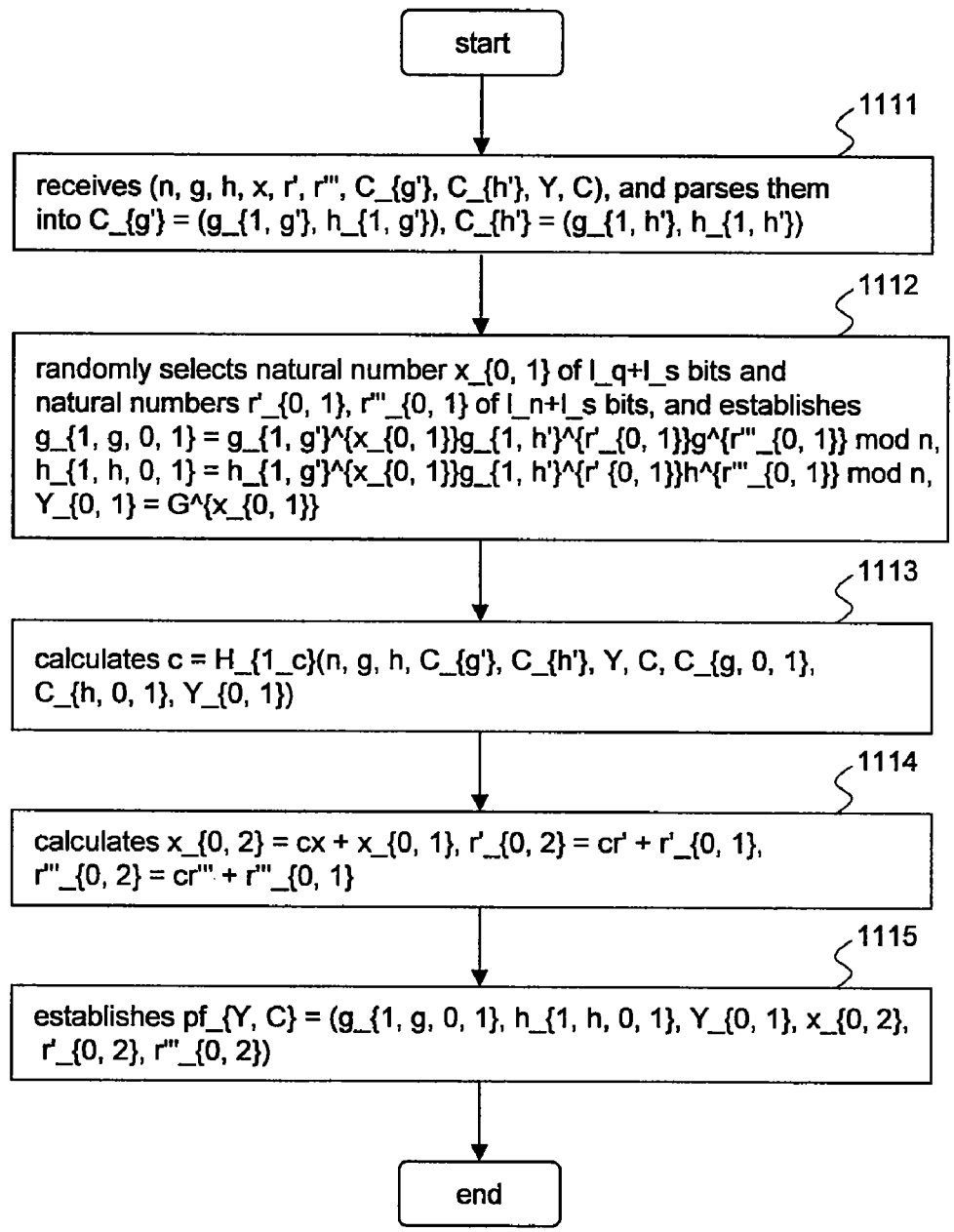
FIG. 13 is a flowchart of a (Y, C) legitimacy proving sequence.

A (Y, C) legitimacy proving sequence performed by user apparatus controller 210 will be described below. FIG. 13 is a flowchart of the (Y, C) legitimacy proving sequence. As shown in FIG. 13, user apparatus 200 performs the following PF-YC-GEN-1, . . . , PF-YC-GEN-5 sequentially:

PF-YC-GEN-1: User apparatus controller 210 receives (n, g, h, x, r', r''', C_{g'}, C_{h'}, Y, C), and parses them into C_{g'}=(g_{1, g'}, h_{1, g'}), C_{h'}=(g_{1, h'}, h_{1, h'}) (step 1111).

PF-YC-GEN-2: User apparatus controller 210 randomly selects natural number x_{0, 1} of I_q+I_s bits and natural numbers r'_{0, 1}, r'''_{0, 1} of I_n+I_s bits, and establishes g_{1, g, 0, 1}=g_{1, g'}^{x_{0, 1}}g_{1, h'}^{r'_{0, 1}}g^{r'''_{0, 1}} mod n, h_{1, h, 0, 1}=h_{1, g'}^{x_{0, 1}}h_{1, h'}^{r'{0, 1}}h^{r'''_{0, 1}} mod n, Y_{0, 1}=G^{x_{0, 1}} (step 1112).

PF-YC-GEN-3: User apparatus controller 210 calculates c=H_{1_c}(n, g, h, C_{g'}, C_{h'}, Y, C, C_{g, 0, 1}, C_{h, 0, 1}, Y_{0, 1}) (step 1113).

PF-YC-GEN-4: User apparatus controller 210 calculates x_{0, 2}=cx+x_{0, 1}, r'_{0, 2}=cr'+r'_{0, 1}, r'''_{0, 2}=cr'''+r'''_{0, 1} (step 1114).

PF-YC-GEN-5: User apparatus controller 210 establishes pf_{Y, C}=(g_{1, g, 0, 1}, h_{1, h, 0, 1}, Y_{0, 1}, x_{0, 2}, r'_{0, 2}, r'''_{0, 2}) (step 1115).

[(Y, C) Legitimacy Proof Verifying Sequence]

Figure 14:
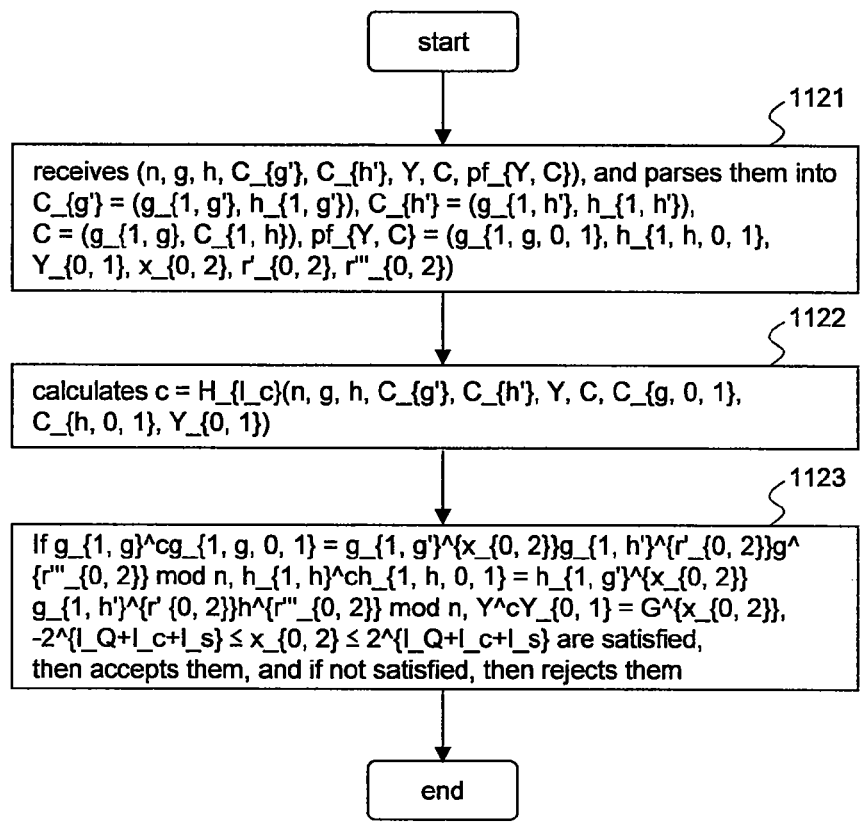
FIG. 14 is a flowchart of a (Y, C) legitimacy proof verifying sequence.

A (Y, C) legitimacy proof verifying sequence performed by issuer apparatus controller 110 will be described below. FIG. 14 is a flowchart of the (Y, C) legitimacy proof verifying sequence. As shown in FIG. 14, issuer apparatus 100 performs the following PF-YC-VER-1, . . . , PF-YC-VER-3 sequentially:

PF-YC-VER-1: Issuer apparatus controller 110 receives (n, g, h, C_{g'}, C_{h'}, Y, C, pf_{Y, C}), and parses them into C_{g'}=(g_{1, g'}, h_{1, g'}), C_{h'}=(g_{1, h'}, h_{1, h'}), C=(g_{1, g}, C_{1, h}), pf_{Y, C}=(g_{1, g, 0, 1}, h_{1, h, 0, 1}, Y_{0, 1}, x_{0, 2}, r'_{0, 2}, r'''_{0, 2}) (step 1121).

PF-YC-VER-2: Issuer apparatus controller 110 calculates c=H_{I_c}(n, g, h, C_{y}, C_{h'}, Y, C, C_{g, 0, 1}, C_{h, 0, 1}, Y_{0, 1}) (step 1122).

PF-YC-VER-3: If $g\_\{1, g\}^c g\_\{1, g, 0, 1\} = g\_\{1, g'\}^{\{x\_\{0, 2\}\}} g\_\{1, h'\}^{\{r'\_\{0, 2\}\}} g^{\{r'''\_\{0, 2\}\}}$ mod n, $h\_\{1, h\}^c h\_\{1, h, 0, 1\} = h\_\{1, g'\}^{\{x\_\{0, 2\}\}} g\_\{1, h'\}^{\{r'\{0, 2\}\}} h^{\{r'''\_\{0, 2\}\}}$ mod n, $Y^c Y\_\{0, 1\} = G^{\{x\_\{0, 2\}\}}$, $-2^{\{I\_Q+I\_c+I\_s\}} \leq x\_\{0, 2\} \leq 2^{\{I\_Q+I\_c+I\_s\}}$ are satisfied, then issuer apparatus controller 110 accepts them, and if not satisfied, then issuer apparatus controller 110 rejects them (step 1123).

With the method of issuing a key to an additional member and the group signature system according to the present exemplary embodiment, the issuer apparatus first generates first confidential data using the secret key of the issuer apparatus, and then the user apparatus processes the first confidential data into second confidential data and proves the processed data to the issuer apparatus. Unlike the group signature apparatus of the background art, the issuer apparatus processes the data using the secret key of the issuer apparatus before the user apparatus proves the legitimacy of the data. Therefore, the safety of information is enhanced even when data are sent and received concurrently between a plurality of user apparatus and the issuer apparatus according to the join protocol.

Exemplary Embodiment 2

Apparatus Configuration

A group signature system according to the present exemplary embodiment will be described below. The configuration of the system will not be described in detail below as it is the same as the system described in Exemplary Embodiment 1. Processing details which are different from those of Exemplary Embodiment 1 will be described below.

It is assumed that the storages of the apparatus have been supplied with security parameter k in advance. The storages may be supplied with k in any ways.

It is assumed that $\lceil\_1, \lceil\_2, \lceil\_T$ represent cyclic groups of order p, bilinear mapping e from $\lceil\_1 \times \lceil\_2$ onto $\lceil\_T$ is defined, and the number of bits of p is k. It is also assumed that r represents a cyclic group of order p.

Furthermore, it is assumed that the storages of the apparatus have been supplied with parameters descriptive of $\lceil\_1, \lceil\_2, \lceil\_T$, and p in advance. The storages of the apparatus may be supplied with the parameters descriptive of $\lceil\_1, \lceil\_2, \lceil\_T$, and p in any ways.

A key issuing method carried out by the group signature system according to the present exemplary embodiment will be described below. In the present exemplary embodiment, the issuer apparatus encrypts information to be confidentialized to provide confidentiality, as with Exemplary Embodiment 1.

Figure 15:
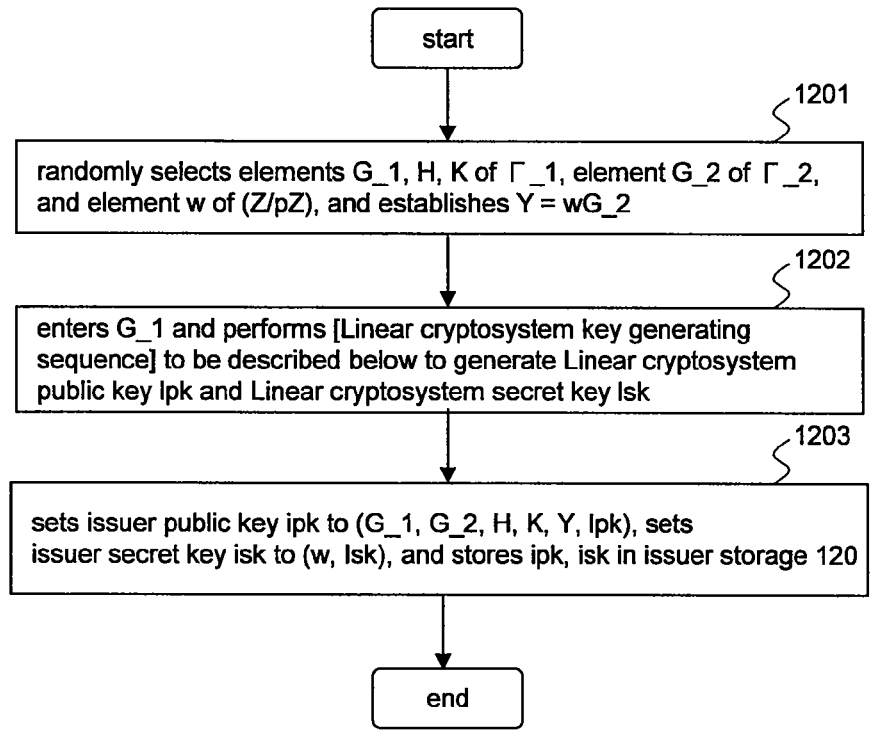
FIG. 15 is a flowchart of an issuer key generating sequence according to Exemplary Embodiment 2.

[Issuer Key Generating Sequence ISS-GEN]:

Issuer key generating sequence ISS-GEN performed by issuer key generating means 112 will be described below. FIG. 15 is a flowchart of the issuer key generating sequence. As shown in FIG. 15, issuer apparatus 100 performs the following ISS-GEN-1, . . . , ISS-GEN-3 sequentially:

ISS-GEN-1: Issuer key generating means 112 randomly selects elements G_1, H, K of $\lceil\_1$, element G_2 of $\lceil\_2$, and element w of (Z/pZ), and establishes Y=wG_2 (step 1201).

ISS-GEN-2: Issuer key generating means 112 enters G_1 and performs [Linear cryptosystem key generating sequence] to be described below to generate Linear cryptosystem public key Ipk and Linear cryptosystem secret key Isk (step 1202).

ISS-GEN-3: Issuer key generating means 112 sets issuer public key ipk to (G_1, G_2, H, K, Y, Ipk), sets issuer secret key isk to (w, Isk), and stores ipk, isk in issuer storage 120 (step 1203).

Issuer public key ipk is disclosed to all the apparatus in some way. For example, one way to disclose ipk may be putting it on a public bulletin board on the Internet. Any methods may be used to disclose ipk. User apparatus controller 210 of user apparatus 200 stores disclosed issuer public key ipk in user storage 220.

[Opener Key Generating Sequence OPN-GEN]

Figure 16:
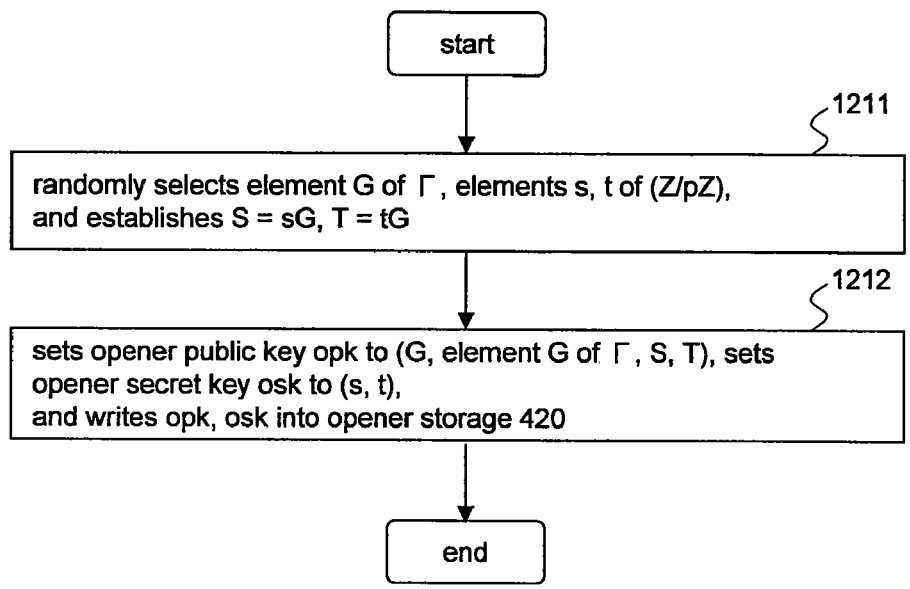
FIG. 16 is a flowchart of an opener key generating sequence according to Exemplary Embodiment 2.

Opener key generating sequence OPN-GEN performed by opener key generating means 412 will be described below. FIG. 16 is a flowchart of the opener key generating sequence. As shown in FIG. 16, opener apparatus 400 performs the following OPN-GEN-1, OPN-GEN-2 sequentially:

OPN-GEN-1: Opener key generating means 412 randomly selects element G of Γ, elements s, t of (Z/pZ), and establishes S=sG, T=tG (step 1211).

OPN-GEN-2: Opener key generating means 412 sets opener public key opk to (G, element G of Γ, S, T), sets opener secret key osk to (s, t), and writes opk, osk into opener storage 420 (step 1212).

Opener public key opk is disclosed to all the apparatus in some way. For example, one way to disclose opk may be putting it on a public bulletin board on the Internet. Any methods may be used to disclose opk. User apparatus controller 210 of user apparatus 200 stores disclosed opener public key opk in user storage 220. Issuer apparatus controller 110 of issuer apparatus 100 stores disclosed opener public key opk in issuer storage 120.

[Issuing Sequence ISS-ISSUE and Joining Sequence USR-JOIN]

Issuer apparatus 100 and user apparatus 200 perform issuing sequence ISS-ISSUE and joining sequence USR-JOIN, respectively, while communicating with each other.

First, issuer apparatus 100 performs [Issuing sequence 1 ISS-ISSUE-1] to be described later, and then user apparatus 200 performs [Joining sequence 1 USR-JOIN-1] to be described later. Issuer apparatus 100 performs [Issuing sequence 2 ISS-ISSUE-2] to be described later, and finally user apparatus 200 performs [Joining sequence 2 USR-JOIN-2] to be described later.

During the above sequences, member public key upk and member secret key usk are generated.

Member public key upk is disclosed to all the apparatus in some way. For example, one way to disclose upk may be putting it on a public bulletin board on the Internet. Any methods may be used to disclose upk.

[Signature Sequence USR-SIGN]

When signature generating means 214 has received message m as an input, signature generating means 214 performs Sign(m, upk, tpk, cert_U, sk_U) according to Non-patent document 2 as mpk=ipk, tpk=opk, cert_U=upk, sk_U=usk to obtain signature text gs for m.

[Verifying Sequence VER-VERIFY]

When verifying means 314 has received message m and signature text gs for m, verifying means 314 performs Verify(m, gs, mpk, tpk) according to Non-patent document 2 as mpk=ipk, tpk=opk.

[Opening Sequence OPN-OPEN]

When opening means 414 has received message m and signature text gs for m, opening means 414 performs Open(m, σ, mpk, tpk, tsk) according to Non-patent document 2 as mpk=ipk, tpk=opk, tsk=osk.

[Issuing Sequence 1 ISS-ISSUE-1]

Figure 17:
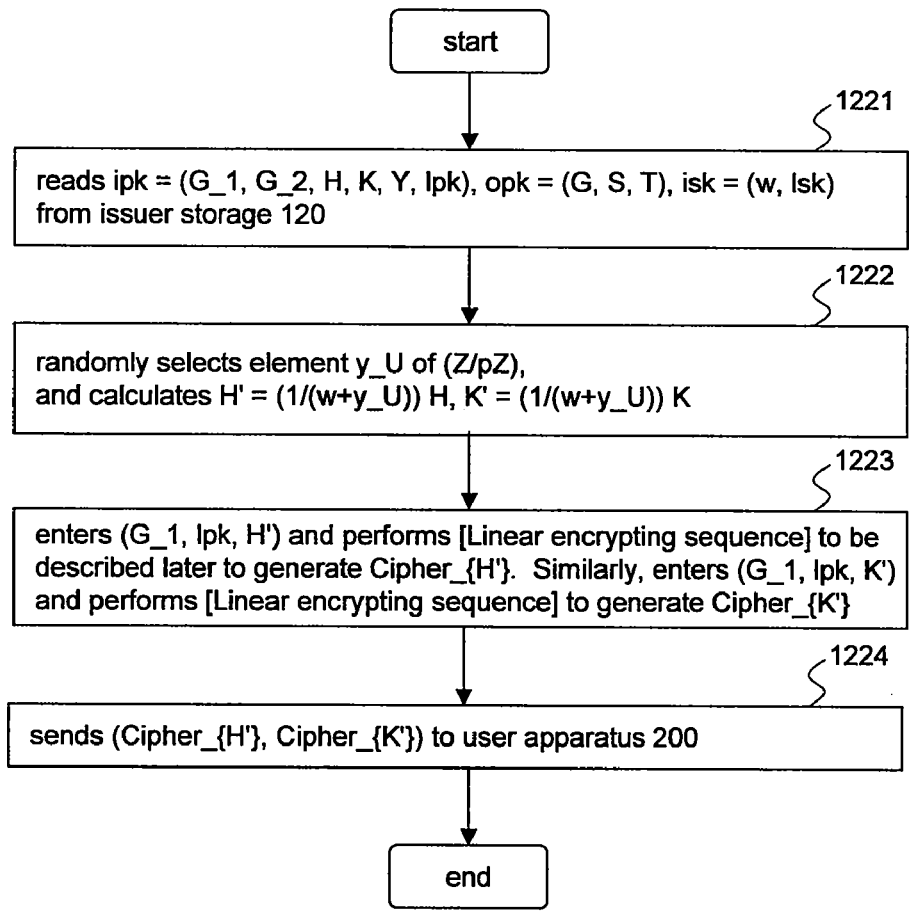
FIG. 17 is a flowchart of an issuing sequence 1 according to Exemplary Embodiment 2.

Issuing sequence 1 ISS-ISSUE-1 performed by issuing means 114 will be described below. FIG. 17 is a flowchart of issuing sequence 1. As shown in FIG. 17, issuer apparatus 100 performs the following ISS-ISSUE-1-1, ISS-ISSUE-1-4 sequentially:

ISS-ISSUE-1-1: Issuing means 114 reads ipk=(G_1, G_2, H, K, Y, Ipk), opk=(G, S, T), isk=(w, Isk) from issuer storage 120 (step 1221).

ISS-ISSUE-1-2: Issuing means 114 randomly selects element y_U of (Z/pZ), and calculates H'=(1/(w+y_U)) H, K'=(1/(w+y_U)) K (step 1222).

ISS-ISSUE-1-3: Issuing means 114 enters (G_1, Ipk, H') and performs [Linear encrypting sequence] to be described later to generate Cipher_{H}. Similarly, issuing means 114 enters (G_1, Ipk, K') and performs [Linear encrypting sequence] to generate Cipher_{K'} (step 1223).

ISS-ISSUE-1-4: Issuing means 114 sends (Cipher_{H'}, Cipher_{K'}) to user apparatus 200 (step 1224).

[Joining Sequence 1 USR-JOIN-1]

Figure 18:
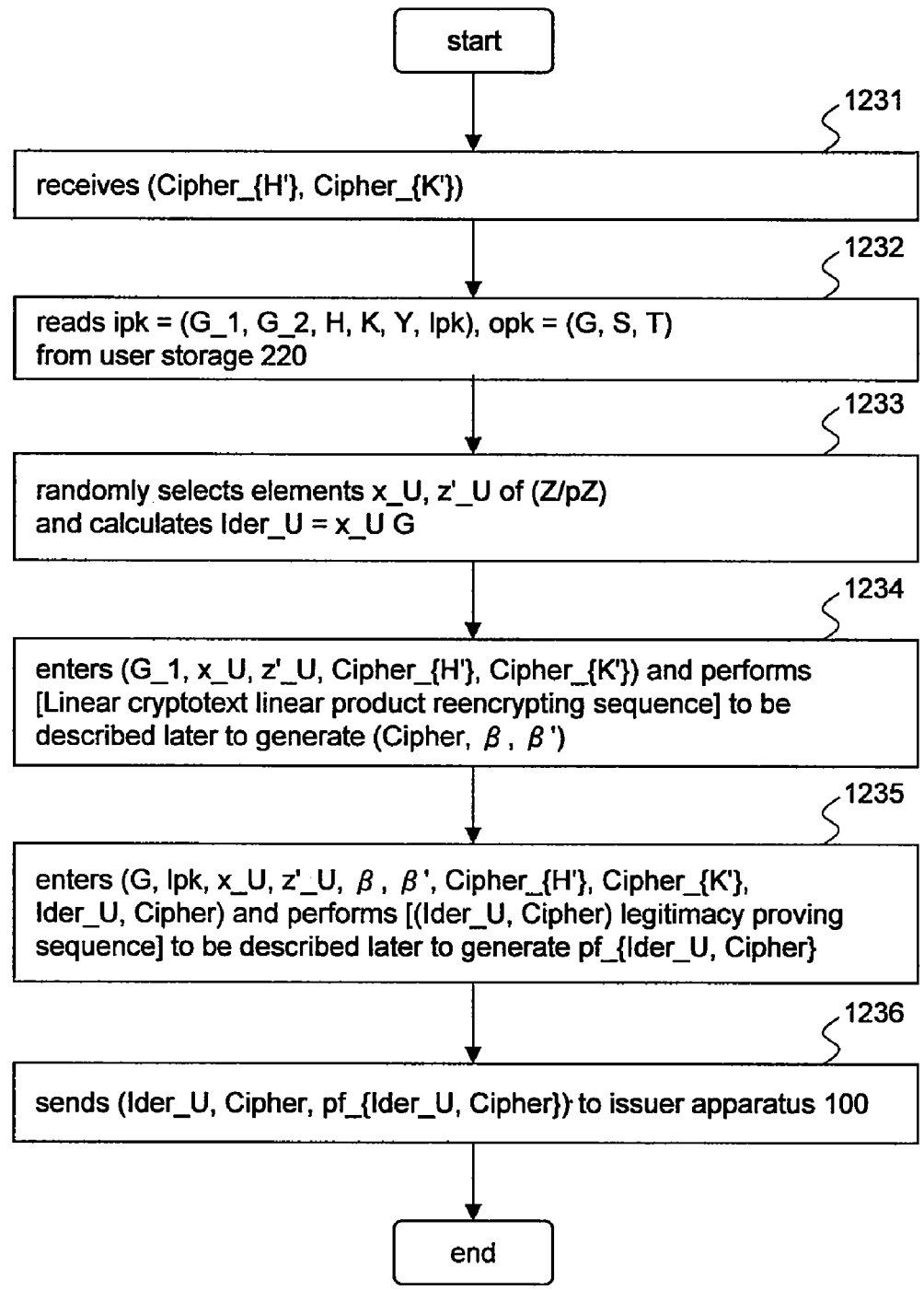
FIG. 18 is a flowchart of a joining sequence 1 according to Exemplary Embodiment 2.

Joining sequence 1 USR-JOIN-1 performed by joining means 212 will be described below. FIG. 18 is a flowchart of joining sequence 1. As shown in FIG. 18, user apparatus 200 performs the following USR-JOIN-1-1, ..., USR-JOIN-1-6 sequentially:

USR-JOIN-1-1: Joining means 212 receives (Cipher_{H'}, Cipher_{K'}) (step 1231).

USR-JOIN-1-2: Joining means 212 reads ipk=(G_1, G_2, H, K, Y, Ipk), opk=(G, S, T) from user storage 220 (step 1232).

USR-JOIN-1-3: Joining means 212 randomly selects elements x_U, z'_U of (Z/pZ) and calculates Ider_U=x_U G (step 1233).

USR-JOIN-1-4: Joining means 212 enters (G_1, x_U, z'_U, Cipher_{H'}, Cipher_{K'}) and performs [Linear cryptotext linear product reencrypting sequence] to be described later to generate (Cipher, β, β') (step 1234).

USR-JOIN-1-5: Joining means 212 enters (G, Ipk, x_U, β, β', Cipher_{H'}, Cipher_{K'}, Ider_U, Cipher) and performs [(Ider_U, Cipher) legitimacy proving sequence] to be described later to generate pf_{Ider_U, Cipher} (step 1235).

USR-JOIN-1-6: Joining means 212 sends (Ider_U, Cipher, pf_{Ider_U, Cipher}) to issuer apparatus 100 (step 1236).

[Issuing Sequence 2 ISS-ISSUE-2]

Figure 19:
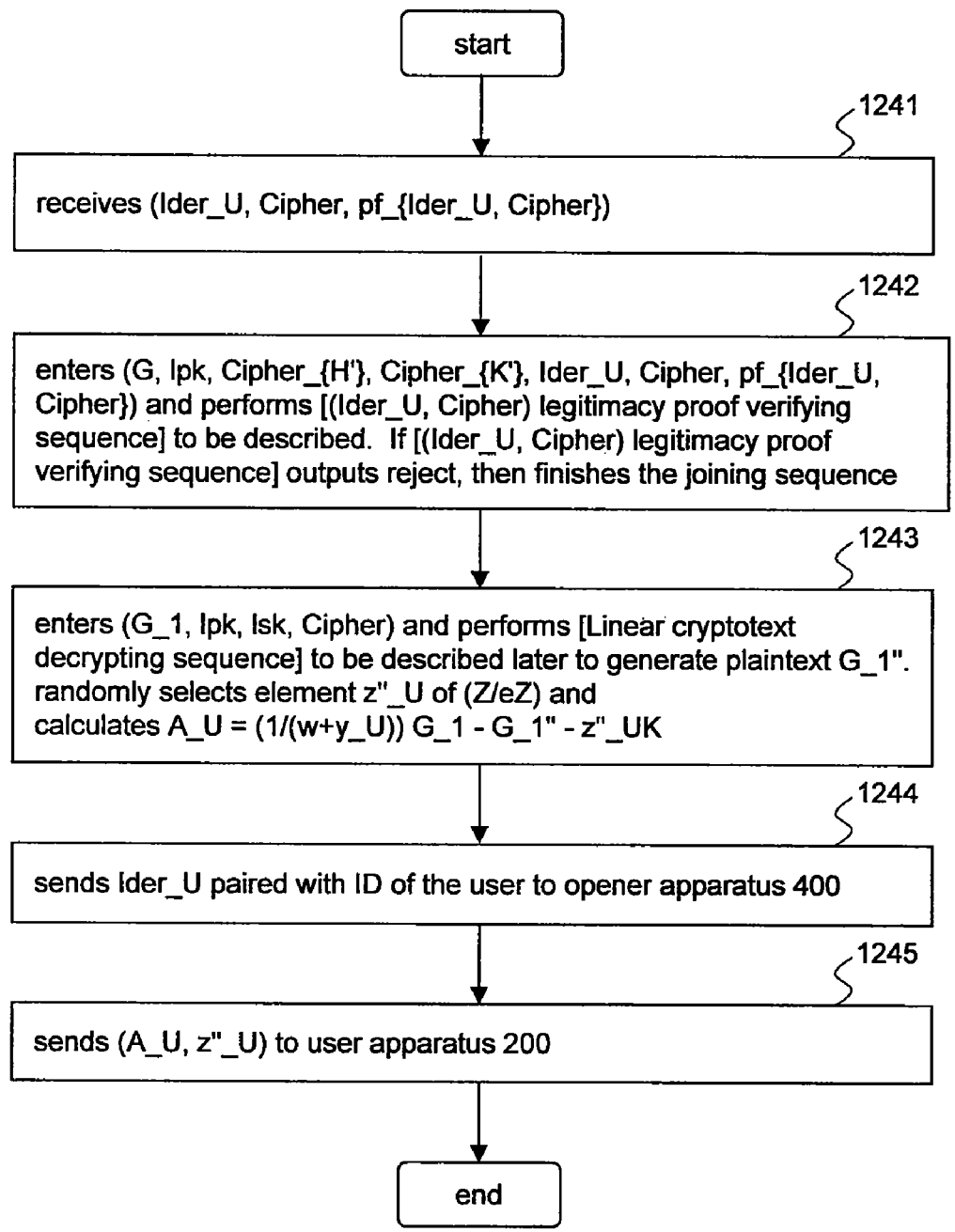
FIG. 19 is a flowchart of an issuing sequence 2 according to Exemplary Embodiment 2.

Issuing sequence 2 ISS-ISSUE-2 performed by issuing means 114 will be described below. FIG. 19 is a flowchart of issuing sequence 2. As shown in FIG. 19, issuer apparatus 100 performs the following ISS-ISSUE-2-1, ..., ISS-ISSUE-2-5 sequentially:

ISS-ISSUE-2-1: Issuing means 114 receives (Ider_U, Cipher, pf_{Ider_U, Cipher}) (step 1241).

ISS-ISSUE-2-2: Issuing means 114 enters (G, Ipk, Cipher_{H'}, Cipher_{K'}, Ider_U, Cipher, pf_{Ider_U, Cipher}) and performs [(Ider_U, Cipher) legitimacy proof verifying sequence] to be described. If [(Ider_U, Cipher) legitimacy proof verifying sequence] outputs reject, then issuing means 114 finishes the joining sequence (step 1242).

ISS-ISSUE-2-3: Issuing means 114 enters (G_1, Ipk, Isk, Cipher) and performs [Linear cryptotext decrypting sequence] to be described later to generate plaintext G_1". Issuing means 114 randomly selects element z"_U of (Z/eZ) and calculates A_U=(1/(w+y_U)) G_1−G_1"−z"_UK (step 1243). Plaintext G_1" corresponds to plaintext g" according to Exemplary Embodiment 1.

ISS-ISSUE-2-4: Issuing means 114 sends Ider_U paired with ID of the user to opener apparatus 400 (step 1244).

ISS-ISSUE-2-5: Issuing means 114 sends (A_U, z"_U) to user apparatus 200 (step 1245), and then puts the issuing sequence to an end.

[Joining Sequence 2 USR-JOIN-2]

Figure 20:
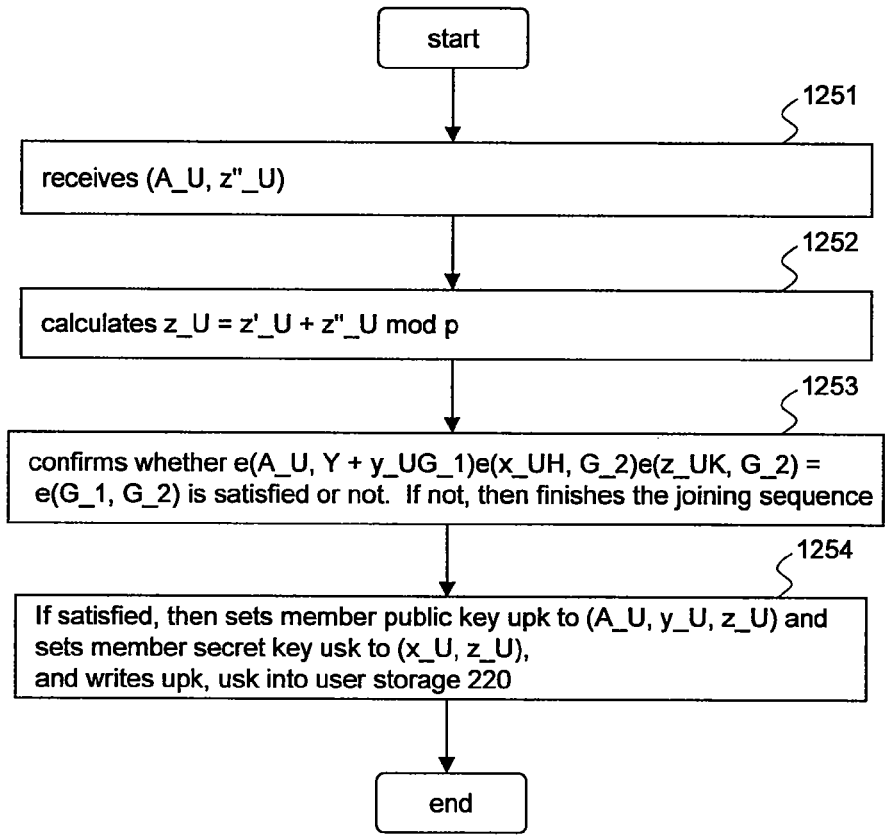
FIG. 20 is a flowchart of a joining sequence 2 according to Exemplary Embodiment 2.

Joining sequence 2 USR-JOIN-2 performed by joining means 212 will be described below. FIG. 20 is a flowchart of joining sequence 2. As shown in FIG. 20, user apparatus 200 performs the following USR-JOIN-2-1, ..., USR-JOIN-2-4 sequentially:

USR-JOIN-2-1: Joining means 212 receives (A_U, z"_U) (step 1251).

USR-JOIN-2-2: Joining means 212 calculates z_U=+z"_U mod p (step 1252).

USR-JOIN-2-3: Joining means 212 confirms whether e(A_U, Y+y_UG_1)e(x_UH, G_2)e(z_UK, G_2)=e(G_1, G_2) is satisfied or not. If not, then joining means 212 finishes the joining sequence (step 1253).

USR-JOIN-2-4: If satisfied, then joining means 212 sets member public key upk to (A_U, y_U, z_U) and sets member secret key usk to (x_U, z_U), and writes upk, usk into user storage 220 (step 1254). Then, joining means 212 puts the joining sequence to an end.

[Linear Cryptosystem Key Generating Sequence]

Figure 21:
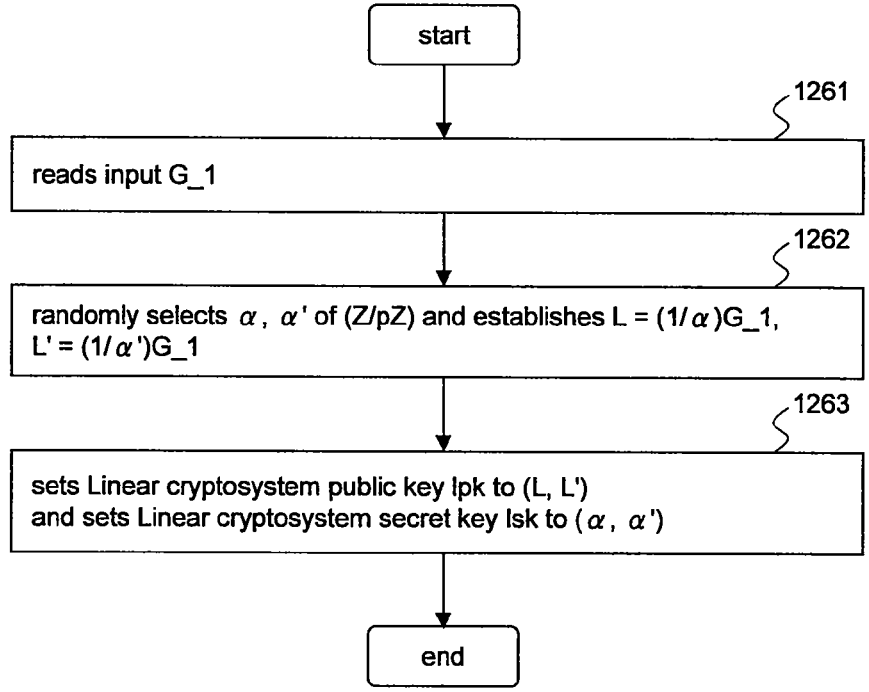
FIG. 21 is a flowchart of a Linear cryptosystem key generating sequence.

A Linear cryptosystem key generating sequence performed by issuer apparatus controller 110 will be described below. FIG. 21 is a flowchart of the Linear cryptosystem key generating sequence. As shown in FIG. 21, issuer apparatus 100 performs the following LIN-GEN-1, . . . , LIN-GEN-3 sequentially:

LIN-GEN-1: Issuer apparatus controller 110 reads input G_1 (step 1261).

LIN-GEN-2: Issuer apparatus controller 110 randomly selects α, α' of (Z/pZ) and establishes L=(1/α)G_1, L'=(1/α')G_1 (step 1262).

LIN-GEN-3: Issuer apparatus controller 110 sets Linear cryptosystem public key lpk to (L, L') and sets Linear cryptosystem secret key lsk to (α, α') (step 1263).

[Linear Encrypting Sequence]

Figure 22:
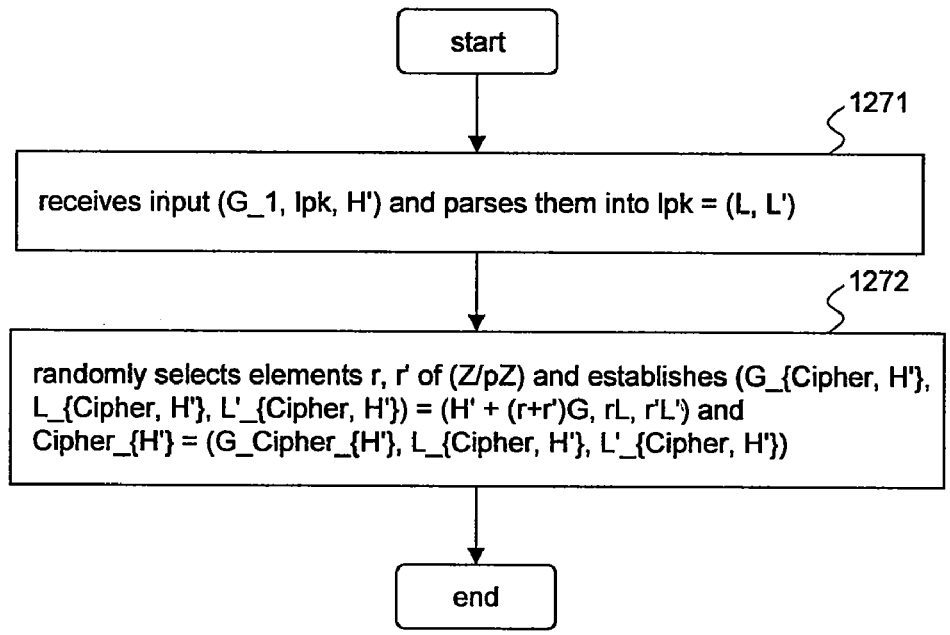
FIG. 22 is a flowchart of a Linear encrypting sequence.

An Linear encrypting sequence performed by issuer apparatus controller 110 will be described below. FIG. 22 is a flowchart of the Linear encrypting sequence. As shown in FIG. 22, issuer apparatus 100 performs the following LIN-ENC-1, LIN-ENC-2 sequentially:

LIN-ENC-1: Issuer apparatus controller 110 receives input (G_1, lpk, H') and parses them into lpk=(L, L') (step 1271).

LIN-ENC-2: Issuer apparatus controller 110 randomly selects elements r, r' of (Z/pZ) and establishes (G_{Cipher, H'}, L_{Cipher, H'}, L'_{Cipher, H'})=(H'+(r+r')G, rL, r'L') and Cipher_{H'}=(G_Cipher_{H'}, L_{Cipher, H'}, L'_{Cipher, H'}) (step 1272).

[Linear Cryptotext Linear Sum Reencrypting Sequence]

Figure 23:
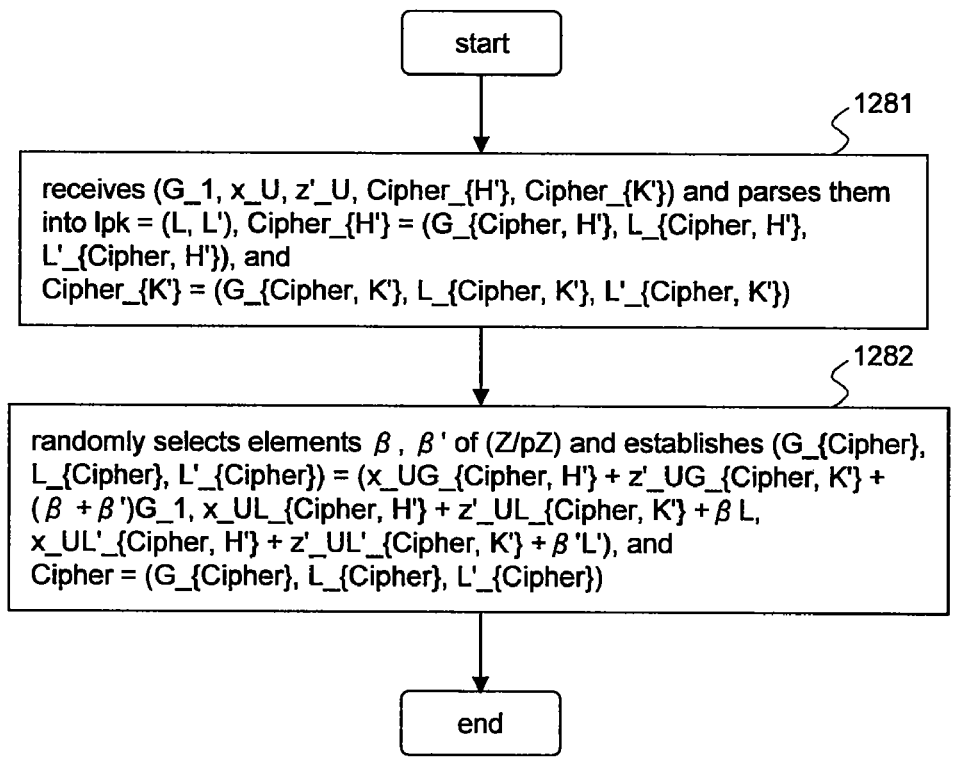
FIG. 23 is a flowchart of a Linear cryptotext linear sum reencrypting sequence.

A Linear cryptotext linear sum reencrypting sequence performed by user apparatus controller 210 will be described below. FIG. 23 is a flowchart of the Linear cryptotext linear sum reencrypting sequence. As shown in FIG. 23, user apparatus 200 performs the following LIN-SUM-1, LIN-SUM-2 sequentially:

LIN-SUM-1: User apparatus controller 210 receives (G_1, x_U, z'_U, Cipher_{H'}, Cipher_{K'}) and parses them into lpk=(L, L'), Cipher_{H'} (G_{Cipher, H'}, L_{Cipher, H'}, L'_{Cipher, H'}), and Cipher {K'}=(G_{Cipher, K'}, L_{Cipher, K'}, L'_{Cipher, K'}) (step 1281).

LIN-SUM-2: User apparatus controller 210 randomly selects elements β, β' of (Z/pZ) and establishes (G_{Cipher}, L_{Cipher}, L'_{Cipher})=(x_UG_{Cipher, H'}+z'_UG_{Cipher, K'}+(β+β')G_1, x_UL_{Cipher, H'}+z'_UL_{Cipher, K'}+βL, x_UL'_{Cipher, H'}+z'_UL'_{Cipher, K'}+β'L'), and Cipher=(G_{Cipher}, L_{Cipher}, L'_{Cipher}) (step 1282).

In this manner, user apparatus controller 210 generates a cryptotext from the sum of plaintexts multiplied by a constant. According to Exemplary Embodiment 1, a cryptotext is generated from the product of modulo-exponentiated plaintexts. The reencrypting sequence according to Exemplary Embodiment 1 may be applied to the present exemplary embodiment, and the reencrypting sequence according to the present exemplary embodiment may be applied to Exemplary Embodiment 1.

[Linear Cryptotext Decrypting Sequence]

Figure 24:
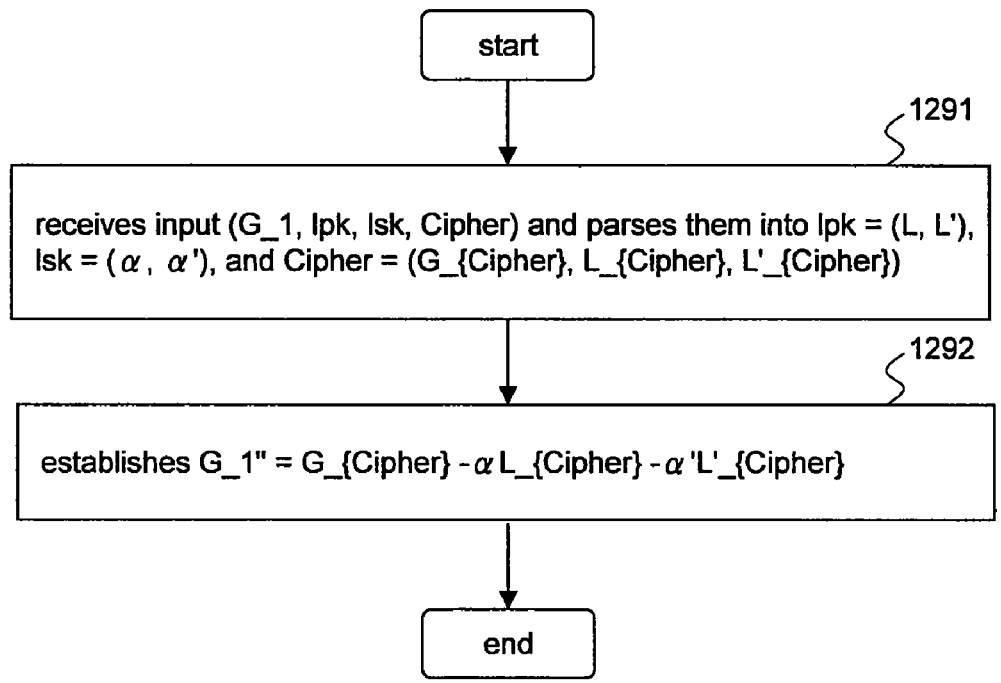
FIG. 24 is a flowchart of a Linear cryptotext decrypting sequence.

A Linear cryptotext decrypting sequence performed by issuer apparatus controller 110 will be described below. FIG. 24 is a flowchart of the Linear cryptotext decrypting sequence. As shown in FIG. 24, issuer apparatus 100 performs the following LIN-DEC-1, LIN-DEC-2 sequentially:

LIN-DEC-1: Issuer apparatus controller 110 receives input (G_1, Ipk, Isk, Cipher) and parses them into Ipk=(L, L'), Isk=(α, α'), and Cipher=(G_{Cipher}, L_{Cipher}, L'_{Cipher}) (step 1291).

LIN-DEC-2: Issuer apparatus controller 110 establishes G_1''=G_{Cipher}−αL_{Cipher}−α'L'_{Cipher} (step 1292).

[(Ider_U, Cipher) Legitimacy Proving Sequence ID-CI-PF-GEN]

Figure 25:
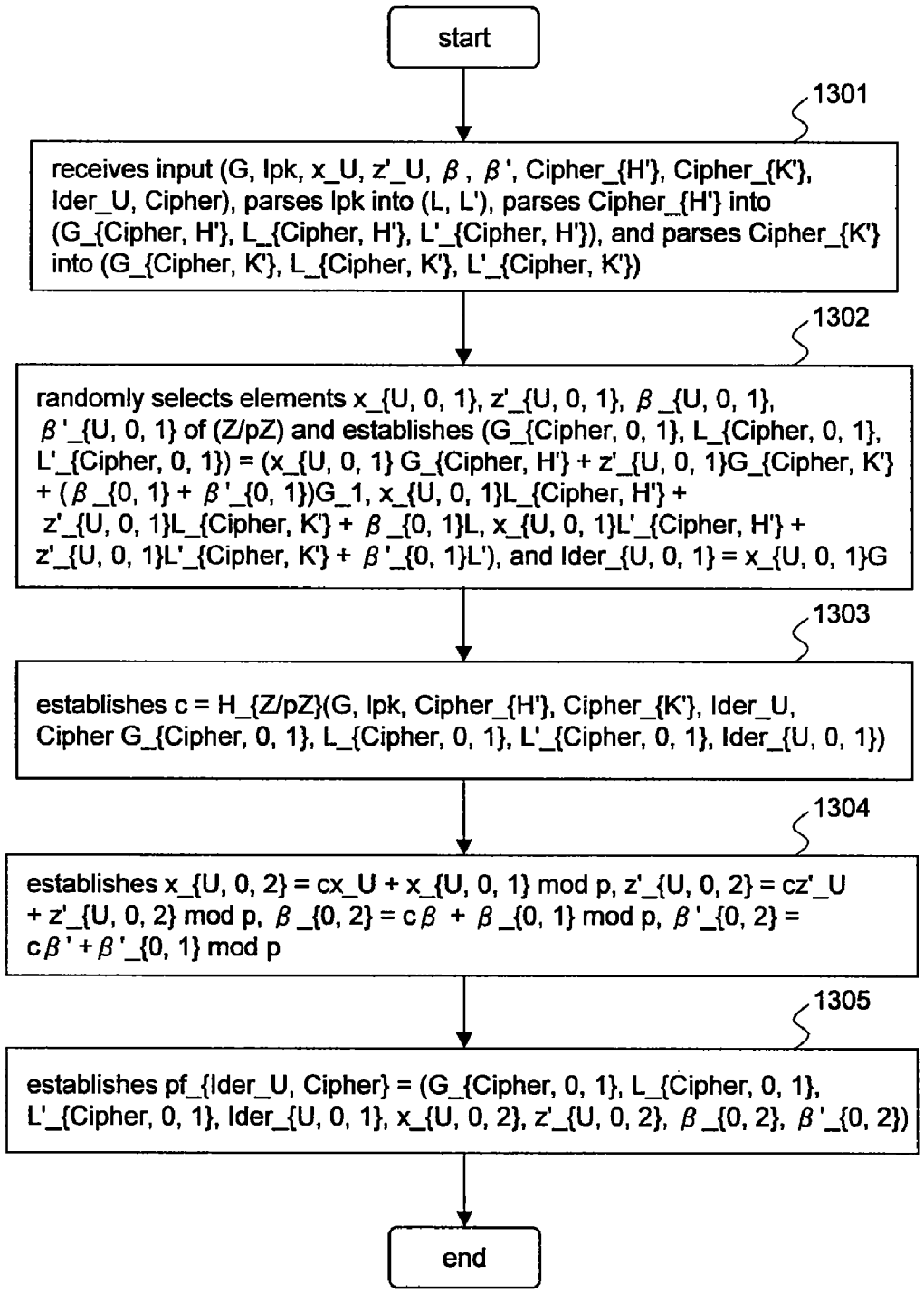
FIG. 25 is a flowchart of an (Ider_U, Cipher) legitimacy proving sequence.

An (Ider_U, Cipher) legitimacy proving sequence performed by user apparatus controller 210 will be described below. FIG. 25 is a flowchart of the (Ider_U, Cipher) legitimacy proving sequence. As shown in FIG. 25, user apparatus 200 performs the following ID-CI-PF-GEN-1, . . . , ID-CI-PF-GEN-5 sequentially:

ID-CI-PF-GEN-1: User apparatus controller 210 receives input (G, Ipk, x_U, β, β', Cipher_{H'}, Cipher_{K'}, Ider_U, Cipher), parses Ipk into (L, L'), parses Cipher_{H'} into (G_{Cipher, H'}, L_{Cipher, H'}, L'_{Cipher, H'}), and parses Cipher_{K'} into (G_{Cipher, K'}, L_{Cipher, K'}, L'_{Cipher, K'}) (step 1301).

ID-CI-PF-GEN-2: User apparatus controller 210 randomly selects elements x_{U,0,1}, z'_{U,0,1}, β_{U,0,1}, β'_{U, 0, 1} of (Z/pZ) and establishes (G_{Cipher, 0, 1}, L_{Cipher, 0, 1}, L'_{Cipher, 0, 1})=(x_{U, 0, 1}G_{Cipher, H'}+z'_{U, 0, 1}G_{Cipher, K'}+(α_{0, 1}+β'_{0, 1})G_1, x_{U, 0, 1}L_{Cipher, H'}+z'_{U, 0, 1}L_{Cipher, K'}+β_{0, 1}L, x_{U, 0, 1}L'_{Cipher, H'}+z'_{U, 0, 1}L'_{Cipher, K}+β'_{0, 1}L'), and Ider_{U, 0, 1}=x_{U, 0, 1}G (step 1302).

User apparatus controller 210 sets H_{Z/pZ} as a hash function that takes it value at (Z/pZ).

ID-CI-PF-GEN-3: User apparatus controller 210 establishes c=H_{Z/pZ}(G, Ipk, Cipher_{H'}, Cipher_{K}, Ider_U, Cipher G_{Cipher, 0, 1}, L_{Cipher, 0, 1}, L'_{Cipher, 0, 1}, Ider_{U, 0, 1}) (step 1303).

ID-CI-PF-GEN-4: User apparatus controller 210 establishes x_{U, 0, 2}=cx_U+x_{U, 0, 1} mod p, z'_{U, 0, 2}=cz'_U+z'_{U, 0, 2} mod p, β_{0, 2}=cβ+β_{0, 1} mod p, β'_{0, 2}=cβ'+β'_{0, 1} mod p (step 1304).

ID-CI-PF-GEN-5: User apparatus controller 210 establishes pf_{Ider_U, Cipher}=(G_{Cipher, 0, 1}, L_{Cipher, 0, 1}, L'_{Cipher, 0, 1}, Ider_{U, 0, 1}, x_{U, 0, 2}, z'_{U, 0, 2}, β_{0, 2}, β'_{0, 2}) (step 1305).

[(Ider_U, Cipher) Legitimacy Proof Verifying Sequence ID-CI-PF-VER]

Figure 26:
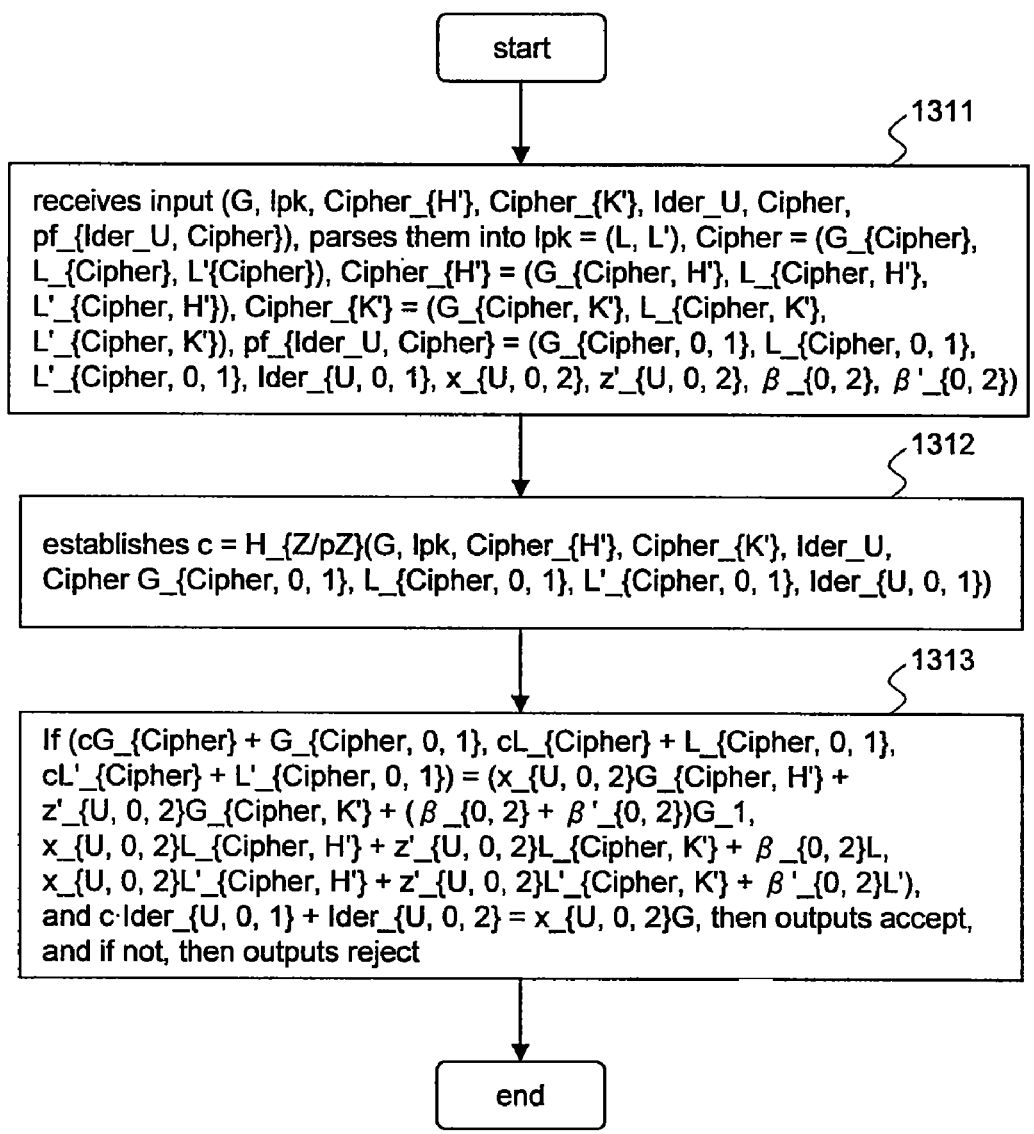
FIG. 26 is a flowchart of an (Ider_U, Cipher) legitimacy proof verifying sequence.

An (Ider_U, Cipher) legitimacy proof verifying sequence performed by issuer apparatus controller 110 will be described below. FIG. 26 is a flowchart of the (Ider_U, Cipher) legitimacy proof verifying sequence. As shown in FIG. 26, user apparatus 100 performs the following ID-CI-PF-VER-1, . . . , ID-CI-PF-VER-3 sequentially:

ID-CI-PF-VER-1: Issuer apparatus controller 110 receives input (G, Ipk, Cipher_{H'}, Cipher_{K'}, Ider_U, Cipher, pf_{Ider_U, Cipher}), parses them into Ipk=(L, L'), Cipher=(G_{Cipher}, L_{Cipher}, L'{Cipher}), Cipher_{H'}=(G_{Cipher, H'}, L_{Cipher, H'}, L'_{Cipher, H'}), Cipher_{K}=(G_{Cipher, K'}, L_{Cipher, K'}, L'_{Cipher, K'}), pf_{Ider_U, Cipher}=(G_{Cipher, 0, 1}, L_{Cipher, 0, 1}, L'_{Cipher, 0, 1}, Ider_{U, 0, 1}, x_{U, 0, 2}, z'_{U, 0, 2}, β_{0, 2}, β'_{0, 2}) (step 1311).

ID-CI-PF-VER-2: Issuer apparatus controller 110 establishes c=H_{Z/pZ}(G, Ipk, Cipher_{H'}, Cipher_{K'}, Ider_U, Cipher G_{Cipher, 0, 1}, L_{Cipher, 0, 1}, L'_{Cipher, 0, 1}, Ider_{U, 0, 1}) (step 1312).

ID-CI-PF-VER-3: If $(cG\_\{Cipher\}+G\_\{Cipher, 0, 1\}$, $cL\_\{Cipher\}+L\_\{Cipher, 0, 1\}$, $cL'\_\{Cipher\}+L'\_\{Cipher, 0, 1\})=(x\_\{U, 0, 2\}G\_\{Cipher, H'\}+z'\_\{U, 0, 2\}G\_\{Cipher, K'\}+(\beta\_\{0, 2\}+\beta'\_\{0, 2\})G\_1$, $x\_\{U, 0, 2\}L\_\{Cipher, H'\}+z'\_\{U, 0, 2\}L\_\{Cipher, K'\}+\beta\_\{0, 2\}L$, $x\_\{U, 0, 2\}L'\_\{Cipher, H'\}+z'\_\{U, 0, 2\}L'\_\{Cipher, K'\}+\beta'\_\{0, 2\}L')$, and $c.Ider\_\{U, 0, 1\}+Ider\_\{U, 0, 2\}=x\_\{U, 0, 2\}G$, then issuer apparatus controller 110 outputs accept, and if not, then issuer apparatus controller 110 outputs reject (step 1313).

The key issuing method and the group signature system according to the present exemplary embodiment offer the same advantages as Exemplary Embodiment 1.

Exemplary Embodiment 3

Apparatus Configuration

A group signature system according to the present exemplary embodiment will be described below. The configuration of the system will not be described in detail below as it is the same as the system described in Exemplary Embodiment 1. Processing details which are different from those of Exemplary Embodiment 1 will be described below.

It is assumed that the storages of the apparatus have been supplied with security parameters $I\_n, I\_E, I\_Q, I\_c, I\_e, I\_s$ in advance. The storages may be supplied with $I\_n, I\_E, I\_Q, I\_c, I\_s$ in any ways. It is assumed that r represents a cyclic group of order Q and the number of bits of Q is $I\_Q$ bits. A multiplicative group of (Z/PZ) or an elliptic curve group, for example, may be used as Γ. Here, Γ as a multiplicative group of (Z/PZ) will be described below.

Furthermore, it is assumed that the storages of the apparatus have been supplied with a parameter descriptive of r, and Q in advance. The storages of the apparatus may be supplied with the parameter descriptive of Γ, and Q in any ways.

A key issuing method carried out by the group signature system according to the present exemplary embodiment will be described below.

Figure 27:
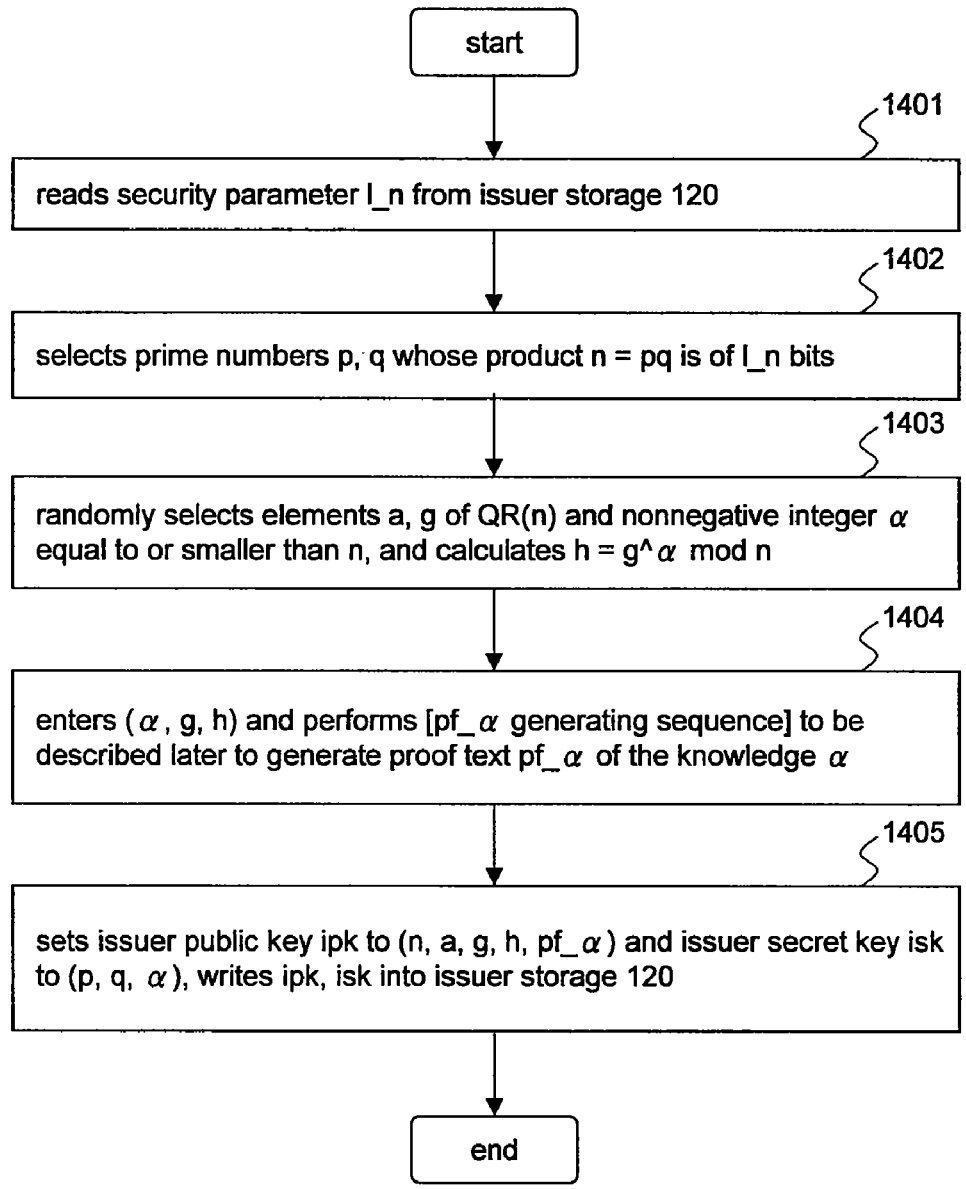
FIG. 27 is a flowchart of an issuer key generating sequence according to Exemplary Embodiment 3.

[Issuer Key Generating Sequence ISS-GEN]:

Issuer key generating sequence ISS-GEN performed by issuer key generating means 112 will be described below. FIG. 27 is a flowchart of the issuer key generating sequence. As shown in FIG. 27, issuer apparatus 100 performs the following ISS-GEN1, ..., ISS-GEN5 sequentially:

ISS-GEN1: Issuer key generating means 112 reads security parameter $I\_n$ from issuer storage 120 (step 1401).

ISS-GEN2: Issuer key generating means 112 selects prime numbers p, q whose product n=pq is of $I\_n$ bits (step 1402).

ISS-GEN3: Issuer key generating means 112 randomly selects elements a, g of QR(n) and nonnegative integer a equal to or smaller than n, and calculates $h=g^\alpha \bmod n$ (step 1403).

ISS-GEN4: Issuer key generating means 112 enters (α, g, h) and performs [pf_α generating sequence] described in Exemplary Embodiment 1 to generate proof text pf_α of the knowledge a (step 1404).

ISS-GEN5: Issuer key generating means 112 sets issuer public key ipk to (n, a, g, h, pf_α) and issuer secret key isk to (p, q, a), writes ipk, isk into issuer storage 120, whereupon issuer key generating means 112 puts issuer key generating sequence ISS-GEN to an end (step 1405).

Issuer public key ipk is disclosed to all the apparatus in some way. For example, one way to disclose ipk may be putting it on a public bulletin board on the Internet. Any methods may be used to disclose ipk. User apparatus controller 210 of user apparatus 200 stores disclosed issuer public key ipk in user storage 220.

[Opener Key Generating Sequence OPN-GEN]

Figure 28:
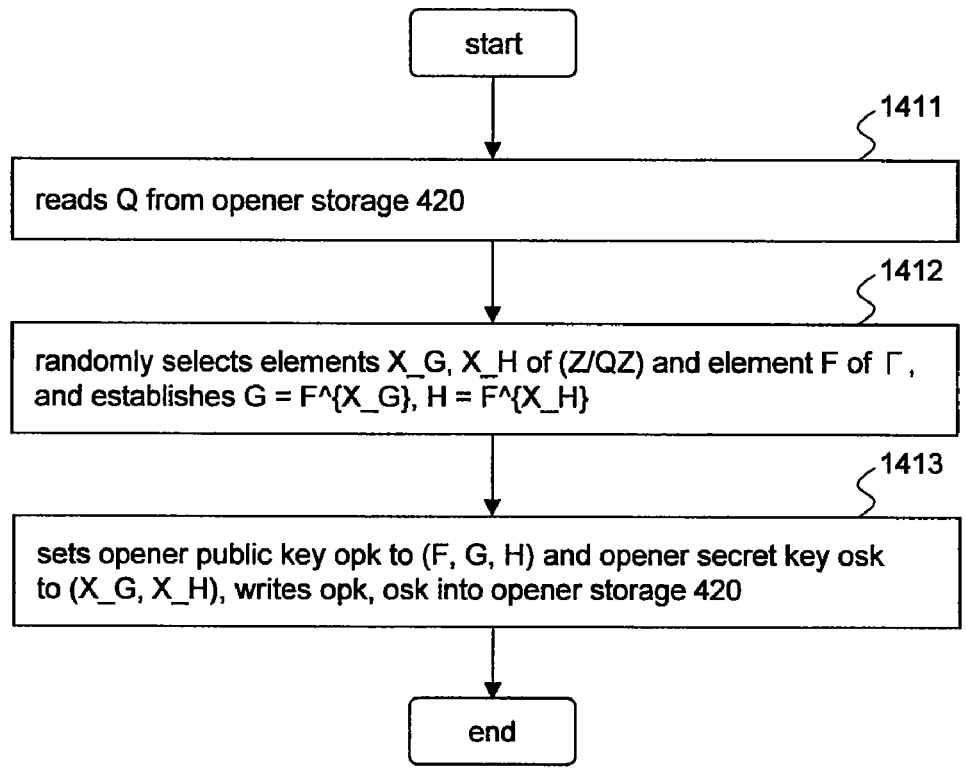
FIG. 28 is a flowchart of an opener key generating sequence according to Exemplary Embodiment 3.

Opener key generating sequence OPN-GEN performed by opener key generating means 412 will be described below. FIG. 28 is a flowchart of the opener key generating sequence. As shown in FIG. 28, opener apparatus 400 performs the following OPN-GEN1, OPN-GEN2, OPN-GEN3 sequentially:

OPN-GEN1: Opener key generating means 412 reads Q from opener storage 420 (step 1411).

OPN-GEN2: Opener key generating means 412 randomly selects elements $X\_G, X\_H$ of (Z/QZ) and element F of r, and establishes $G=F^\{X\_G\}$, $H=F^\{X\_H\}$ (step 1412).

OPN-GEN3: Opener key generating means 412 sets opener public key opk to (F, G, H) and opener secret key osk to $(X\_G, X\_H)$, writes opk, osk into opener storage 420 (step 1413), whereupon opener key generating means 412 puts opener key generating sequence OPN-GEN to an end.

Opener public key opk is disclosed to all the apparatus in some way. For example, one way to disclose opk may be putting it on a public bulletin board on the Internet. Any methods may be used to disclose opk. User apparatus controller 210 of user apparatus 200 stores disclosed opener public key opk in user storage 220. Issuer apparatus controller 110 of issuer apparatus 100 stores disclosed opener public key opk in issuer storage 120.

[Issuing Sequence ISS-ISSUE and Joining Sequence USR-JOIN]

Issuer apparatus 100 and user apparatus 200 perform issuing sequence ISS-ISSUE and joining sequence USR-JOIN, respectively, while communicating with each other.

First, user apparatus 200 performs [Joining sequence 1 USR-JOIN-1] to be described later, and then issuer apparatus 100 performs [Issuing sequence 1 ISS-ISSUE-1] to be described later. Furthermore, user apparatus 200 performs [Joining sequence 2 USR-JOIN-2] to be described later.

During the above sequences, member public key upk and member secret key usk are generated.

Member public key upk is disclosed to all the apparatus in some way. For example, one way to disclose upk may be putting it on a public bulletin board on the Internet. Any methods may be used to disclose upk.

[Signature Sequence USR-SIGN]

When signature generating means 214 has received message m as an input, signature generating means 214 parses it into upk=(x, e, y), randomly selects element β of (Z/NZ), calculates (F', G', H')=$(F^\beta, F^\beta, F^xG^\beta, F^xH^\beta)$, and calculates legitimacy proof text pf_{(G', H')} of (G', H').

[Verifying Sequence VER-VERIFY]

Verifying means 314 verifies the legitimacy of pf_{(G', H')}.

[Opening Sequence OPN-OPEN]

Opening means 414 calculates $G'/F'^\{X\_G\}$ and outputs ID of the user where member public key upk=(x, e, y) satisfies $G'/F'^\{X\_G\}=G^x$.

[Joining Sequence 1 USR-JOIN-1]

Figure 29:
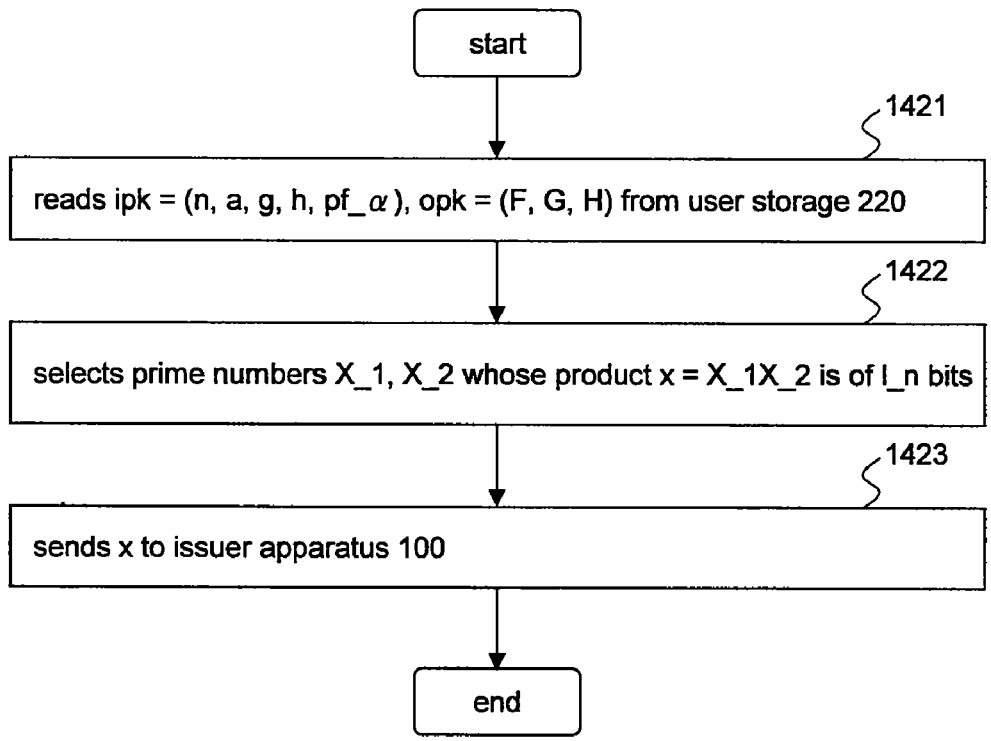
FIG. 29 is a flowchart of a joining sequence 1 according to Exemplary Embodiment 3.

Joining sequence 1 USR-JOIN-1 performed by joining means 212 will be described below. FIG. 29 is a flowchart of joining sequence 1. As shown in FIG. 29, user apparatus 200 performs the following USR-JOIN-1-1, ..., USR-JOIN-1-3 sequentially:

USR-JOIN-1-1: Joining means 212 reads ipk=(n, a, g, pf_α), opk=(F, G, H) from user storage 220 (step 1421).

USR-JOIN-1-2: Joining means 212 selects prime numbers $X\_1, X\_2$ whose product $x=X\_1 X\_2$ is of $I\_n$ bits (step 1422).

USR-JOIN-1-3: Joining means 212 sends x to issuer apparatus 100 (step 1423).

[Issuing Sequence 1 ISS-ISSUE-1]

Figure 30:
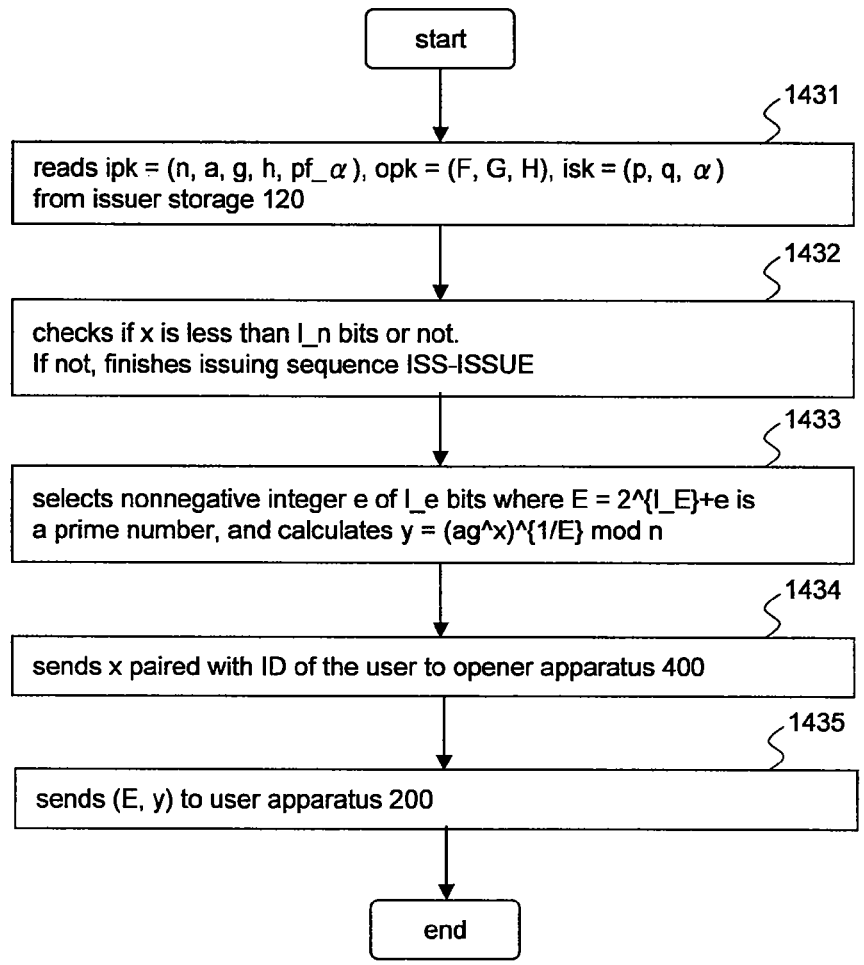
FIG. 30 is a flowchart of an issuing sequence 1 according to Exemplary Embodiment 3.

Issuing sequence 1 ISS-ISSUE-1 performed by issuing means 212 will be described below. FIG. 30 is a flowchart of issuing sequence 1. As shown in FIG. 30, issuer apparatus 100 performs the following ISS-ISSUE-1-1, ..., ISS-ISSUE-1-5 sequentially:

ISS-ISSUE-1-1: Issuing means 114 reads ipk=(n, a, g, h, pf_$\alpha$), opk=(F, G, H), isk=(p, q, $\alpha$) from issuer storage 120 (step 1431).

ISS-ISSUE-1-2: Issuing means 114 checks if x is less than l_n bits or not. If not, issuing means 114 finishes issuing sequence ISS-ISSUE (step 1432).

ISS-ISSUE-1-3: Issuing means 114 randomly selects nonnegative integer e of l_e bits where $E=2^{\{l\_E\}}+e$ is a prime number, and calculates $y=(a g^{\wedge} x)^{\wedge}\{1/E\}$ mod n (step 1433). In other words, issuing means 114 determines a value remaining when RSA modulus n acts as a modulus for $(a g^{\wedge} x)^{\wedge}\{1/E\}$.

ISS-ISSUE-1-4: Issuing means 114 sends x paired with ID of the user to opener apparatus 400 (step 1434).

ISS-ISSUE-1-5: Issuing means 114 sends (E, y) to user apparatus 200 (step 1435).

[Joining Sequence 2 USR-JOIN-2]

Figure 31:
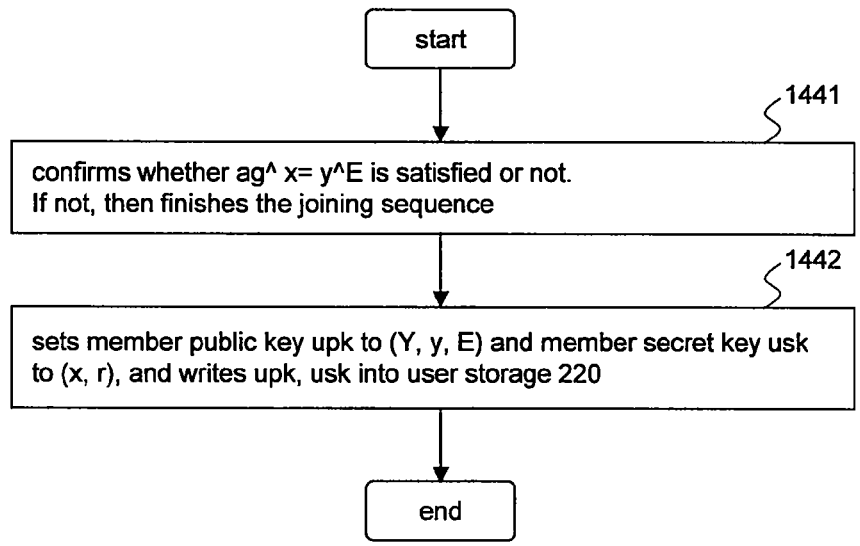
FIG. 31 is a flowchart of a joining sequence 2 according to Exemplary Embodiment 3.

Joining sequence 2 USR-JOIN-2 performed by joining means 212 will be described below. FIG. 31 is a flowchart of joining sequence 2. As shown in FIG. 31, user apparatus 200 performs the following USR-JOIN-2-1, USR-JOIN-2-2 sequentially:

USR-JOIN-2-1: Joining means 212 confirms whether $ag^{\wedge} x=y^{\wedge}E$ is satisfied or not. If not, then joining means 212 finishes the joining sequence (step 1441). In other words, joining means 212 determines whether an RSA modulus which is the product of two prime numbers is equal to the modulus or not.

USR-JOIN-2-2: If $ag^{\wedge} x=y^{\wedge}E$ is satisfied, then joining means 212 sets member public key upk to (Y, y, E) and member secret key usk to (x, r), and writes upk, usk into user storage 220 (step 1442). Then, joining means 212 puts the joining sequence to an end.

With the key issuing method and the group signature system according to the present exemplary embodiment, the safety of information is enhanced even when data are sent and received concurrently between a plurality of user apparatus and the issuer apparatus according to the join protocol. In addition, as issuing sequence 2 performed by the issuer apparatus can be omitted, the process is made simpler than with Exemplary Embodiment 1 and Exemplary Embodiment 2.

Exemplary Embodiment 4

Apparatus Configuration

A group signature system according to the present exemplary embodiment will be described below. The configuration of the system will not be described in detail below as it is the same as the system described in Exemplary Embodiment 1. A key issuing method performed by the group signature system according to the present exemplary embodiment will be described below. According to the present exemplary embodiment, the issuer apparatus confidentializes data in a process different from the processes according to Exemplary Embodiments 1 through 4.

[Issuer key generating sequence ISS-GEN] and [Opener Key generating sequence OPN-GEN] are performed in the same manner as with Exemplary Embodiment 1.

[Issuing Sequence ISS-ISSUE and Joining Sequence USR-JOIN]

Issuer apparatus 100 and user apparatus 200 perform issuing sequence ISS-ISSUE and joining sequence USR-JOIN, respectively, while communicating with each other. First, issuer apparatus 100 performs [Issuing sequence 1 ISS-ISSUE-1] to be described later, and then user apparatus 200 performs [Joining sequence 1 USR-JOIN-1] to be described later. Issuer apparatus 100 performs [Issuing sequence 2 ISS-ISSUE-2] to be described later, and finally user apparatus 200 performs [Joining sequence 2 USR-JOIN-2] to be described later.

During the above sequences, member public key upk and member secret key usk are generated.

Member public key upk is disclosed to all the apparatus in some way. For example, one way to disclose upk may be putting it on a public bulletin board on the Internet. Any methods may be used to disclose upk.

[Signature sequence USR-SIGN], [Verifying sequence VER-VERIFY], and [Opening sequence OPN-OPEN] are performed in the same manner as with Exemplary Embodiment 1.

[Issuing Sequence 1 ISS-ISSUE-1]

Figure 32:
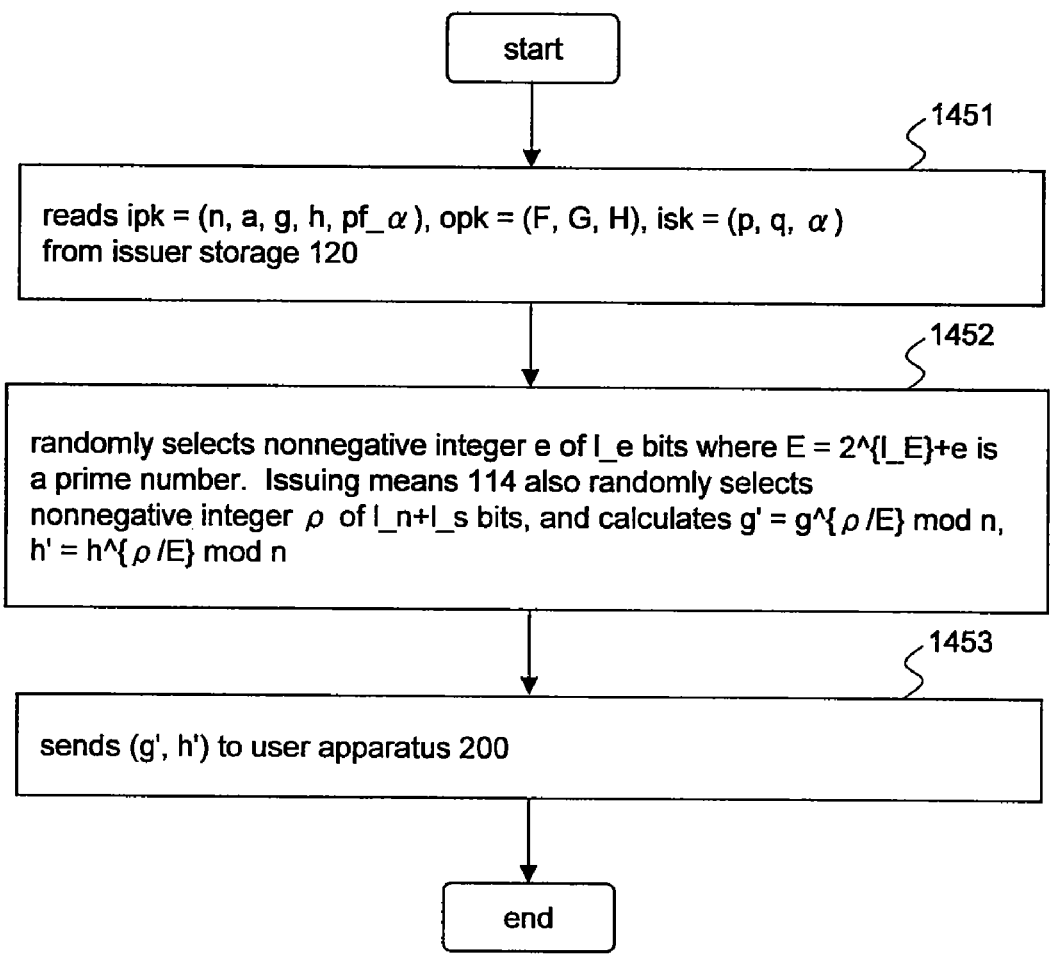
FIG. 32 is a flowchart of an issuing sequence 1 according to Exemplary Embodiment 4.

Issuing sequence 1 ISS-ISSUE-1 performed by issuing means 114 will be described below. FIG. 32 is a flowchart of issuing sequence 1. As shown in FIG. 32, issuer apparatus 100 performs the following ISS-ISSUE-1-1, ..., ISS-ISSUE-1-4 sequentially:

ISS-ISSUE-1-1: Issuing means 114 reads ipk=(n, a, g, h, pf_$\alpha$), opk=(F, G, H), isk=(p, q, $\alpha$) from issuer storage 120 (step 1451).

ISS-ISSUE-1-2: Issuing means 114 randomly selects nonnegative integer e of l_e bits where $E=2^{\{l\_E\}}+e$ is a prime number. Issuing means 114 also randomly selects nonnegative integer p of l_n+l_s bits, and calculates $g'=g^{\wedge}\{p/E\}$ mod n, $h'=h^{\wedge}\{p/E\}$ mod n (step 1452).

ISS-ISSUE-1-3: Issuing means 114 sends (g', h') to user apparatus 200 (step 1453).

[Joining Sequence 1 USR-JOIN-1]

Figure 33:
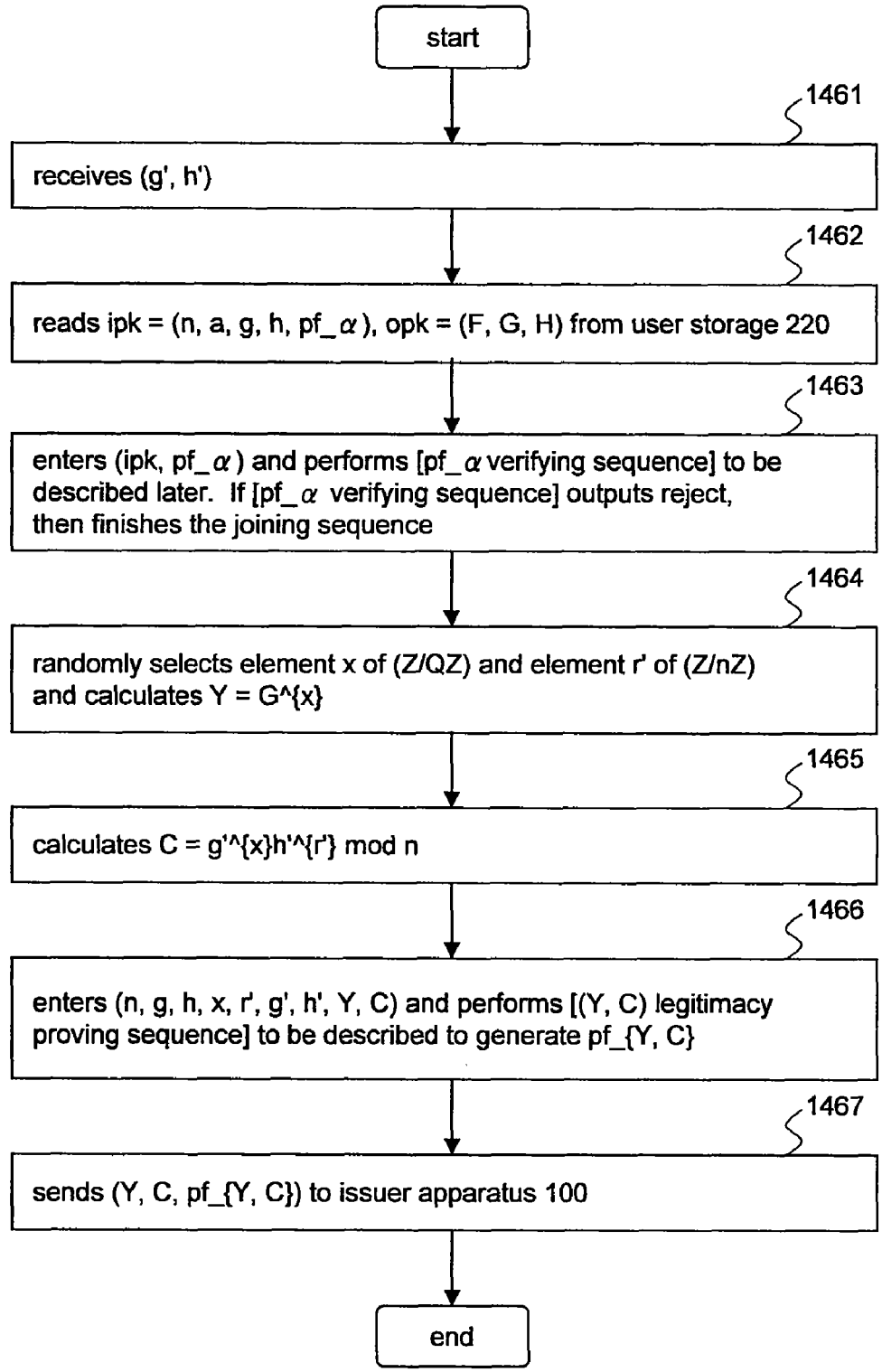
FIG. 33 is a flowchart of a joining sequence 1 according to Exemplary Embodiment 4.

Joining sequence 1 USR-JOIN-1 performed by joining means 212 will be described below. FIG. 33 is a flowchart of joining sequence 1. As shown in FIG. 33, user apparatus 200 performs the following USR-JOIN-1-1, ..., USR-JOIN-1-7 sequentially:

USR-JOIN-1-1: Joining means 212 receives (g', h') (step 1461).

USR-JOIN-1-2: Joining means 212 reads ipk=(n, a, g, h, pf_$\alpha$), opk=(F, G, H) from user storage 220 (step 1462).

USR-JOIN-1-3: Joining means 212 enters (ipk, pf_$\alpha$) and performs [pf_$\alpha$ verifying sequence] to be described later. If [pf_$\alpha$ verifying sequence] outputs reject, then joining means 212 finishes the joining sequence (step 1463).

USR-JOIN-1-4: Joining means 212 randomly selects element x of (Z/QZ) and element r' of (Z/nZ) and calculates $Y=G^{\wedge}\{x\}$ (step 1464).

USR-JOIN-1-5: Joining means 212 calculates $C=g'^{\wedge}\{x\}h'^{\wedge}\{r'\}$ mod n (step 1465).

USR-JOIN-1-6: Joining means 212 enters (n, g, h, x, r', g', h', Y, C) and performs [(Y, C) legitimacy proving sequence] to be described to generate pf_{Y, C} (step 1466).

USR-JOIN-1-7: Joining means 212 sends (Y, C, pf_{Y, C}) to issuer apparatus 100 (step 1467).

[Issuing Sequence 2 ISS-ISSUE-2]

Figure 34:
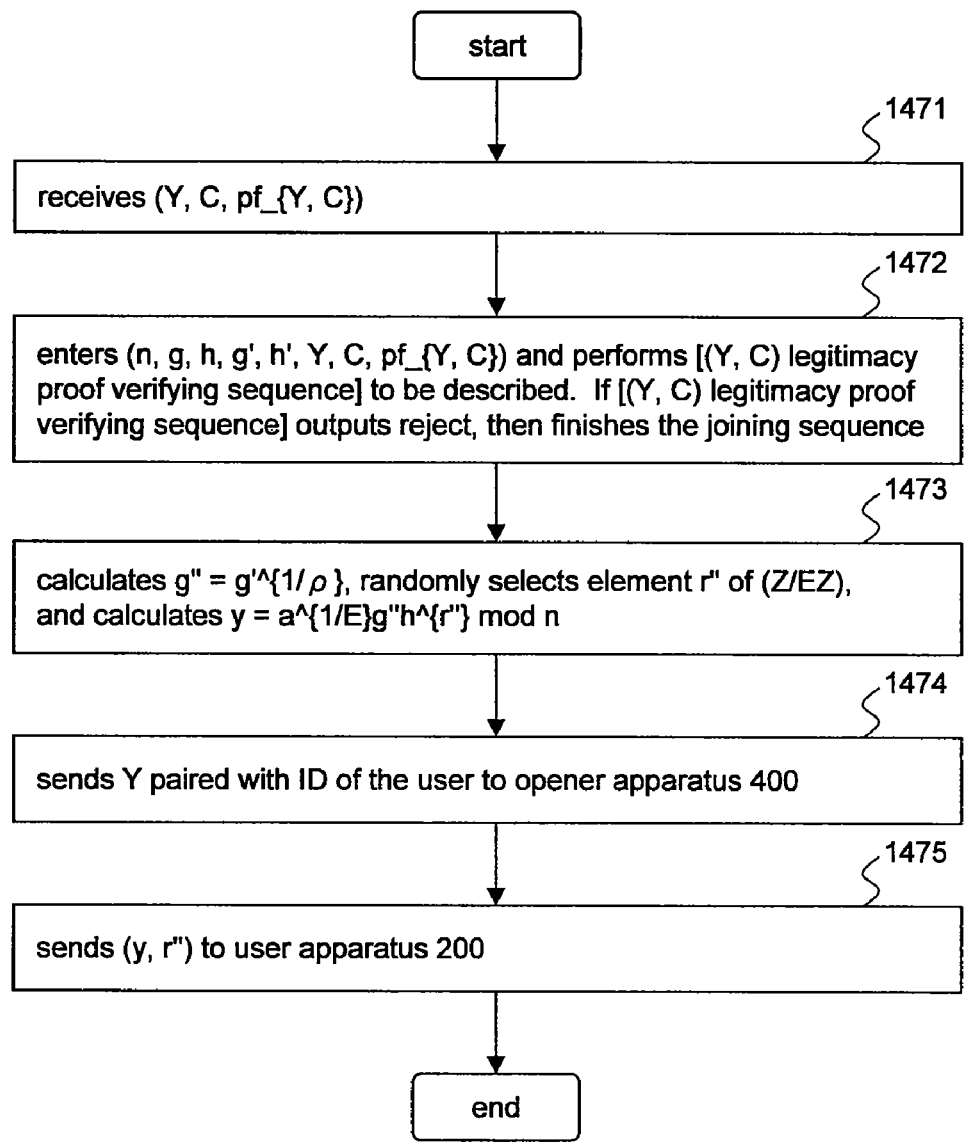
FIG. 34 is a flowchart of an issuing sequence 2 according to Exemplary Embodiment 4.

Issuing sequence 2 ISS-ISSUE-2 performed by issuing means 114 will be described below. FIG. 34 is a flowchart of issuing sequence 2. As shown in FIG. 34, issuer apparatus 100 performs the following ISS-ISSUE-2-1, ..., ISS-ISSUE-2-5 sequentially:

ISS-ISSUE-2-1: Issuing means 114 receives (Y, C, pf_{Y, C}) (step 1471).

ISS-ISSUE-2-2: Issuing means 114 enters (n, g, h, g', h', Y, C, pf_{Y, C}) and performs [(Y, C) legitimacy proof verifying sequence] to be described. If [(Y, C) legitimacy proof verifying sequence] outputs reject, then issuing means 114 finishes the joining sequence (step 1472).

ISS-ISSUE-2-3: Issuing means 114 calculates $g''=g'^{\{1/p\}}$, randomly selects element r" of (Z/EZ), and calculates $y=a^{\{1/E\}}g''h'^{\{r''\}} \bmod n$ (step 1473).

ISS-ISSUE-2-4: Issuing means 114 sends Y paired with ID of the user to opener apparatus 400 (step 1474).

ISS-ISSUE-2-5: Issuing means 114 sends (y, r") to user apparatus 200 (step 1475), and then puts the issuing sequence to an end.

[Joining sequence 2 USR-JOIN-2], [pf_α generating sequence], and [pf_α verifying sequence] are performed in the same manner as with Exemplary Embodiment 1.

[(Y, C) Legitimacy Proving Sequence]

Figure 35:
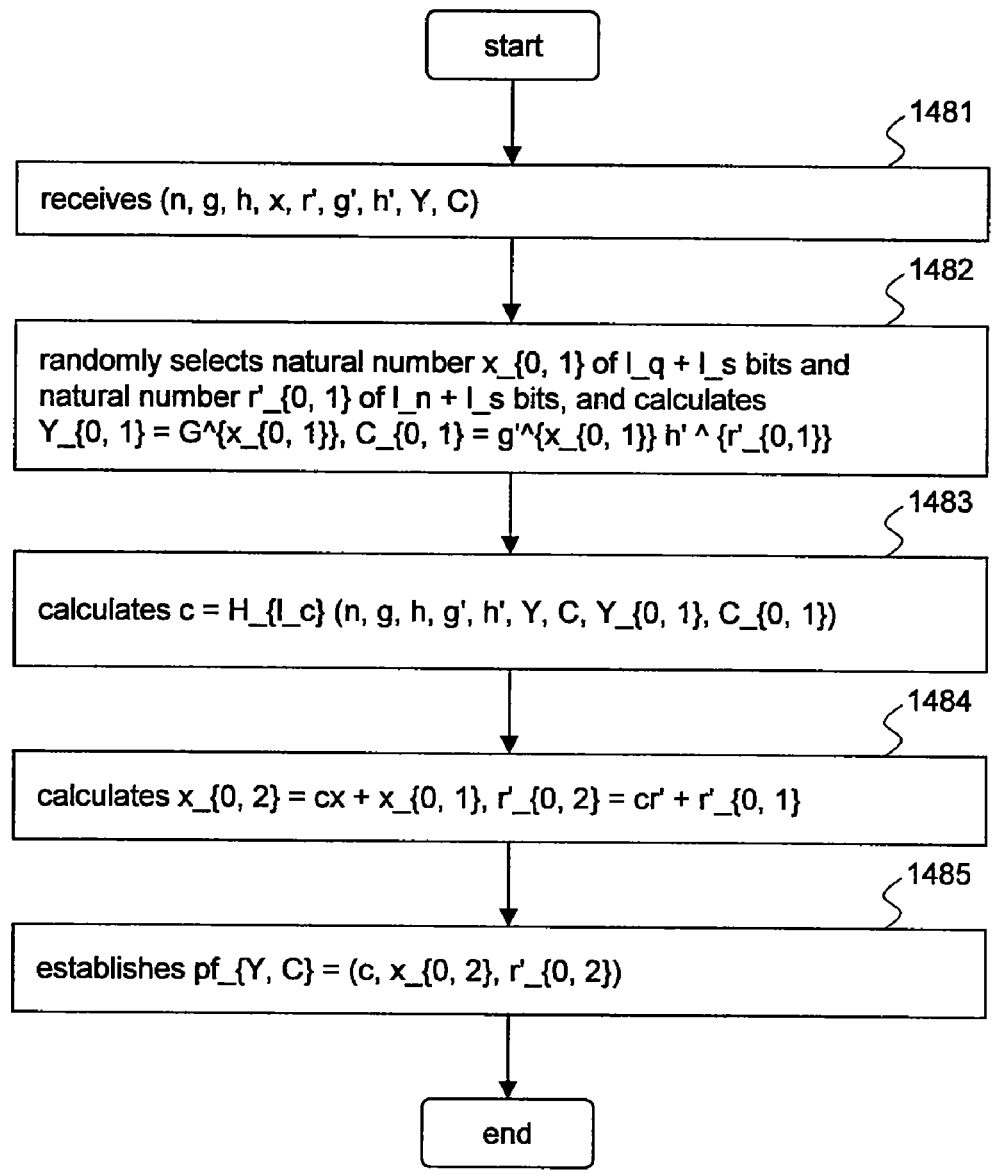
FIG. 35 is a flowchart of a (Y, C) legitimacy proving sequence.

A (Y, C) legitimacy proving sequence performed by user apparatus controller 210 will be described below. FIG. 35 is a flowchart of the (Y, C) legitimacy proving sequence. As shown in FIG. 35, user apparatus 200 performs the following PF-YC-GEN-1, . . . , PF-YC-GEN-5 sequentially:

PF-YC-GEN-1: User apparatus controller 210 receives (n, g, h, x, r', g', h', Y, C) (step 1481).

PF-YC-GEN-2: User apparatus controller 210 randomly selects natural number $x\_\{0, 1\}$ of $I\_q+I\_s$ bits and natural number $r'\_\{0, 1\}$ of $I\_n+I\_s$ bits, and calculates $Y\_\{0, 1\}=G^{\{x\_\{0, 1\}\}}$, $C\_\{0, 1\}=g'^{\{x\_\{0, 1\}\}}h'^{\{r'\_\{0, 1\}\}}$ (step 1482).

PF-YC-GEN-3: User apparatus controller 210 calculates $c=H\_\{I\_c\}(n, g, h, g', h', Y, C, Y\_\{0, 1\}, C\_\{0, 1\})$ (step 1483).

PF-YC-GEN-4: User apparatus controller 210 calculates $x\_\{0, 2\}=cx+x\_\{0, 1\}$, $r'\_\{0, 2\}=cr'+r'\_\{0, 1\}$ (step 1484).

PF-YC-GEN-5: User apparatus controller 210 establishes $pf\_\{Y, C\}=(c, x\_\{0, 2\}, r'\_\{0, 2\})$ (step 1485).

[(Y, C) Legitimacy Proof Verifying Sequence]

Figure 36:
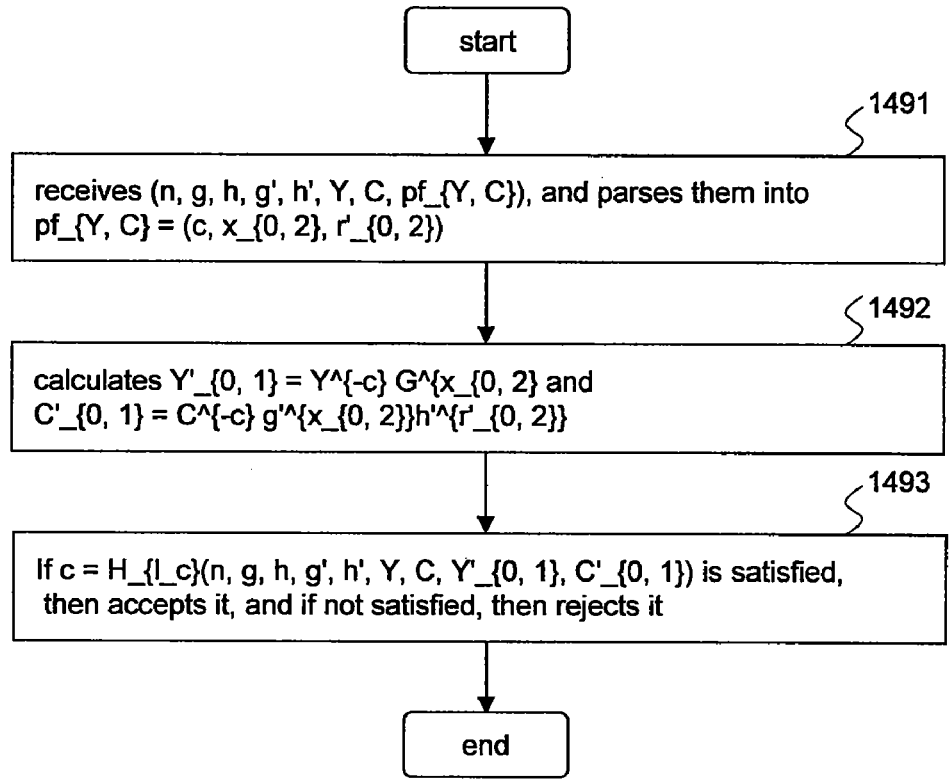
FIG. 36 is a flowchart of a (Y, C) legitimacy proof verifying sequence.

A (Y, C) legitimacy proof verifying sequence performed by issuer apparatus controller 110 will be described below. FIG. 36 is a flowchart of the (Y, C) legitimacy proof verifying sequence. As shown in FIG. 36, issuer apparatus 100 performs the following PF-YC-VER-1, PF-YC-VER-3 sequentially:

PF-YC-VER-1: Issuer apparatus controller 110 receives (n, g, h, g', h', Y, C, pf_{Y, C}), and parses them into $pf\_\{Y, C\}=(c, x\_\{0, 2\}, r'\_\{0, 2\})$ (step 1491).

PF-YC-VER-2: Issuer apparatus controller 110 calculates $Y'\_\{0, 1\}=Y^{\{-c\}} G^{\{x\_\{0, 2\}\}}$ and $C'\_\{0, 1\}=C^{\{-c\}} g'^{\{x\_\{0, 2\}\}}h'^{\{r'\_\{0, 2\}\}}$ (step 1492).

PF-YC-VER-3: If $c=H\_\{I\_c\}(n, g, h, g', h', Y, C, Y'\_\{0, 1\}, C'\_\{0, 1\})$ is satisfied, then issuer apparatus controller 110 accepts it, and if not satisfied, then issuer apparatus controller 110 rejects it (step 1493).

With the method of issuing a key to an additional member and the group signature system according to the present exemplary embodiment, the issuer apparatus first generates first confidential data using the secret key of the issuer apparatus, and then the user apparatus processes the first confidential data into second confidential data and proves the processed data to the issuer apparatus. Unlike the group signature apparatus of the background art, the issuer apparatus processes the data using the secret key of the issuer apparatus before the user apparatus proves the legitimacy of the data. Therefore, the safety of information is enhanced even when data are sent and received concurrently between a plurality of user apparatus and the issuer apparatus according to the join protocol.

The information confidentializing process according to the present exemplary embodiment has a higher information processing rate than with Exemplary Embodiment 1 as it does not need a data encrypting process and a data decrypting process.

Exemplary Embodiment 5

Apparatus Configuration

A group signature system according to the present exemplary embodiment will be described below. The configuration of the system will not be described in detail below as it is the same as the system described in Exemplary Embodiment 1. Configurational details which are different from those of Exemplary Embodiment 1 will be described below.

It is assumed that the storages of the apparatus have been supplied with security parameter k in advance. The storages may be supplied with k in any ways.

It is assumed that ⌈_1, ⌈_2, ⌈_T represent cyclic groups of order p, bilinear mapping e from ⌈_1 X ⌈_2 onto ⌈_T is defined, and the number of bits of p is k. It is also assumed that r represents a cyclic group of order p.

Furthermore, it is assumed that the storages of the apparatus have been supplied with parameters descriptive of ⌈_1, ⌈_T, and p in advance. The storages of the apparatus may be supplied with the parameters descriptive of ⌈_1, ⌈_2, ⌈_T, and p in any ways.

A key issuing method carried out by the group signature system according to the present exemplary embodiment will be described below. The key issuing method according to the present exemplary embodiment is similar to the method described in Exemplary Embodiment 2 except that the information confidentializing process performed by the issuer apparatus is different from the process according to Exemplary Embodiment 2. Therefore, details which are different from those according to Exemplary Embodiment 2 will be described below.

Figure 37:
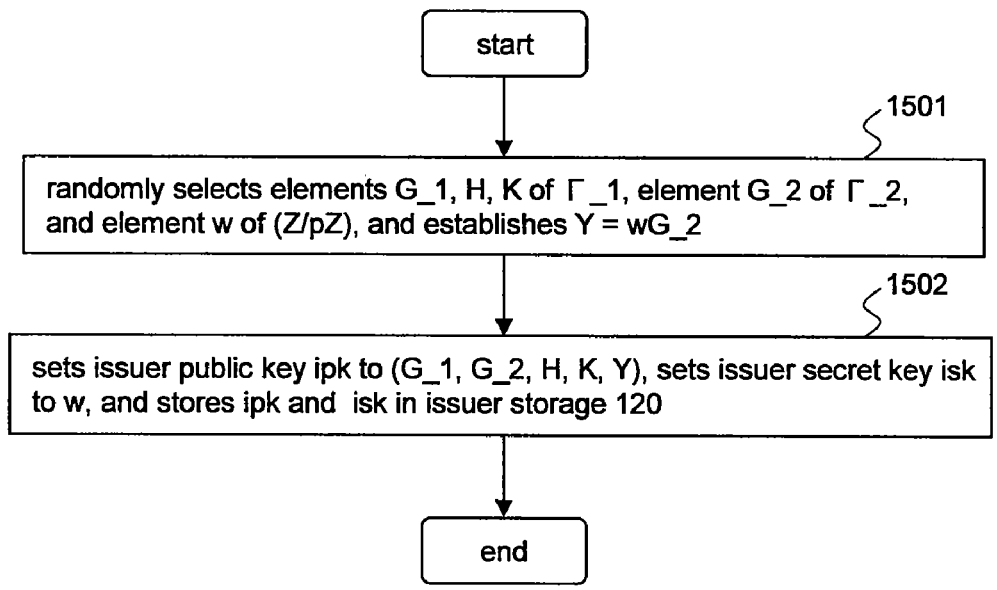
FIG. 37 is a flowchart of an issuer key generating sequence according to Exemplary Embodiment 5.

[Issuer Key Generating Sequence ISS-GEN]:

Issuer key generating sequence ISS-GEN performed by issuer key generating means 112 will be described below. FIG. 37 is a flowchart of the issuer key generating sequence. As shown in FIG. 37, issuer apparatus 100 performs the following ISS-GEN-1 and ISS-GEN-2 sequentially:

ISS-GEN-1: Issuer key generating means 112 randomly selects elements $G\_1, H, K$ of ⌈_1, element $G\_2$ of ⌈_2, and element w of (Z/pZ), and establishes $Y=wG\_2$ (step 1501).

ISS-GEN-2: Issuer key generating means 112 sets issuer public key ipk to $(G\_1, G\_2, H, K, Y)$, sets issuer secret key isk to w, and stores ipk and isk in issuer storage 120 (step 1502).

Opener apparatus 400 performs [Opener key generating sequence OPN-GEN] in the same manner as with Exemplary Embodiment 2.

[Issuing Sequence ISS-ISSUE and Joining Sequence USR-JOIN]

Issuer apparatus 100 and user apparatus 200 perform issuing sequence ISS-ISSUE and joining sequence USR-JOIN, respectively, while communicating with each other.

First, issuer apparatus 100 performs [Issuing sequence 1 ISS-ISSUE-1] to be described later, and then user apparatus 200 performs [Joining sequence 1 USR-JOIN-1] to be described later. Furthermore, issuer apparatus 100 performs [Issuing sequence 2 ISS-ISSUE-2] to be described later, and finally user apparatus 200 performs [Joining sequence 2 USR-JOIN-2] to be described later.

During the above sequences, member public key upk and member secret key usk are generated.

Member public key upk is disclosed to all the apparatus in some way. For example, one way to disclose upk may be putting it on a public bulletin board on the Internet. Any methods may be used to disclose upk.

[Signature sequence USR-SIGN], [Verifying sequence VER-VERIFY], and [Opening sequence OPN-OPEN] are performed in the same manner as with Exemplary Embodiment 2.

[Issuing Sequence 1 ISS-ISSUE-1]

Figure 38:
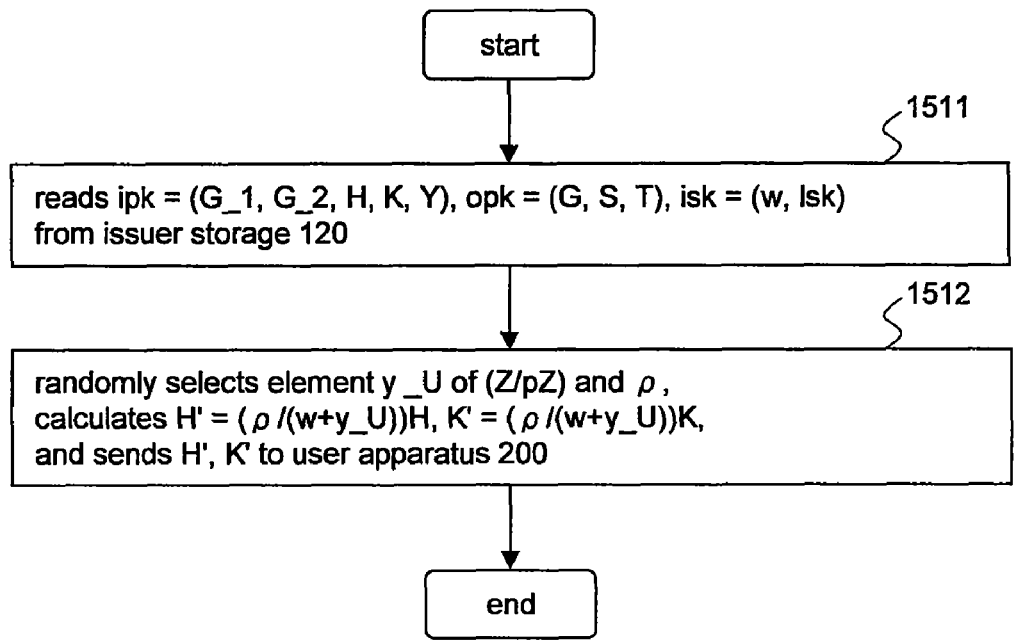
FIG. 38 is a flowchart of an issuing sequence 1 according to Exemplary Embodiment 5.

Issuing sequence 1 ISS-ISSUE-1 performed by issuing means 114 will be described below. FIG. 38 is a flowchart of issuing sequence 1. As shown in FIG. 38, issuer apparatus 100 performs the following ISS-ISSUE-1-1, ISS-ISSUE-1-2 sequentially:

ISS-ISSUE-1-1: Issuing means 114 reads $ipk=(G\_1, G\_2, H, K, Y)$, $opk=(G, S, T)$, $isk=(w, Isk)$ from issuer storage 120 (step 1511).

ISS-ISSUE-1-2: Issuing means 114 randomly selects element $y\_U$ of $(Z/pZ)$ and $\rho$, calculates $H'=(\rho/(w+y\_U))H$, $K'=(\rho/(w+y\_U))K$, and sends $H'$, $K'$ to user apparatus 200 (step 1512).

[Joining Sequence 1 USR-JOIN-1]

Figure 39:
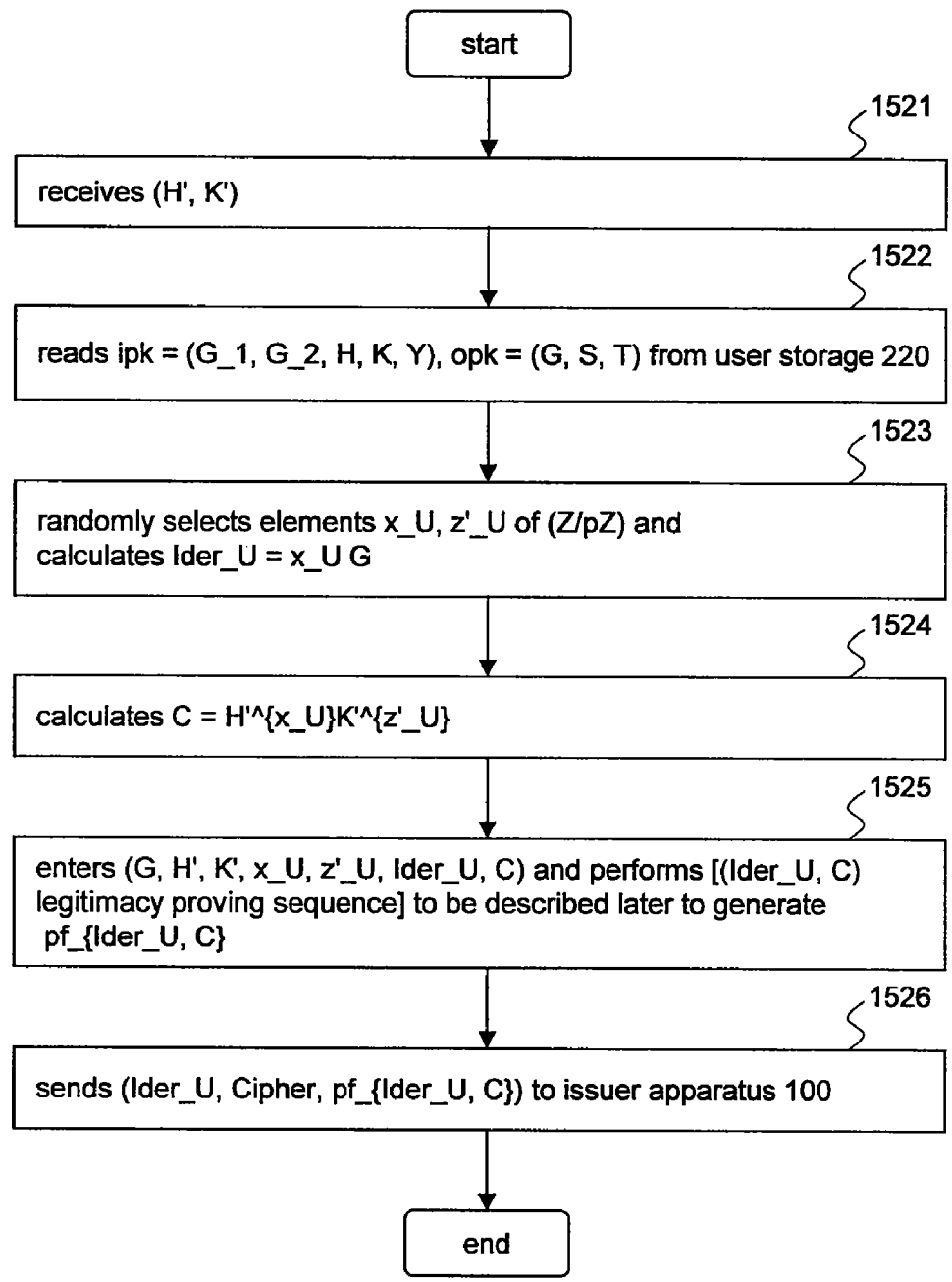
FIG. 39 is a flowchart of a joining sequence 1 according to Exemplary Embodiment 5.

Joining sequence 1 USR-JOIN-1 performed by joining means 212 will be described below. FIG. 39 is a flowchart of joining sequence 1. As shown in FIG. 39, user apparatus 200 performs the following USR-JOIN-1-1, ..., USR-JOIN-1-6 sequentially:

USR-JOIN-1-1: Joining means 212 receives $(H', K')$ (step 1521).

USR-JOIN-1-2: Joining means 212 reads $ipk=(G\_1, G\_2, H, K, Y)$, $opk=(G, S, T)$ from user storage 220 (step 1522).

USR-JOIN-1-3: Joining means 212 randomly selects elements $x\_U$, $z'\_U$ of $(Z/pZ)$ and calculates $Ider\_U=x\_U\, G$ (step 1523).

USR-JOIN-1-4: Joining means 212 calculates $C=H^{\wedge}\{x\_U\}K'^{\wedge}\{z'\_U\}$ (step 1524).

USR-JOIN-1-5: Joining means 212 enters $(G, H', K', x\_U, z'\_U, Ider\_U, C)$ and performs [(Ider_U, C) legitimacy proving sequence] to be described later to generate $pf\_\{Ider\_U, C\}$ (step 1525).

USR-JOIN-1-6: Joining means 212 sends $(Ider\_U, Cipher, pf\_\{Ider\_U, C\})$ to issuer apparatus 100 (step 1526).

[Issuing Sequence 2 ISS-ISSUE-2]

Figure 40:
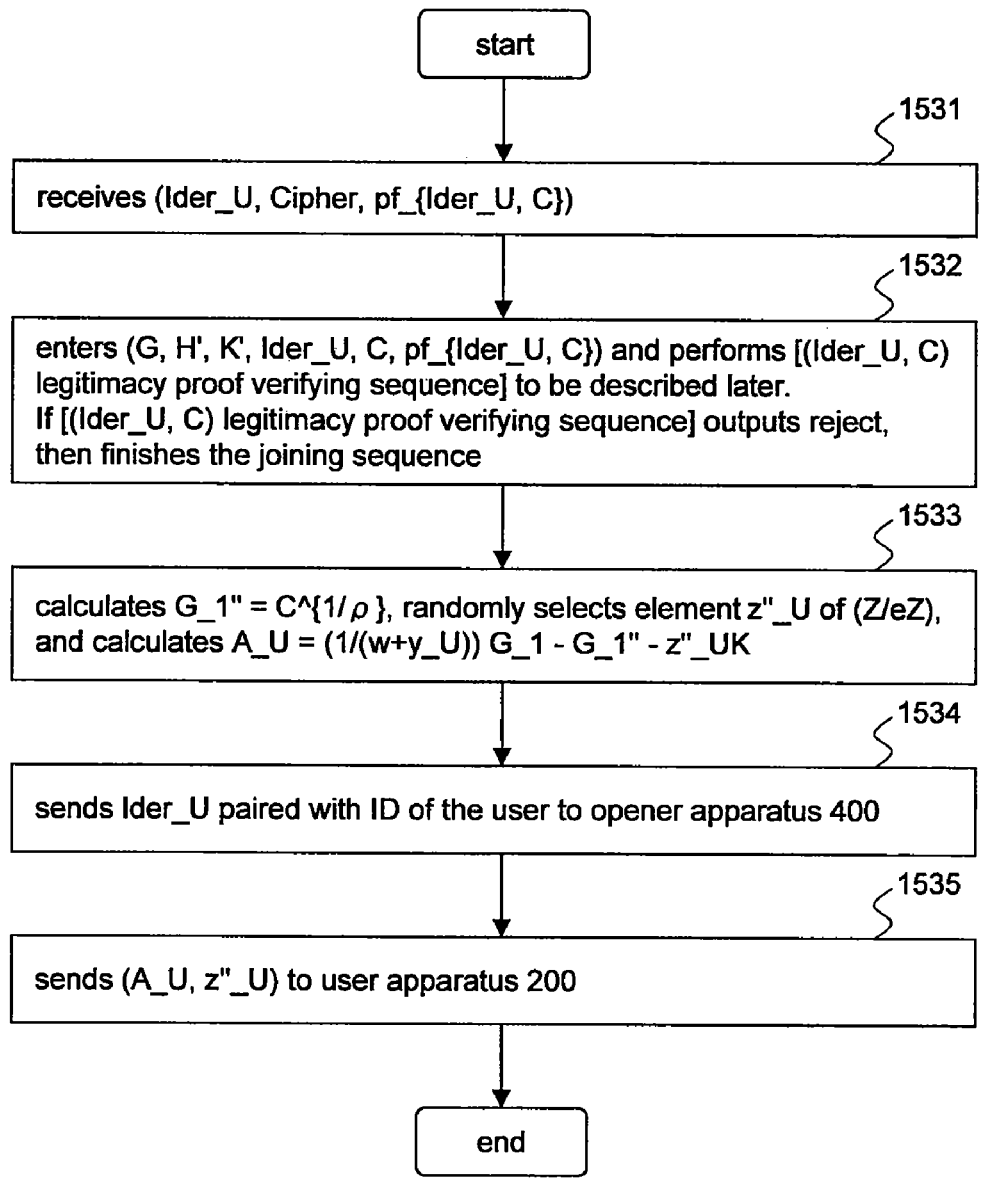
FIG. 40 is a flowchart of a joining sequence 2 according to Exemplary Embodiment 5.

Issuing sequence 2 ISS-ISSUE-2 performed by issuing means 114 will be described below. FIG. 40 is a flowchart of issuing sequence 2. As shown in FIG. 40, issuer apparatus 100 performs the following ISS-ISSUE-2-1, ..., ISS-ISSUE-2-5 sequentially:

ISS-ISSUE-2-1: Issuing means 114 receives $(Ider\_U, Cipher, pf\_\{Ider\_U, C\})$ (step 1531).

ISS-ISSUE-2-2: Issuing means 114 enters $(G, H', K', Ider\_U, C, pf\_\{Ider\_U, C\})$ and performs [(Ider_U, C) legitimacy proof verifying sequence] to be described later. If [(Ider_U, C) legitimacy proof verifying sequence] outputs reject, then issuing means 114 finishes the joining sequence (step 1532).

ISS-ISSUE-2-3: Issuing means 114 calculates $G\_1''=C''^{\wedge}\{1/\rho\}$, randomly selects element $z''\_U$ of $(Z/eZ)$, and calculates $A\_U=(1/(w+y\_U))\, G\_1-G\_1''-z''\_UK$ (step 1533). $G\_1''$ corresponds to g'' according to Exemplary Embodiment 4, and represents unconfidentialized data.

ISS-ISSUE-2-4: Issuing means 114 sends $Ider\_U$ paired with ID of the user to opener apparatus 400 (step 1534).

ISS-ISSUE-2-5: Issuing means 114 sends $(A\_U, z''\_U)$ to user apparatus 200 (step 1535), and then puts the issuing sequence to an end.

[Joining sequence 2 USR-JOIN-2] is performed in the same manner as with Exemplary Embodiment 2.

[(Ider_U, C) Legitimacy Proving Sequence]

Figure 41:
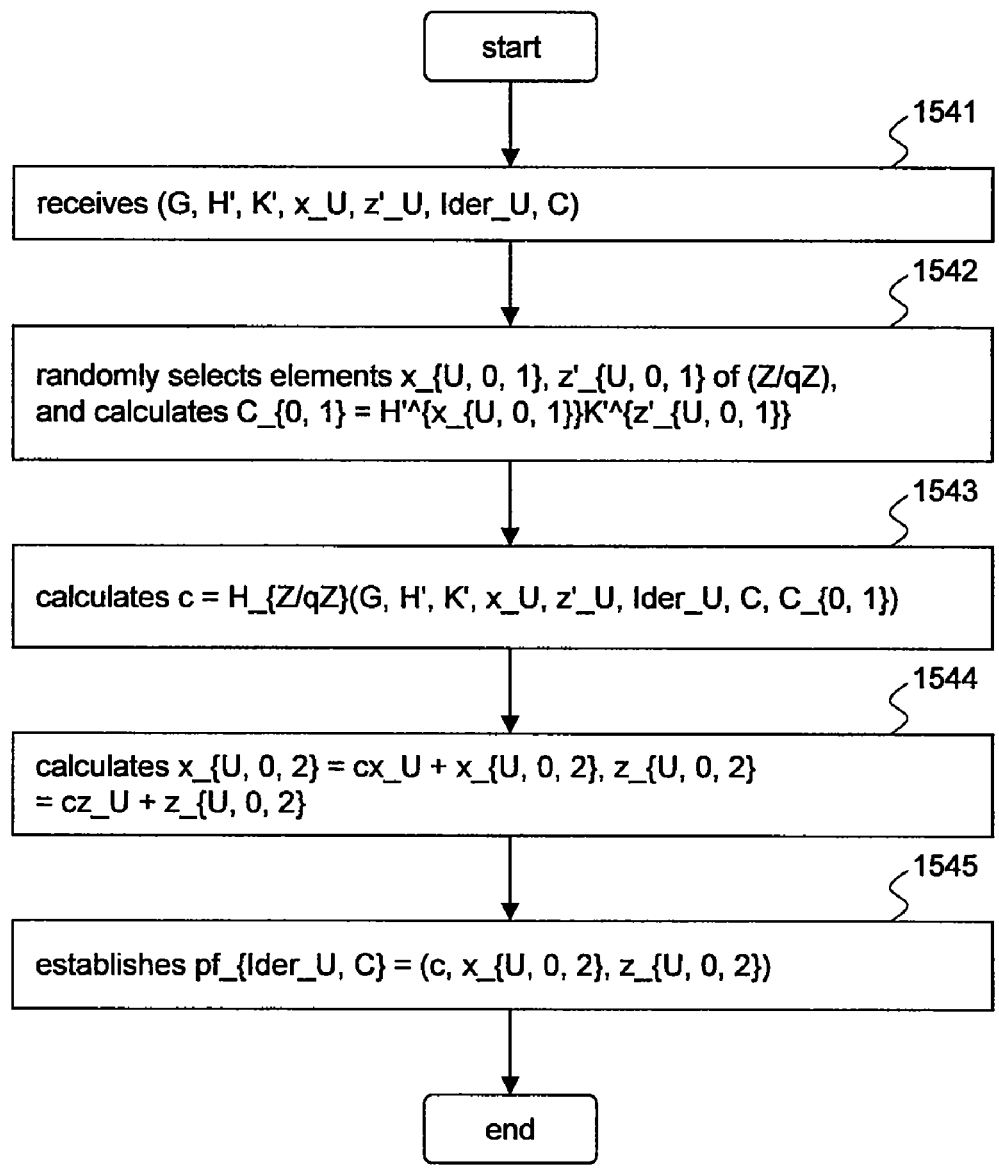
FIG. 41 is a flowchart of an (Ider_U, Cipher) legitimacy proving sequence.

A (Ider_U C) legitimacy proving sequence performed by joining means 212 will be described below. FIG. 41 is a flowchart of the (Ider_U, C) legitimacy proving sequence. As shown in FIG. 41, user apparatus 200 performs the following USR-PF-1, ..., USER-P-5 sequentially:

USR-PF-1: Joining means 212 receives $(G, H', K', x\_U, Ider\_U, C)$ (step 1541).

USR-PF-2: Joining means 212 randomly selects elements $x\_\{U, 0, 1\}$, $z'\_\{U, 0, 1\}$ of $(Z/qZ)$, and calculates $C\_\{0, 1\}=H'^{\wedge}\{x\_\{U, 0, 1\}\}K'^{\wedge}\{z'\_\{U, 0, 1\}\}$ (step 1542).

USR-PF-3: Joining means 212 calculates $c=H\_\{Z/qZ\}(G, H', K', x\_U, z'\_U, Ider\_U, C, C\_\{0, 1\})$ (step 1543).

USR-PF-4: Joining means 212 calculates $x\_\{U, 0, 2\}=cx\_U+x\_\{U, 0, 2\}$, $z\_\{U, 0, 2\}=cz\_U+z\_\{U, 0, 2\}$ (step 1544).

USR-PF-5: Joining means 212 establishes $pf\_\{Ider\_U, C\}=(c, x\_\{U, 0, 2\}, z\_\{U, 0, 2\})$ (step 1545).

[(Ider_U, C) Legitimacy Proof Verifying Sequence]

Figure 42:
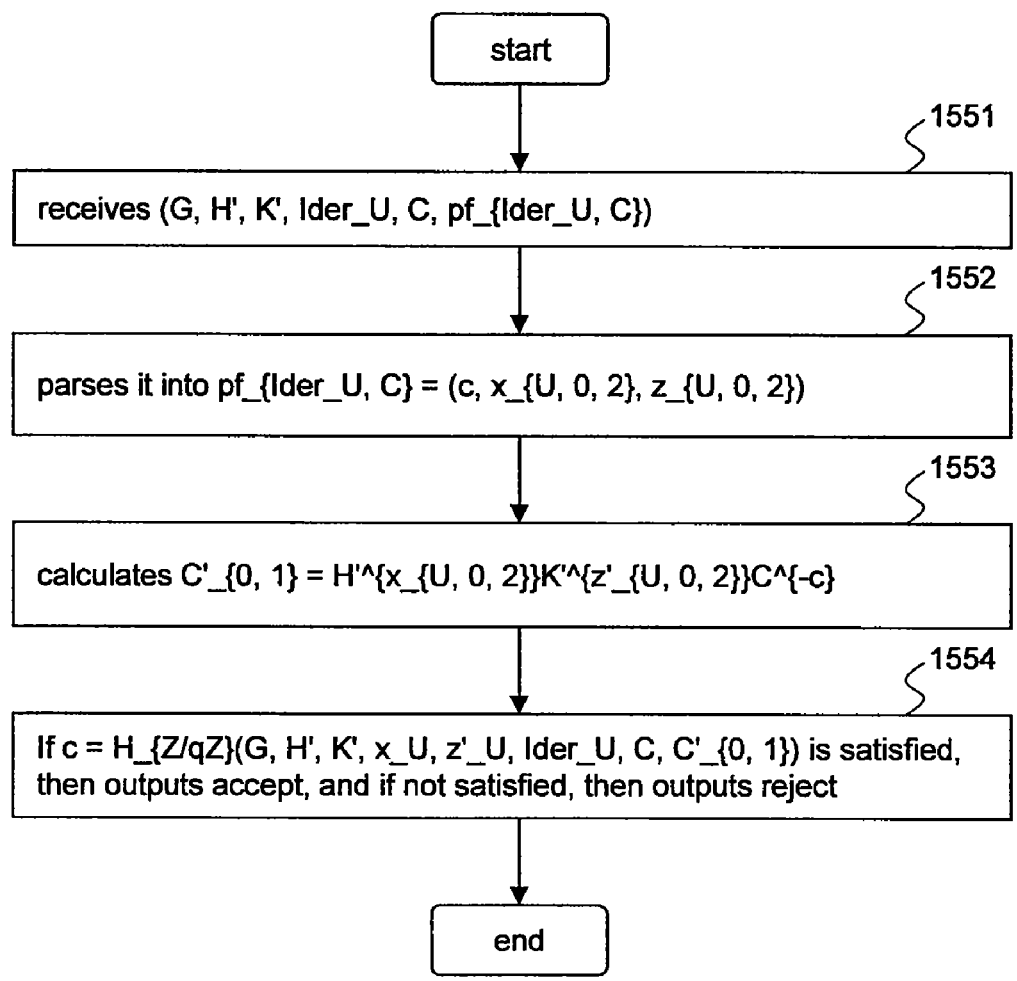
FIG. 42 is a flowchart of an (Ider_U, Cipher) legitimacy proof verifying sequence.

An (Ider_U, C) legitimacy proof verifying sequence performed by issuing means 114 will be described below. FIG. 42 is a flowchart of the (Ider_U, C) legitimacy proof verifying sequence. As shown in FIG. 42, issuer apparatus 100 performs the following USR-VER-1, USR-VER-4 sequentially:

USR-VER-1: Issuing means 114 receives $(G, H', K', Ider\_U, C, pf\_\{Ider\_U, C\})$ (step 1551).

USR-VER-2: Issuing means 114 parses it into $pf\_\{Ider\_U, C\}=(c, x\_\{U, 0, 2\}, z\_\{U, 0, 2\})$ (step 1552).

USR-VER-3: Issuing means 114 calculates $C'\_\{0, 1\}=H'^{\wedge}\{x\_\{U, 0, 2\}\}K'^{\wedge}\{z'\_\{U, 0, 2\}\}C^{\wedge}\{-c\}$ (step 1553).

USR-VER-3: If $c=H\_\{Z/qZ\}(G, H', K', x\_U, z'\_U, Ider\_U, C, C'\_\{0, 1\})$ is satisfied, then issuing means 114 outputs accept, and if not satisfied, then issuing means 114 outputs reject (step 1554).

The key issuing method and the group signature system according to the present exemplary embodiment have a higher information processing rate than with Exemplary Embodiment 2 as they do not need a data encrypting process and a data decrypting process.

The key issuing methods according to the above exemplary embodiments may be applied to a program to be executed by a computer. The program may be recorded in a recording medium readable by a computer.

The present invention is not limited to the above embodiments, but various modifications may be made within the scope of the invention as falling within the scope of the invention.

The invention claimed is:

1. A key issuing method for being performed by a user apparatus in a group signature system including said user apparatus and an issuer apparatus connected to said user apparatus through a network, comprising:

reading an issuer public key from said issuer apparatus into a user storage through said network;

receiving, from said issuer apparatus through said network, first confidential data including one or plural confidential texts which are produced by confidentializing said issuer public key using element data containing information of an element of a group in said issuer apparatus;

performing a second confidential data generating process for generating second confidential data of a confidential text represented by a product of modulo-exponentiated element data corresponding to said confidential texts included in said first confidential data or a confidential text represented by the sum of said element data multiplied by a constant, using said issuer public key and said first confidential data;

sending said second confidential data to said issuer apparatus through said network;

receiving, from said issuer apparatus through said network, information generated in said issuer apparatus and based on said element data corresponding to said second confidential data; and generating a member public key which is a public key corresponding to said user apparatus and a member secret key which is a secret key corresponding to said user apparatus, using information based on said element data corresponding to said second confidential data, and writing said member public key and said member secret key into said user storage.

2. The key issuing method according to claim 1, wherein a part of a power in a modulo exponentiation or a constant multiplying said element data in said second confidential data generating process comprises secret data, further comprising:

performing a secret key calculating process for generating said member secret key from said secret key; and performing a public key calculating process for generating said member public key from said information based on said element data corresponding to said second confidential data.

3. The key issuing method according to claim 2, wherein said information based on said element data corresponding to said second confidential data, which is received from said issuer apparatus by said user apparatus, includes two data;

said public key calculating process determines whether first calculated data determined from said two data according to a predetermined calculation and second calculated data representing a product of a plurality of given data agree with each other or not, and generates said member public key if said first calculated data and said second calculated data are determined as agreeing with each other; and said plurality of given data represent a modulo exponentiation of given data having a part of said issuer public key as a base, said given data including said secret data.

4. The key issuing method according to claim 3, wherein said first calculated data represent a modulo exponentiation having, as a base, one y of said two data included in said information based on said element data corresponding to said second confidential data and also having data E, which are in agreement with the other of said two data, as a power; and said first confidential data received from said issuer apparatus by said user apparatus are produced by multiplying a part of said issuer public key used in said public key calculating process by 1/E and thereafter confidentializing the product.

5. The key issuing method according to claim 4, wherein said first confidential data received from said issuer apparatus by said user apparatus include at least two confidential texts g' and h';

said second confidential data generating process selects secret data x and r', and then calculates a confidential text C by raising element data corresponding to said confidential text C_{g'} to a power of said secret data x, and raising element data corresponding to said C_{h'} to a power of said secret data r';

said second confidential data which are sent to said issuer apparatus from said user apparatus include said confidential text C;

the other data of said two data included in said information based on said element data corresponding to said second confidential data, which is received from said issuer apparatus by said user apparatus, comprise an element r" of a cyclic group;

said secret key calculating process calculates r from the sum of said data f and r" and generates said member secret key as including a pair (x, r); and in said public key calculating process, said plurality of given data included in said second calculated data include data generated by raising first data included in said issuer public key to a power of said x and data included in said issuer public key and generated by raising second data, different from said first data, to a power of said r.

6. The key issuing method according to claim 2, wherein said information based on said element data corresponding to said second confidential data, which is received from said issuer apparatus by said user apparatus, includes two data;

said public key calculating process determines whether first calculated data determined from said two data according to a predetermined calculation and second calculated data representing a product of a plurality of given pairings agree with each other or not, and generates said member public key if said first calculated data and said second calculated data are determined as agreeing with each other;

said plurality of given pairings include the sum of a plurality of given data paired with a part of said issuer public key; and said plurality of given data include data generated by multiplying given data by a constant with a part of said issuer public key being used as a base, said given data including said secret data.

7. The key issuing method according to claim 6, wherein said first calculated data comprises a pairing of given two data;

first pairing data which are data input to a given pairing of said plurality of pairings included in said second calculated data comprise one A_U of said two data included in said information based on said element data corresponding to said second confidential data;

second pairing data which are data input to said given pairing and which are different from said first pairing data comprise the sum of data generated by multiplying a part of said issuer public key by an element w of a cyclic group and data calculated from data of said issuer public key which are different from the data of said part thereof;

said w is in agreement with the other of said two data included in said information based on said element data corresponding to said second confidential data;

said first confidential data which are received from said issuer apparatus by said user apparatus comprise data generated by confidentializing given element data;

said given element data are generated by multiplying a part of said issuer public key by a given numerical value; and said given numerical value is represented by a reciprocal of the sum of said w and secret data of said issuer apparatus.

8. The key issuing method according to claim 7, wherein said first confidential data which are received from said issuer apparatus by said user apparatus include at least two confidential texts H' and K';

said second confidential data generating process first selects secret data x_U and z'_U, then multiplies element data corresponding said H' by said x_U, calculates a confidential text Cipher by multiplying element data corresponding to K' by said z'_U;

said second confidential data which are sent to said issuer apparatus from said user apparatus include said confidential text Cipher;

the other data of said two data included in said information based on said element data corresponding to said second confidential data, which is received from said issuer apparatus by said user apparatus, comprise an element z" of a cyclic group;

said secret key calculating process calculates z_U the sum of said data z'_U and said z"_U and generates said member secret key as including a pair (x_U, z_U);

in said public key calculating process, data including said A_U and said z_U are generated as a public key; and said plurality of pairings included in said second calculated data have a pairing including said x_U as data and a pairing including said z_U as data.

9. The key issuing method according to claim 1, wherein said confidential text included in said first confidential data is generated in said issuer apparatus when said information of said element of said group is input to said issuer apparatus, by selecting a random number ρ and multiplying said element by ρ; and said element data corresponding to said second confidential data are generated in said issuer apparatus by multiplying said confidential text included in said second confidential data by an inverse element of said random number ρ.

10. A key issuing method for issuing a key to an additional member from an issuer apparatus in a group signature system including a user apparatus and said issuer apparatus connected to said user apparatus through a network, comprising:

reading an issuer public key and an issuer secret key from an issuer storage;

performing a confidential text generating process for generating one or plural confidential texts by confidentializing data calculated from a part of said issuer public key using element data including information of an element of a group;

sending first confidential data including said one or plural confidential texts to said user apparatus through said network;

receiving, from said user apparatus through said network, second confidential data of a confidential text represented by a product of modulo-exponentiated element data corresponding to said confidential texts included in said first confidential data or a confidential text represented by the sum of said element data multiplied by a constant in said user apparatus;

performing a to-be-sent data generating process for calculating g" representing data restored from said second confidential data and generating to-be-sent data from said g"; and sending said to-be-sent data to said user apparatus through said network.

11. The key issuing method according to claim 10, wherein said confidential text generating process selects data E of a prime number satisfying a given equation from said issuer storage and confidentializes data generated by multiplying a part of said issuer public key by 1/E; and said to-be-sent data include said E.

12. The key issuing method according to claim 11, wherein said to-be-sent data generating process randomly elects an element r" of a cyclic group, and generates, as said to-be-sent data, data including a product of data generated by raising a part of said issuer public key to a power of r" and said g".

13. The key issuing method according to claim 10, wherein said confidential text generating process randomly selects an element y of a cyclic group, calculates the sum w+y of said y and said issuer secret key w, and confidentializes data generated by multiplying first data of a plurality of data included in said issuer public key by 1/(w+y); and said to-be-sent data include said y.

14. The key issuing method according to claim 13, wherein said to-be-sent data generating process randomly selects an element z"_U of a cyclic group, and generates, as said to-be-sent data, data determined from a calculating equation including the sum of said g" and data generated by multiplying, by z"_U, second data, which are different from said first data, of said plurality of data included in said issuer public key.

15. The key issuing method according to claim 10, wherein when said information of said element of said group is input, said confidential text generating process generates said confidential text by selecting a random number ρ and multiplying said element by ρ; and said to-be-sent-data generating process generates said g" by multiplying said confidential text included in said second confidential data by an inverse element of said random number ρ.

16. A key issuing method for being performed by a user apparatus in a group signature system including said user apparatus and an issuer apparatus connected to said user apparatus through a network, comprising:

reading an issuer public key from said issuer apparatus into a user storage through said network;

calculating a product x of data X_1 and X_2 of prime numbers;

sending data including said x to said issuer apparatus through said network;

if said x satisfies a given condition in said issuer apparatus, receiving data y generated in said issuer apparatus and calculated from data E of a prime number satisfying a given equation and data including said data E, from said issuer apparatus; and when said data y and data including said data E are received, checking whether first calculated data which are data generated by multiplying said data y by E and second calculated data generated by multiplying data generated by multiplying a part of said issuer public key by said x, by data of said issuer public key which are different from said part thereof, agree with each other or not, determines whether an RSA modulus which is a part of said issuer public key is equal to a modulus or not, and if said RSA modulus is equal to said modulus, a member public key is generated, and a member secret key including said data x is generated.

17. A key issuing method for being performed by an issuer apparatus in a group signature system including a user apparatus and said issuer apparatus connected to said user apparatus through a network, comprising:

reading an issuer public key and an issuer secret key from an issuer storage;

receiving data x representing a product of data X_1 and X_2 of prime numbers from said user apparatus through said network;

determining whether said x satisfies a given condition, and if said x satisfies said given condition, selecting data E of a prime number satisfying a given equation, calculates first calculated data by multiplying data g which are a part of said issuer public key by said x, calculating second calculated data by multiplying said first calculated data by data a which are a part of said issuer public key, and determining third calculated data as a value remaining when an RSA modulus n which is part of said issuer public key acts as a modulus for data generated by multiplying said second calculated data by 1/E; and sending data including said third calculated data to said user apparatus through said network.

18. A group signature system comprising:

an issuer apparatus including an issuer storage for storing an issuer public key and an issuer apparatus controller for sending said issuer public key through a network, generating one or plural confidential texts which are produced by confidentializing said issuer public key using element data containing information of an element of a group, sending out first confidential data including said one or plural confidential texts through said network, and when second confidential data generated by confidentializing said first confidential data are received, generating element data of said second confidential data, and sending out information based on said element data through said network; and a user apparatus including a user storage for storing said issuer public key through said network, and a user apparatus controller for storing said issuer public key received from said issuer apparatus into said user storage, and when said first confidential data are received, generating said second confidential data of a confidential text represented by a product of modulo-exponentiated element data corresponding to said confidential texts included in said first confidential data or a confidential text represented by the sum of said element data multiplied by a constant, using said issuer public key and said first confidential data, sending said second confidential data to said issuer apparatus through said network, and when information based on said element data is received, generating a member public key which is a public key corresponding to said user apparatus and a member secret key which is a secret key corresponding to said user apparatus, and writing said member public key and said member secret key into said user storage.

19. The group signature system according to claim 18, wherein when said information of said element of said group is input to said issuer apparatus, said issuer apparatus generates said confidential text by selecting a random number ρ and multiplying said element by ρ; and when said issuer apparatus receives said second confidential data, said issuer apparatus generates said element data of said second confidential data by multiplying said confidential text included in said second confidential data by an inverse element of said random number ρ.

20. An information processing apparatus connected to an issuer apparatus storing an issuer public key therein through a network, comprising:

a storage for storing said issuer public key; and a controller for storing said issuer public key received from said issuer apparatus into said storage, and when first confidential data including one or plural confidential texts which are produced by confidentializing said issuer public key using element data containing information of an element of a group in said issuer apparatus are received from said issuer apparatus, generating said second confidential data of a confidential text represented by a product of modulo-exponentiated element data corresponding to said confidential texts included in said first confidential data or a confidential text represented by the sum of said element data multiplied by a constant, using said issuer public key and said first confidential data, sending said second confidential data to said issuer apparatus through said network, and when information based on said element data is received from said issuer apparatus, generating a member public key which is a public key corresponding to said user apparatus and a member secret key which is a secret key corresponding to said user apparatus using information based on said element data of said second confidential data, and writing said member public key and said member secret key into said storage.

21. The information processing apparatus according to claim 20, wherein when said information of said element of said group is input to said issuer apparatus, said issuer apparatus generates said confidential text included in said first confidential data by selecting a random number ρ and multiplying said element by ρ; and said issuer apparatus generates said element data of said second confidential data by multiplying said confidential text included in said second confidential data by an inverse element of said random number ρ.

22. An information processing apparatus connected to a user apparatus of an additional user newly added to a group through a network, comprising:

a storage storing an issuer public key; and a controller for generating one or plural confidential texts by confidentializing data calculated from a part of said issuer key using element data including information of an element of a group, sending first confidential data including said one or plural confidential texts to said user apparatus, receiving, from said user apparatus, second confidential data of a confidential text represented by a product of modulo-exponentiated element data corresponding to said confidential texts included in said first confidential data or a confidential text represented by the sum of said element data multiplied by a constant in said user apparatus, calculating g" representing data restored from said second confidential data, generating to-be-sent data from said g", and sending said to-be-sent data to said user apparatus.

23. The information processing apparatus according to claim 22, wherein when said information of said element of said group is input to said controller, said controller generates said confidential text by selecting a random number ρ and multiplying said element by ρ; and when said controller receives said second confidential data, said controller generates said element data of said second confidential data by multiplying said confidential text included in said second confidential data by an inverse element of said random number ρ.

24. A computer program product for being executed by a computer connected to an issuer apparatus storing an issuer public key therein through a network, said program enabling said computer to perform a process comprising:

reading said issuer public key from said issuer apparatus through said network into a storage of said computer;

receiving, from said issuer apparatus through said network, first confidential data including one or plural confidential texts which are produced by confidentializing said issuer public key using element data containing information of an element of a group in said issuer apparatus;

generating second confidential data of a confidential text represented by a product of modulo-exponentiated element data corresponding to said confidential texts included in said first confidential data or a confidential text represented by the sum of said element data multiplied by a constant, using said issuer public key and said first confidential data;

sending said second confidential data to said issuer apparatus through said network;

receiving, from said issuer apparatus through said network, information generated in said issuer apparatus and based on said element data corresponding to said second confidential data; and generating a member public key which is a public key corresponding to said computer and a member secret key which is a secret key corresponding to said computer, using information based on said element data corresponding to said second confidential data, and writing said member public key and said member secret key into said storage of said computer.

25. The computer program product according to claim 24, wherein said confidential text included in said first confidential data is generated in said issuer apparatus when said information of said element of said group is input to said issuer apparatus, by selecting a random number $\rho$ and multiplying said element by $\rho$; and said element data corresponding to said second confidential data are generated in said issuer apparatus by multiplying said confidential text included in said second confidential data by an inverse element of said random number $\rho$.

26. A computer program product for being executed by a computer connected to a user apparatus of an additional user newly added to a group through a network, said program enabling said computer to perform a process comprising:

reading an issuer public key and an issuer secret key from a storage of said computer;

performing a confidential text generating process for generating one or plural confidential texts by confidentializing data calculated from a part of said issuer public key using element data including information of an element of a group;

sending first confidential data including said one or plural confidential texts to said user apparatus through said network;

receiving, from said user apparatus through said network, second confidential data of a confidential text represented by a product of modulo-exponentiated element data corresponding to said confidential texts included in said first confidential data or a confidential text represented by the sum of said element data multiplied by a constant in said user apparatus;

performing a to-be-sent data generating process for calculating g" representing data restored from said second confidential data and generating to-be-sent data from said g"; and sending said to-be-sent data to said user apparatus through said network.

27. The computer program product according to claim 26, wherein when said information of said element of said group is input, said confidential text generating process generates said confidential text by selecting a random number $\rho$ and multiplying said element by $\rho$; and said to-be-sent-data generating process generates said g" by multiplying said confidential text included in said second confidential data by an inverse element of said random number $\rho$.

* * * * *